United States Patent
Suresh et al.

(10) Patent No.: US 10,705,842 B2
(45) Date of Patent: Jul. 7, 2020

(54) HARDWARE ACCELERATORS AND METHODS FOR HIGH-PERFORMANCE AUTHENTICATED ENCRYPTION

(71) Applicant: Intel Corporation, Santa Clara, CA (US)

(72) Inventors: Vikram Suresh, Portland, OR (US); Sanu Mathew, Portland, OR (US); Sudhir Satpathy, Hillsboro, OR (US); Vinodh Gopal, Westborough, MA (US)

(73) Assignee: INTEL CORPORATION, Santa Clara, CA (US)

( * ) Notice: Subject to any disclaimer, the term of this patent is extended or adjusted under 35 U.S.C. 154(b) by 40 days.

(21) Appl. No.: 15/943,654

(22) Filed: Apr. 2, 2018

(65) Prior Publication Data
US 2019/0042249 A1 Feb. 7, 2019

(51) Int. Cl.
*G06F 9/302* (2018.01)
*G06F 9/305* (2018.01)
(Continued)

(52) U.S. Cl.
CPC ...... *G06F 9/30036* (2013.01); *G06F 9/30098* (2013.01); *G06F 9/30145* (2013.01);
(Continued)

(58) Field of Classification Search
CPC ............. G06F 9/30036; G06F 9/30098; G06F 9/30145; G06F 9/384; H04L 9/0631;
(Continued)

(56) References Cited

U.S. PATENT DOCUMENTS 8,924,741 B2 12/2014 Wolrich et al.
9,223,392 B2 12/2015 Sood
(Continued)

FOREIGN PATENT DOCUMENTS

WO 2010/039167 A1 4/2010
WO 2012/141677 A1 10/2012

OTHER PUBLICATIONS

Nuray At et al. "Compact Hardware Implementations of ChaCha, Blake, Threefish, and Skein on FPGA" IEEE vol. 61,No. 2,Feb. 2014 (Year: 2014).*

(Continued)

*Primary Examiner* — Daniel H Pan
(74) *Attorney, Agent, or Firm* — Nicholson De Vos Webster & Elliott LLP

(57) ABSTRACT

Methods and apparatuses relating to high-performance authenticated encryption are described. A hardware accelerator may include a vector register to store an input vector of a round of an encryption operation; a circuit including a first data path including a first modular adder coupled to a first input from the vector register and a second input from the vector register, and a second modular adder coupled to the first modular adder and a second data path from the vector register, and the second data path including a first logical XOR circuit coupled to the second input and a third data path from the vector register, a first rotate circuit coupled to the first logical XOR circuit, a second logical XOR circuit coupled to the first rotate circuit and the third data path, and a second rotate circuit coupled to the second logical XOR circuit; and a control circuit to cause the first modular adder and the second modular adder of the first data path and the first logical XOR circuit, the second logical XOR circuit, the first rotate circuit, and the second rotate circuit of the second data path to perform a portion of the round according to one or more control values, and store a (Continued)

US 10,705,842 B2
Page 2 first result from the first data path for the portion and a second result from the second data path for the portion into the vector register.

24 Claims, 28 Drawing Sheets

(51) Int. Cl.
   G06F 9/315    (2018.01)
   H04L 9/00     (2006.01)
   H04L 9/18     (2006.01)
   G06F 9/30     (2018.01)
   G06F 9/38     (2018.01)
   H04L 9/06     (2006.01)

(52) U.S. Cl.
   CPC .............. *G06F 9/384* (2013.01); *H04L 9/065* (2013.01); *H04L 9/0631* (2013.01); *H04L 9/0637* (2013.01); *H04L 9/0643* (2013.01); *H04L 9/0668* (2013.01); *H04L 2209/046* (2013.01); *H04L 2209/12* (2013.01); *H04L 2209/122* (2013.01)

(58) Field of Classification Search
   CPC ....... H04L 9/0618; H04L 9/0625; H04L 9/08; H04L 2209/12; H04L 2209/122; H04L 2209/08; H04L 2209/24; H04L 9/0637; H04L 9/0643; H04L 9/065; H04L 9/0668; H04L 2209/046
   USPC ........ 712/222, 221, 223, 224, 4–9; 713/170, 713/171; 380/42, 45
   See application file for complete search history.

(56) References Cited

U.S. PATENT DOCUMENTS

| | | | |
|---|---|---|---|
| 9,912,479 B1* | 3/2018 | Yamada | H04L 9/304 |
| 2007/0283349 A1 | 12/2007 | Creamer et al. | |
| 2016/0352870 A1 | 12/2016 | Manapragada et al. | |
| 2017/0236123 A1 | 8/2017 | Ali et al. | |
| 2018/0006808 A1 | 1/2018 | Suresh et al. | |
| 2018/0205536 A1* | 7/2018 | Tomlinson | G09C 1/00 |
| 2018/0212761 A1* | 7/2018 | Bilgin | H04L 9/0625 |
| 2018/0352033 A1 | 12/2018 | Pacella et al. | |

OTHER PUBLICATIONS

Daniel J Bernstein, "ChaCha, a Variant of Salsa20" ( https://cr.yp.to/chacha.html) (Year: 2008).*
Wikipedia, ChaCha Variant (https://en.wikipedia.org/wiki/Salsa20) (Year: 2019).*
Bernstein D.J., et al., "ChaCha, a Variant of Salsa20," National Science Foundation, M/C 249, Jan. 28, 2008, 6 pages.
RFC 7539: Nir Y., et al., "ChaCha20 and Poly1305 for IETF Protocols" May 2015, 46 pages, Internet Research Task Force (IRTF), Request for Comments: 7539.
RFC 7693: Saarinen M.J., et al., "The BLAKE2 Cryptographic Hash and Message Authentication Code (MAC)" Nov. 2015, 31 pages, Independent Submission, Request for Comments: 7693.
Wikipedia, "Encryption," downloaded from https://en.wikipedia.org/wiki/Encryption on Mar. 21, 2018, 4 pages.
Brown, "SEC 1: Elliptic Curve Cryptography," Standards for Efficient Cryptography, Certicom Research, Version 2.0, May 21, 2009, 144 pages.
ConsenSys, "Blockchain Underpinnings: Hashing," Medium, Jan. 13, 2016, downloaded from hllps://medium.com/@ConsenSys/blockchain-underpinnings-hashing-7f4746cbd66b on Jul. 25, 2017, 9 pages.
Extended European Search Report for Application No. 18178661.7, dated Nov. 14, 2018, 10 pages.
Extended European Search Report for Application No. EP19160418.0, dated Aug. 27, 2019, 7 pages.
Henzen L., et al., VLSI Characterization of the Cryptographic Hash Function BLAKE, IEEE Transactions on Very Large Scale Integration (VLSI) Systems, XP011371273, Oct. 31, 2011, vol. 19, No. 10, pp. 1746-1754.
Henzen L., et al., "VLSI Hardware Evaluation of the Stream Ciphers Salsa20 and ChaCha, and the Compression Function Rumba," 2nd International Conference on Signals, Circuits and Systems, XP031405857, Nov. 7, 2008, 5 pages.
IBM Blockchain, "IBM Blockchain—Blockchain Solutions," Try IBM Blockchain on Bluemix, downloaded from https://www.ibm.com/blockchain/offerings.html on Jul. 26, 2017, 4 pages.
IBM corporation, "IBM z Systems: IBM z Systems is the Platform of Choice for Blockchain," IBM System group, 2016, downloaded from https://www-01.ibm.com/common/ssi/cgi-bin/ssialias?subtype=PS&infotype=SA&htmlfid=ZSP04578USEN&allachmenl=ZSP04578USEN.PDF, 14 pages.
IBM z Systems, "IBM Blockchain on z Systems," Blockchain transactions on Z, downloaded from https://www-03.ibm.com/systems/z/solutions/blockchain-transactions/ on Jul. 26, 2017, 5 pages.
Intel(Registered) Architecture, "Instruction Set Extensions and Future Features Programming Reference," 319433-034, May 2018, 145 pages.
Intel, "Intel(Registered) 64 and IA-32 Architectures Software Developer Manuals," Oct. 12, 2016, Updated—May 18, 2018, 19 pages.
Jeni, "How Might We Use Blockchains Outside Cryptocurrencies?," May 21, 2015, downloaded from http://www.ienitennison.com/2015/05/21/blockchain.html on Jul. 25, 2017, 9 pages.
Non-Final Office Action received for U.S. Appl. No. 15/884,259, dated Sep. 19, 2019, 9 pages.
Panneerselvam S., et al., "Rinnegan: Efficient Resource Use in Heterogeneous Architectures," Parallel Architectures and Compilation, PACT'16, Sep. 2016, pp. 373-386.
Schutzer D., "CTO Corner: Whal is a Blockchain and why is ii important?," BITS, Financial Services Roundlable, Jan. 14, 2016, downloaded from http://www.fsroundlable.org/clo-comer-what-is-a-blockchain-and-why-is-it-important/ on Jul. 25, 2017, 12 pages.
Sean, "If You Understand Hash Functions, You'll Understand Blockchains," Nov. 29, 2016, downloaded from https://decentralize.today/if-you-understand-hash-functions-youll-understand-blockchains-9088307b745d on Jul. 25, 2017, 5 pages.
Tillich S., et al., "Compact Hardware Implementations of the SHA-3 Candidates ARIRANG, BLAKE, Grostl, and Skein," International Association for Cryptologic Research, XP061003497, Jul. 14, 2009, vol. 20090718:044612, 6 pages.
Wikipedia, "Blockchain," downloaded from https://en.wikipedia.org/wiki/Blockchain on Jul. 25, 2017, 8 pages.
Notice of Allowance, U.S. Appl. No. 15/884,259, dated May 6, 2020, 5 pages.

* cited by examiner

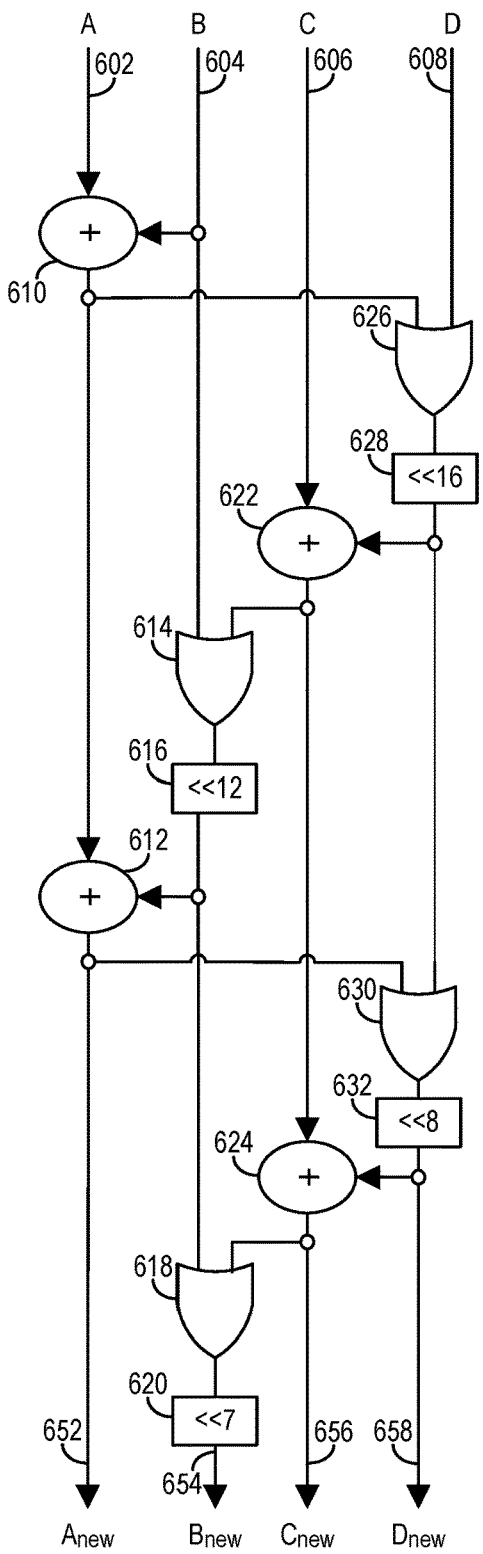
FIG. 6
ChaCha Qround Circuit
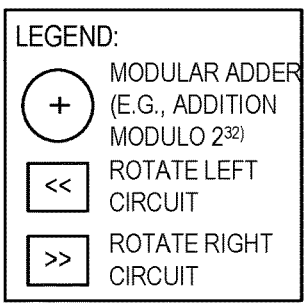

Unified ChaCha Qround/Blake Round Circuit

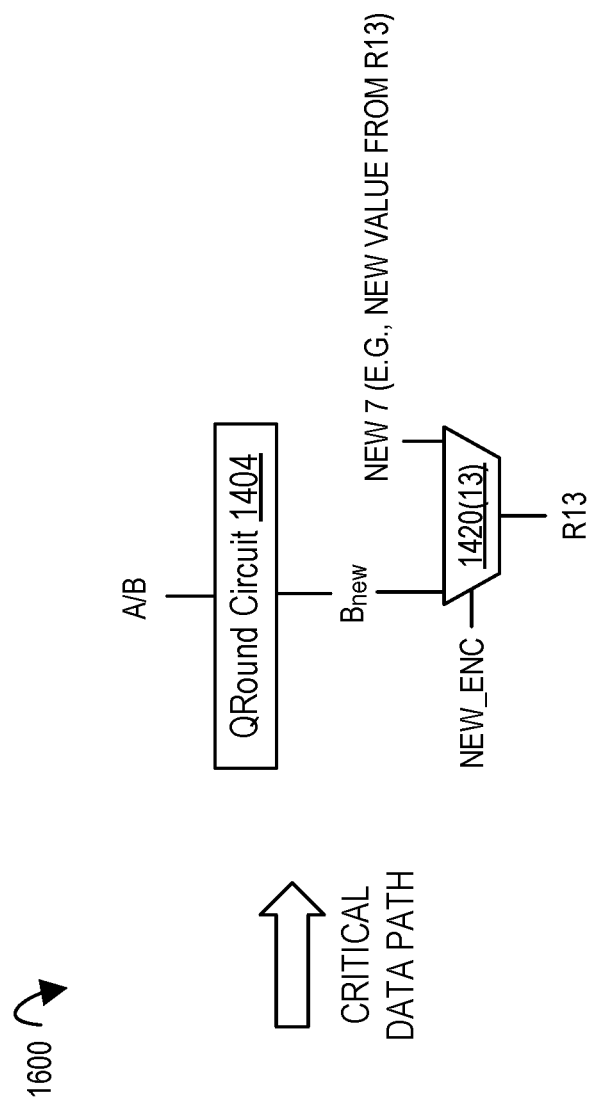

1700

STORING AN INPUT VECTOR OF A ROUND OF AN ENCRYPTION OPERATION IN A VECTOR REGISTER
1702

PERFORMING A PORTION OF THE ROUND ON THE INPUT VECTOR WITH A CIRCUIT BY: IN A FIRST DATA PATH OF THE CIRCUIT COMPRISING A FIRST MODULAR ADDER COUPLED TO A FIRST INPUT FROM THE VECTOR REGISTER AND A SECOND INPUT FROM THE VECTOR REGISTER, AND A SECOND MODULAR ADDER COUPLED TO THE FIRST MODULAR ADDER AND A SECOND DATA PATH OF THE CIRCUIT FROM THE VECTOR REGISTER, ADDING WITH THE FIRST MODULAR ADDER A FIRST VALUE FROM THE FIRST INPUT FROM THE INPUT VECTOR AND A SECOND VALUE FROM THE SECOND INPUT FROM THE VECTOR REGISTER TO PRODUCE A FIRST INTERMEDIATE RESULT, AND ADDING WITH THE SECOND MODULAR ADDER THE FIRST INTERMEDIATE RESULT AND A THIRD INTERMEDIATE RESULT FROM THE SECOND DATA PATH TO PRODUCE A FIRST RESULT, AND IN THE SECOND DATA PATH OF THE CIRCUIT COMPRISING A FIRST LOGICAL XOR CIRCUIT COUPLED TO THE SECOND INPUT AND A THIRD DATA PATH OF THE CIRCUIT FROM THE VECTOR REGISTER, A FIRST ROTATE CIRCUIT COUPLED TO THE FIRST LOGICAL XOR CIRCUIT, A SECOND LOGICAL XOR CIRCUIT COUPLED TO THE FIRST ROTATE CIRCUIT AND THE THIRD DATA PATH, AND A SECOND ROTATE CIRCUIT COUPLED TO THE SECOND LOGICAL XOR CIRCUIT, LOGICAL XORING WITH THE FIRST LOGICAL XOR CIRCUIT THE SECOND VALUE FROM THE SECOND INPUT FROM THE VECTOR REGISTER AND A THIRD RESULT FROM THE THIRD DATA PATH TO PRODUCE A SECOND INTERMEDIATE RESULT, ROTATING WITH THE FIRST ROTATE CIRCUIT THE SECOND INTERMEDIATE RESULT ACCORDING TO ONE OR MORE CONTROL VALUES TO PRODUCE A THIRD INTERMEDIATE RESULT, LOGICAL XORING THE THIRD INTERMEDIATE RESULT AND A FOURTH RESULT FROM THE THIRD DATA PATH TO PRODUCE A FIFTH INTERMEDIATE RESULT, AND ROTATING WITH THE SECOND ROTATE CIRCUIT THE FIFTH INTERMEDIATE RESULT ACCORDING TO ONE OR MORE CONTROL VALUES TO PRODUCE A SECOND RESULT
1704

STORING THE FIRST RESULT FROM THE FIRST DATA PATH FOR THE PORTION AND THE SECOND RESULT FROM THE SECOND DATA PATH FOR THE PORTION INTO THE VECTOR REGISTER
1706

FIG. 17

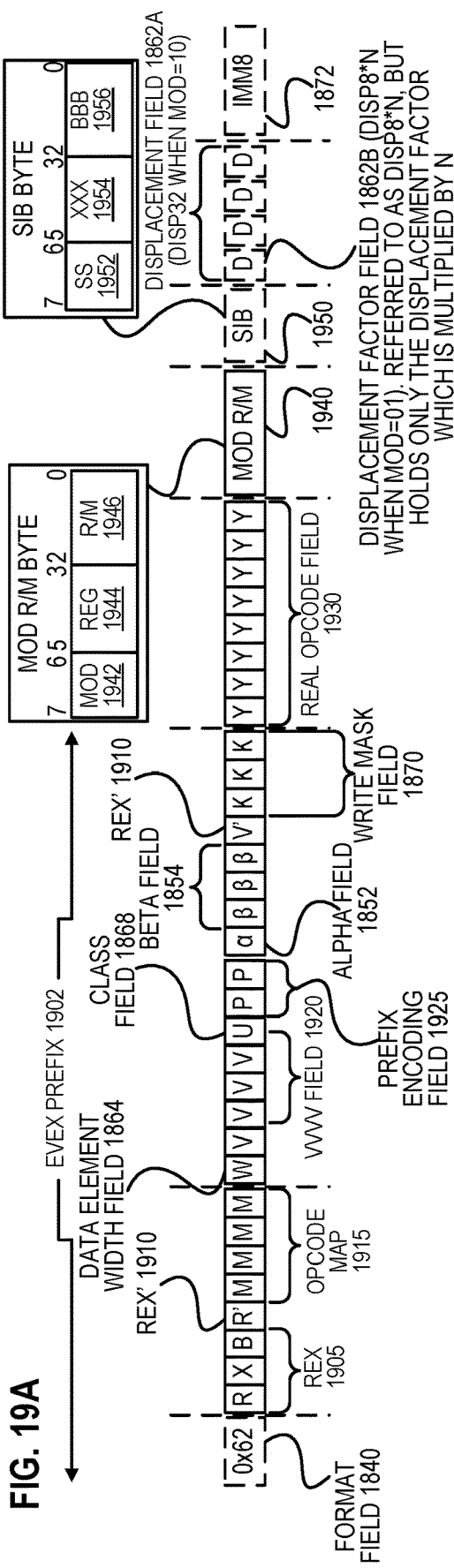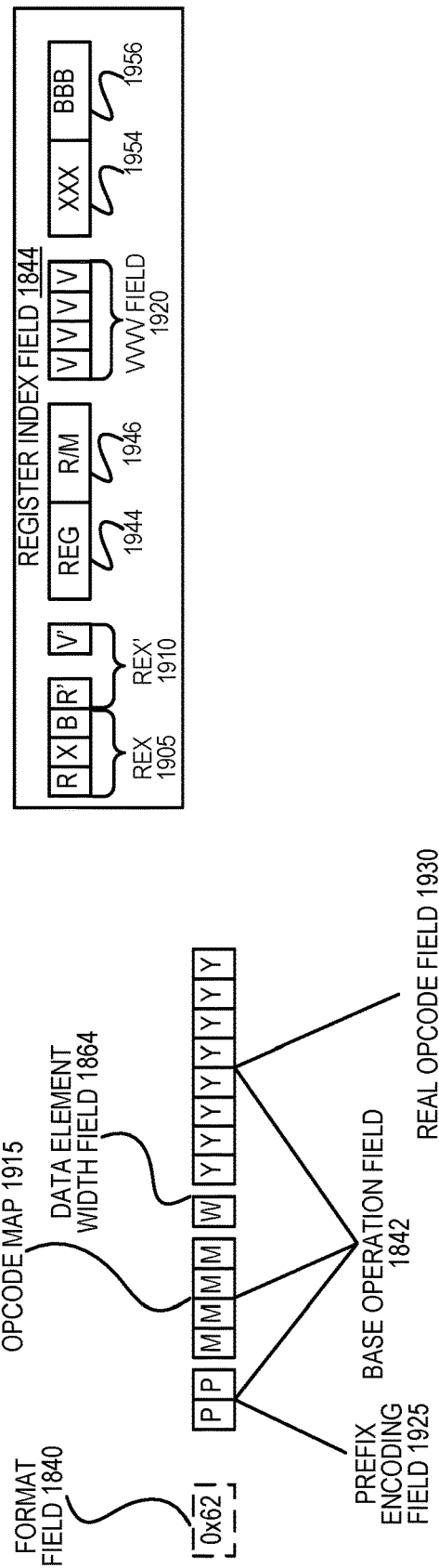

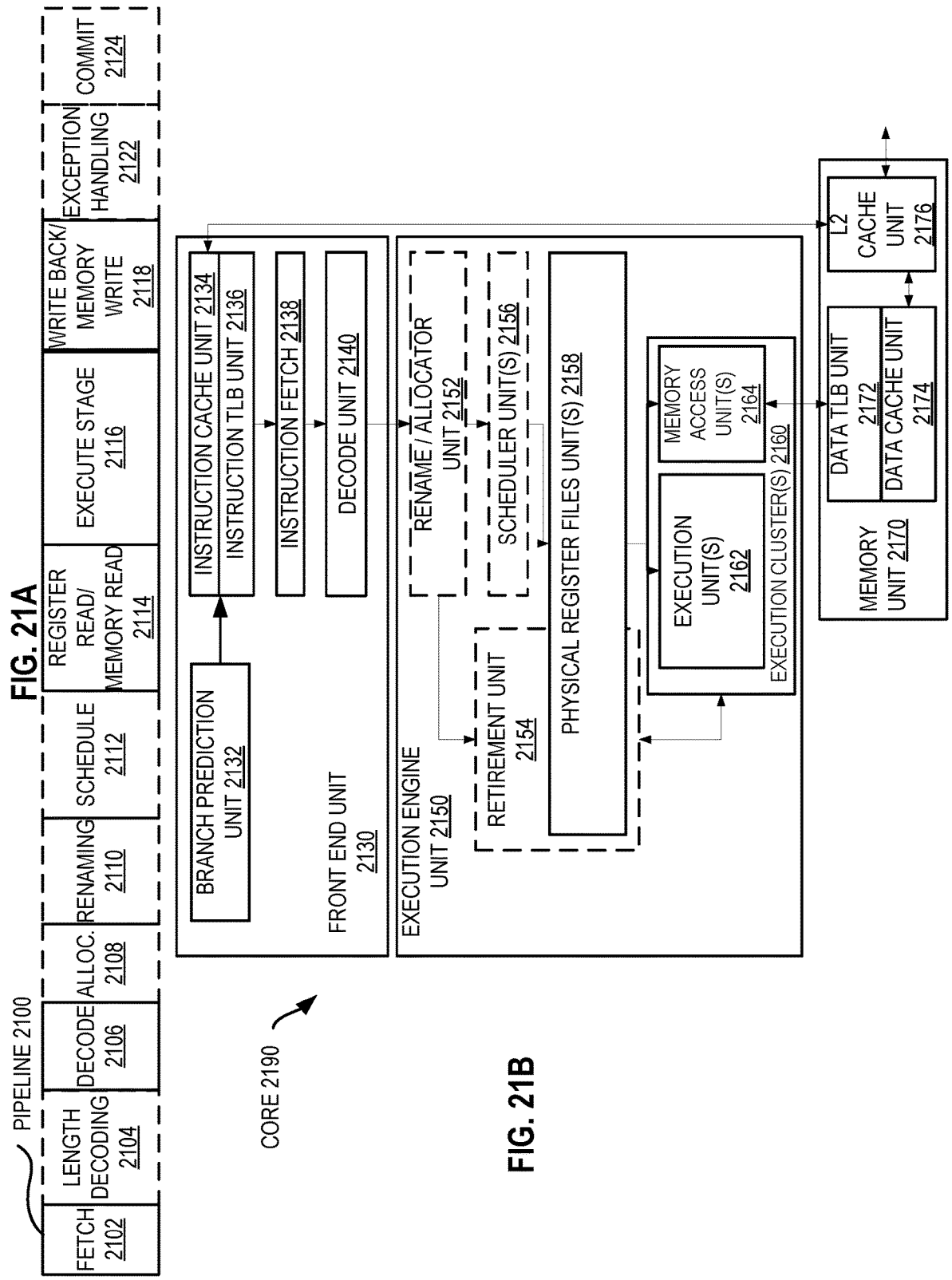

HARDWARE ACCELERATORS AND METHODS FOR HIGH-PERFORMANCE AUTHENTICATED ENCRYPTION

TECHNICAL FIELD

The disclosure relates generally to electronics, and, more specifically, an embodiment of the disclosure relates to a hardware accelerator to perform an encryption operation.

BACKGROUND

A processor, or set of processors, executes instructions from an instruction set, e.g., the instruction set architecture (ISA). The instruction set is the part of the computer architecture related to programming, and generally includes the native data types, instructions, register architecture, addressing modes, memory architecture, interrupt and exception handling, and external input and output (I/O). It should be noted that the term instruction herein may refer to a macro-instruction, e.g., an instruction that is provided to the processor for execution, or to a micro-instruction, e.g., an instruction that results from a processor's decoder decoding macro-instructions.

BRIEF DESCRIPTION OF THE DRAWINGS

The present disclosure is illustrated by way of example and not limitation in the figures of the accompanying drawings, in which like references indicate similar elements and in which:

FIG. 6 illustrates a ChaCha quarter round circuit according to embodiments of the disclosure.

FIG. 16 illustrates a critical data path of the hardware accelerator in FIG. 15 according to embodiments of the disclosure.

FIG. 17 illustrates a flow diagram according to embodiments of the disclosure.

FIG. 19A is a block diagram illustrating fields for the generic vector friendly instruction formats in FIGS. 18A and 18B according to embodiments of the disclosure.

FIG. 19B is a block diagram illustrating the fields of the specific vector friendly instruction format in FIG. 19A that make up a full opcode field according to one embodiment of the disclosure.

FIG. 19C is a block diagram illustrating the fields of the specific vector friendly instruction format in FIG. 19A that make up a register index field according to one embodiment of the disclosure.

FIG. 21A is a block diagram illustrating both an exemplary in-order pipeline and an exemplary register renaming, out-of-order issue/execution pipeline according to embodiments of the disclosure.

FIG. 21B is a block diagram illustrating both an exemplary embodiment of an in-order architecture core and an exemplary register renaming, out-of-order issue/execution architecture core to be included in a processor according to embodiments of the disclosure.

DETAILED DESCRIPTION

Figure 1:
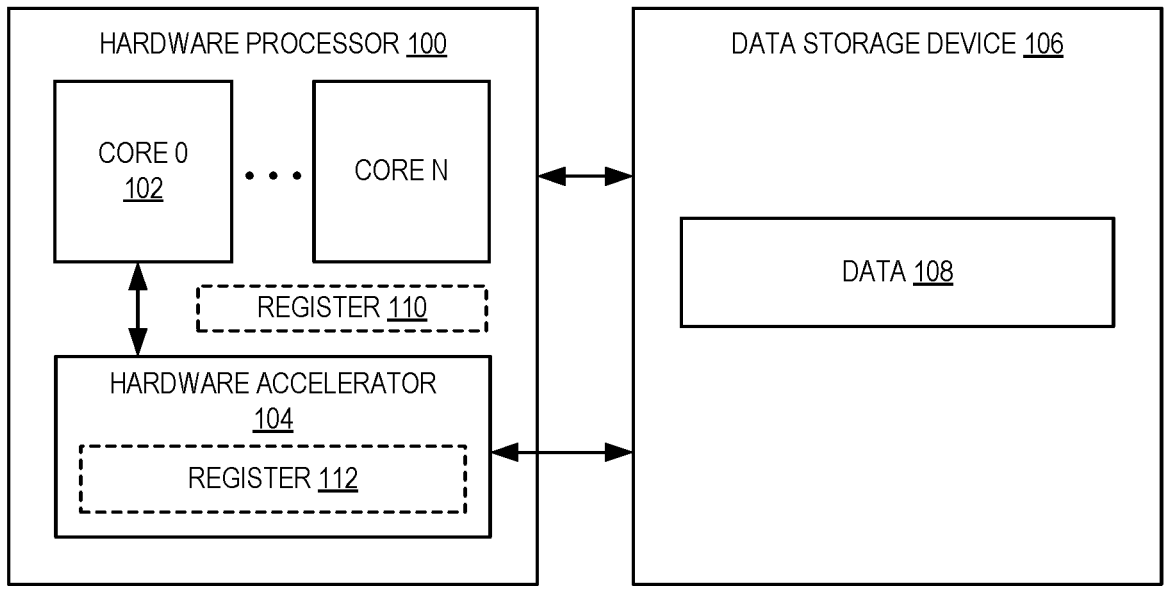
FIG. 1 illustrates a hardware processor including a plurality of cores and a hardware accelerator according to embodiments of the disclosure.

In the following description, numerous specific details are set forth. However, it is understood that embodiments of the disclosure may be practiced without these specific details. In other instances, well-known circuits, structures and techniques have not been shown in detail in order not to obscure the understanding of this description.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

A (e.g., hardware) processor (e.g., having one or more cores) may execute instructions (e.g., a thread of instructions) to operate on data, for example, to perform arithmetic, logic, or other functions. For example, software may request an operation and a hardware processor (e.g., a core or cores thereof) may perform the operation in response to the request. In one embodiment, a processor is coupled to an (e.g., on die or off die) accelerator (e.g., an offload engine) to perform one or more (e.g., offloaded) operations, for example, instead of those operations being performed only on the processor. In one embodiment, a processor includes an (e.g., on die) accelerator (e.g., an offload engine) to perform one or more operations, for example, instead of those operations being performed only on the processor.

A non-limiting example of an operation is an encryption operation (e.g., for encryption and/or decryption). An encryption operation may include encrypting the intended information or message (e.g., which may be referred to as plaintext) using an encryption standard (e.g., which may be referred to as an encryption cipher) to generate ciphertext that can be read only if decrypted. An encryption standard may use a pseudo-random encryption key generated according to the encryption standard. An encryption standard may include one or more of an Advanced Encryption Standard (AES) (for example, implemented in the Galois Counter Mode (GCM)), ChaCha (for example, ChaChaX, where X is the number of rounds, e.g., ChaCha20 would be 20 rounds, i.e., 80 quarter rounds) encryption standard (e.g., stream cipher), Poly-1305 AEAD, Blake (e.g., Blake2, Blake2b, or Blake2s), or an (e.g., future) encryption standard based on any of those standards. An encryption standard may be the encryption standard (e.g., cipher) used for Authenticated Encryption with Additional Data (AEAD) in the Transport Layer Security (TLS) protocol, e.g., used by one or more internet browsers. An encryption operation may include determining an (e.g., ChaCha) encryption key and/or (e.g., Blake) state for an encryption operation. A Poly or Blake type of hashing algorithm may be used in certain embodiments, for example, a Blake type may use ChaCha stream cipher to perform a hash and/or a Poly type may be used along with ChaCha for authenticated encryption.

In one embodiment, an accelerator may perform an encryption operation, for example, in response to a request to and/or for a processor (e.g., a central processing unit (CPU)) to perform that operation. An accelerator may couple to (e.g., on die with an accelerator or off die) one or more storage devices to store data, e.g., the input data and/or the output data. In one embodiment, an accelerator receives encryption input data (e.g., including an input key) and outputs a resultant (for example, an output key (e.g., keystream) or state). A processor may execute an instruction to offload an operation or operations (e.g., an instruction, a thread of instructions, or other work) to an accelerator. A processor may take a resultant (e.g., output key or state) from an accelerator and perform further actions using the resultant, e.g., to generate an encrypted message (e.g., ciphertext). In one embodiment, the output key (e.g., keystream) is exclusive-ORed (XORed) with the plaintext to produce as a resultant the encrypted message (e.g., ciphertext).

Certain embodiments herein allow for the acceleration (e.g., via acceleration hardware of one or more encryption operations (e.g., including accelerating operations according to the ChaCha and/or Blake stream encryption standards) to significantly improve the performance of authenticated encryption. Certain embodiments herein are directed to a (e.g., configurable) hardware accelerator for performing encryption operation(s) according to an (e.g., ChaCha) encryption standard with a performance optimization, e.g., compared to performing the encryption operations with software and/or micro-code. Certain embodiments herein are directed to a (e.g., configurable) hardware accelerator for performing encryption operation(s) according to an (e.g., ChaCha) encryption standards with a (e.g., 15%) performance optimization using delayed column/diagonal state alignment techniques, e.g., as compared to not using the delayed column/diagonal state alignment techniques. In certain embodiments, a hardware accelerator is extended to support additional features such as a variable number of (e.g., ChaCha) rounds and/or support (e.g., Blake) cryptographic hash functions (e.g., using shared circuitry).

Certain embodiments herein perform an encryption operation(s) with a hardware accelerator instead of using software or micro-code. Certain embodiments herein provide for acceleration of encryption operations (e.g., including multiple (e.g., serial) additions) with a desired throughput that cannot me be with a software and/or micro-code implementation. Certain embodiments herein are directed to a configurable hardware accelerator with optimized data path(s) to perform a portion of a round (e.g., one quarter round (Qround)) of an encryption standard (e.g., the ChaCha encryption standard) per clock cycle. In certain embodiments, the hardware accelerator is configured for a variable number of rounds, e.g., with 20 being the default (in ChaCha-20 mode). In certain embodiments, the hardware accelerator is configured to accelerate a (e.g., Blake) hash function, for example, by leveraging the similarities of the Blake round function to the ChaCha Qround operation. In one embodiment of a hardware accelerator for ChaCha20 encryption standard, the hardware accelerator only imparts a latency of less than about 80 cycles and/or provides an encryption throughput of about 5.3 Gbps (e.g., a 10× increase in performance over a software implementation), resulting in significant performance gains. Certain embodiments of a hardware accelerator according to the disclosure herein employ a dedicated Qround computation circuitry for the ChaCha encryption standard, which may be used along with column/diagonal state alignment techniques to further improve performance. Certain embodiments herein provide for a fully-synthesizable hardware accelerator design that may be scaled for parallel (e.g., Qround) operations to obtain further gains in throughput. Certain embodiments of a hardware accelerator may be used to perform variants of the ChaCha encryption standard with increased or decreased number of rounds, making the hardware flexible for low-level software implementations. With minimal changes, certain embodiments herein provide support for Blake round computations to obtain a 10× performance improvement in implementing the Blake hash function over a software implementation.

FIG. 1 illustrates a hardware processor 100 including a plurality of cores (0 to N, where N may be 1 or more) and a hardware accelerator 104 according to embodiments of the disclosure. Hardware processor 100 (e.g., accelerator 104 and/or core(s) thereof) may be coupled to a data storage device 106 (e.g., memory). In one embodiment, memory may be dynamic random access memory (DRAM), private (e.g., private to an accelerator) random access memory (RAM), cache memory, or system memory. Although a single hardware accelerator 104 is depicted, a plurality of hardware accelerators (e.g., 0 to M) may be utilized. Although a plurality of cores are depicted, a single core may be utilized, e.g., core 0 (102). A hardware accelerator may be a hardware encryption and/or decryption circuit.

A processor 100 (e.g., core 102) may receive a request (e.g., from software) to perform an encryption (which may include decryption) operation and may offload (e.g., at least part of) the encryption operation (e.g., thread) to hardware accelerator 104. Cores, accelerator(s), and data storage device 106 may communicate (e.g., be coupled) with each other. Arrows indicate two way communication (e.g., to and from a component), but one way communication may be used. In one embodiment, a (e.g., each) core may communicate (e.g., be coupled) with the data storage device 106, e.g., to access data 108. In one embodiment, an (e.g., each) accelerator may communicate (e.g., be coupled) with the data storage device 106, e.g., to access data 108. Data 108 may be encryption data (e.g., as discussed in reference to FIG. 5). In the depicted embodiment, hardware accelerator 104 is within hardware processor 100. Hardware accelerator 104 may include any of the circuitry discussed herein. Hardware processor 100 may include one or more registers (e.g., register 110 separate from hardware accelerator 104). Register 110 may store encryption data (e.g., as discussed in reference to FIG. 5). Hardware accelerator 104 may include one or more registers (e.g., register 112 separate from core(s)). Register 112 may store encryption data (e.g., as discussed in reference to FIG. 5). Register 112 of hardware accelerator 104 may be loaded with the encryption data (e.g., by a core or cores of hardware processor 100), for example, prior to the hardware accelerator 104 performing the encryption operation.

Figure 2:
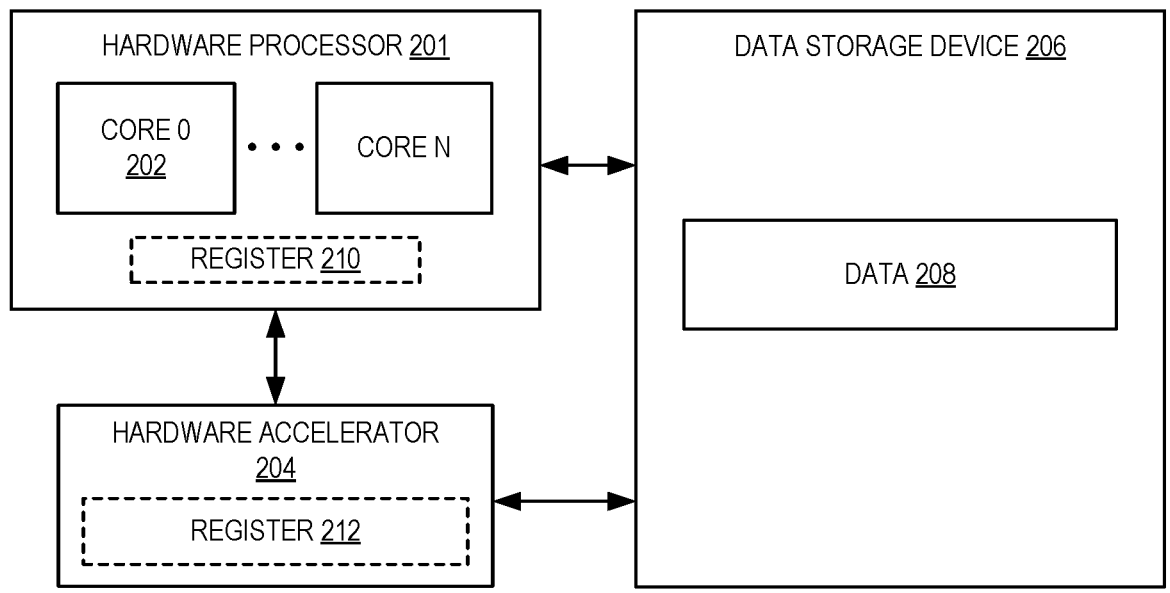
FIG. 2 illustrates a system including a hardware processor and a hardware accelerator according to embodiments of the disclosure.

FIG. 2 illustrates a system 200 including a hardware processor 201 and a hardware accelerator 204 according to embodiments of the disclosure. In one embodiment, hardware accelerator 204 is on die with hardware processor 201. In one embodiment, hardware accelerator 204 is off die of hardware processor 201. In one embodiment, system 200 including at least hardware processor 201 and hardware decompression accelerator 204 are a system-on-a-chip (SOC). Hardware processor 201 (e.g., core 202) may receive a request (e.g., from software) to perform a decompression (e.g., deflate) thread (e.g., operation) and may offload (e.g., at least part of) the decompression thread (e.g., operation) to a hardware accelerator (e.g., hardware decompression accelerator 204). Hardware processor 201 may include one or more cores (0 to N). In one embodiment, each core may communicate with (e.g., be coupled to) hardware accelerator 204. In one embodiment, each core may communicate with (e.g., be coupled to) one of multiple hardware decompression accelerators. Core(s), accelerator(s), and data storage device 206 may communicate (e.g., be coupled) with each other. Arrows indicate two way communication (e.g., to and from a component), but one way communication may be used. In one embodiment, a (e.g., each) core may communicate (e.g., be coupled) with the data storage device 206, for example, to access (e.g., load and/or store) data 208. In one embodiment, an (e.g., each) accelerator 204 may communicate (e.g., be coupled) with the data storage device 206, for example, to access (e.g., load and/or store) data 208. Data 208 may be encryption data (e.g., as discussed in reference to FIG. 5). Hardware accelerator 204 may include any of the circuitry discussed herein. Hardware processor 201 may include one or more registers (e.g., register 210). Register 210 may store encryption data (e.g., as discussed in reference to FIG. 5). Hardware accelerator 204 may include one or more registers (e.g., register 212). Register 212 may store encryption data (e.g., as discussed in reference to FIG. 5). Register 212 of hardware accelerator 204 may be loaded with the encryption data (e.g., by hardware processor 201), for example, prior to the hardware accelerator 204 performing the encryption operation. Hardware accelerators may be provided for a particular encryption standard or standards.

Figure 3:
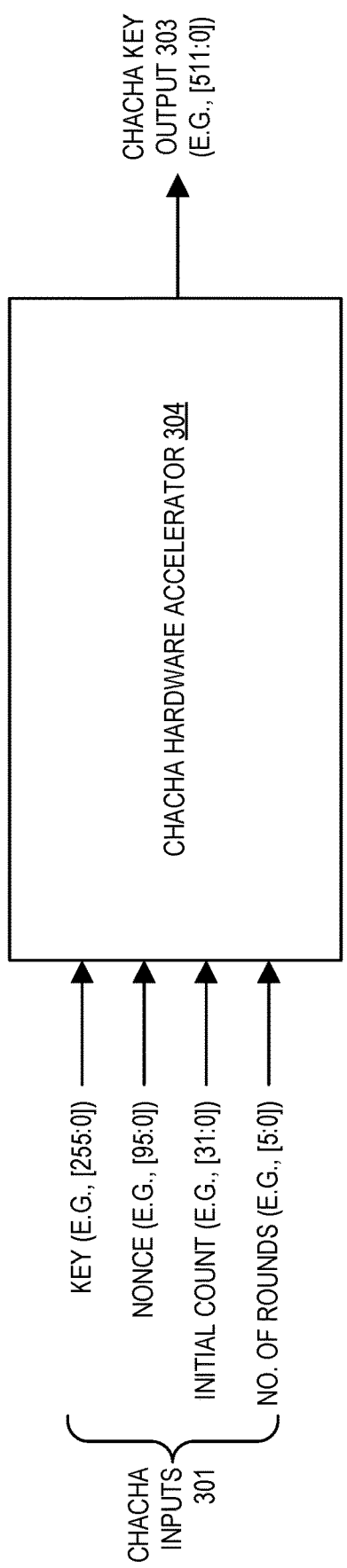
FIG. 3 illustrates a ChaCha hardware accelerator according to embodiments of the disclosure.

FIG. 3 illustrates a ChaCha hardware accelerator 304 according to embodiments of the disclosure. Depicted hardware accelerator 304 includes a plurality of inputs 301 (e.g., input ports) to receive ChaCha input values, that when operated on by ChaCha hardware accelerator 304, produce a ChaCha key output value on output 303 (e.g., output port). In one embodiment, input values on inputs 301 include one or more of: a (e.g., 256 bit) key, a (e.g., 96 bit) nonce (e.g., initialization) value, an (e.g., 32 bit) initial count value (e.g., constant values), and a (e.g., 6 bit) value to indicate the number of rounds the hardware accelerator 304 is to perform. Hardware accelerator 304 may include the circuitry depicted in the Figures below.

Figure 4:
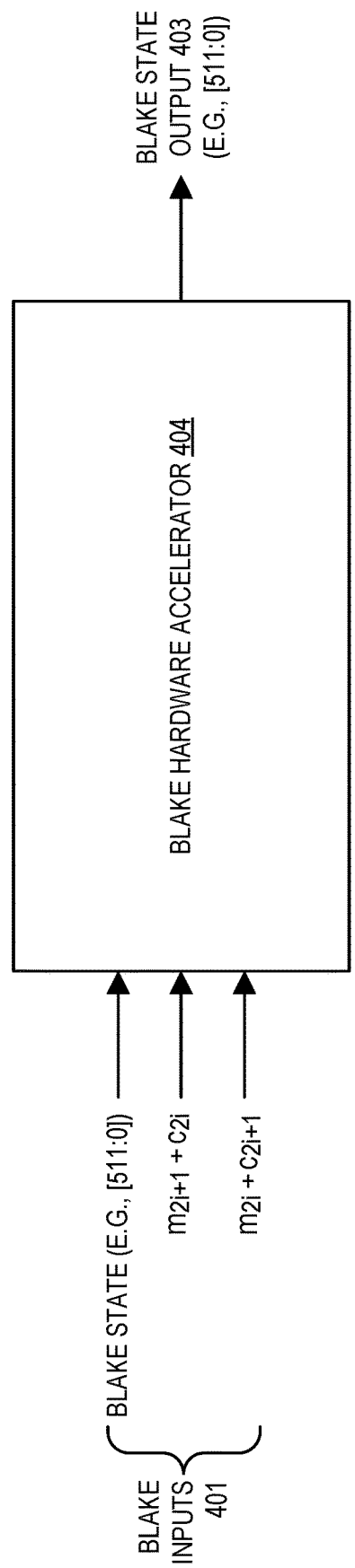
FIG. 4 illustrates a Blake hardware accelerator according to embodiments of the disclosure.

FIG. 4 illustrates a Blake hardware accelerator 404 according to embodiments of the disclosure. Depicted hardware accelerator 404 includes a plurality of inputs 401 (e.g., input ports) to receive Blake input values, that when operated on by Blake hardware accelerator 404, produce a Blake state output value on output 403 (e.g., output port). In one embodiment, input values on inputs 401 include one or more of: a (e.g., 512 bit) Blake state value, a first message plus constant value, and a second message plus constant value. Hardware accelerator 404 may include the circuitry depicted in the Figures below.

Figure 5:
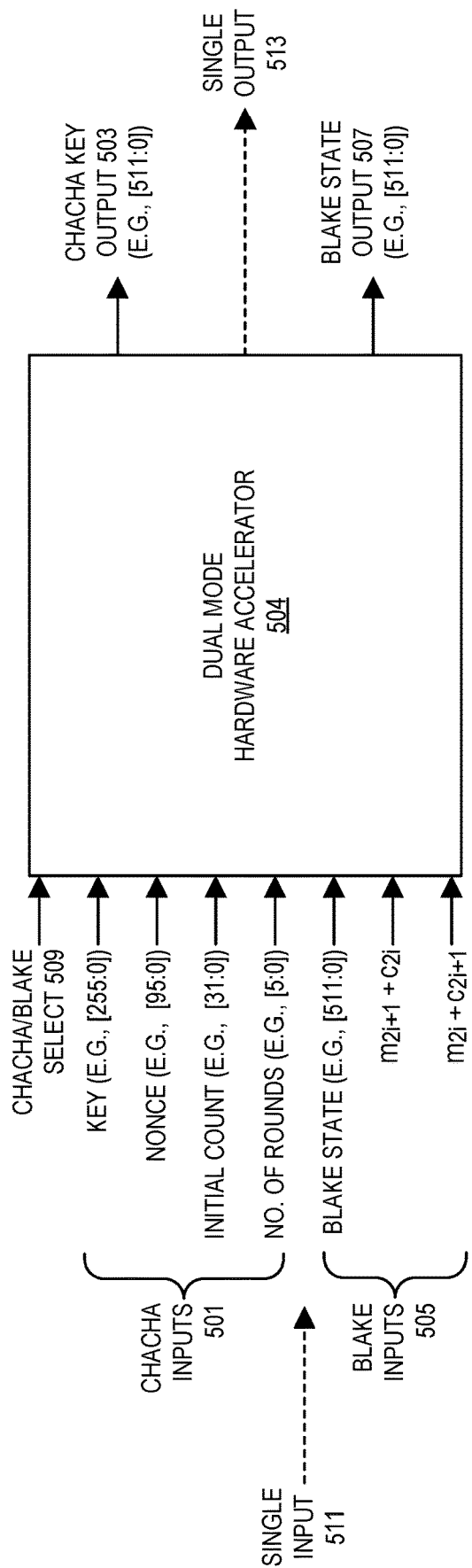
FIG. 5 illustrates a dual mode (ChaCha/Blake) hardware accelerator according to embodiments of the disclosure.

FIG. 5 illustrates a dual mode (ChaCha/Blake) hardware accelerator 504 according to embodiments of the disclosure. Depicted hardware accelerator 504 includes a plurality of inputs 501 (e.g., input ports) to receive ChaCha input values, that when operated on by hardware accelerator 504 in ChaCha mode, produce a ChaCha key output value on output 503 (e.g., output port). In one embodiment, input values on inputs 501 include one or more of: a (e.g., 256 bit) key, a (e.g., 96 bit) nonce (e.g., initialization) value, an (e.g., 32 bit) initial count value (e.g., constant values), and a (e.g., 6 bit) value to indicate the number of rounds the hardware accelerator 504 is to perform. Hardware accelerator 504 may include the circuitry depicted in the Figures below. Depicted hardware accelerator 504 also includes a plurality of inputs 505 (e.g., input ports) to receive Blake input values, that when operated on by hardware accelerator 504 in Blake mode, produce a Blake state output value on output 507 (e.g., output port). In one embodiment, input values on inputs 505 include one or more of: a (e.g., 512 bit) Blake state value, a first message plus constant value, and a second message plus constant value. Hardware accelerator 504 further includes an input 509 (e.g., input port) to receive a value (e.g., from a processor) to switch between ChaCha mode and Blake mode. Instead of utilizing two, separate inputs 501, 505 (e.g., input ports), a hardware accelerator may use a single, unified input 511 (e.g., input port). Instead of utilizing two, separate outputs 503, 507 (e.g., output ports), a hardware accelerator may use a single, unified output 513 (e.g., output port). Hardware accelerator 504 may include the circuitry depicted in the Figures below (e.g., FIG. 7).

In one embodiment, a single configuration bit on input 509 selects the mode of operation between ChaCha (e.g., stream cipher) mode and Blake (e.g., hash function) mode. In one embodiment of the ChaCha mode, the inputs include a (e.g., 256 bit) key, (e.g., 96 bit) nonce, and (e.g., 32 bit) initial count value. In certain embodiments, a (e.g., 6-bit) (e.g., configuration) value indicates the number of rounds the hardware accelerator 504 is to perform according to a ChaCha encryption standard. Certain hardware accelerator thus provide the flexibility to change (e.g., increase or decrease) the number of rounds to overcome any vulnerabilities. In one embodiment, the hardware accelerator defaults to performing 20 rounds of a ChaCha encryption standard operation. Table 1 below discusses an embodiment of ChaCha state organization.

In one embodiment, ChaCha (e.g., ChaCha20) is a stream cipher that generates a (e.g., 512-bit) key stream (e.g., from output 303 of accelerator 304 in FIG. 3 or from output 503 (or 513) of accelerator 504 in FIG. 5) for every 20 rounds of encryption. In certain embodiments, the key stream is XORed with the plaintext to obtain the ciphertext. In certain embodiments, the key stream computation works on a (e.g., 512-bit) state that is divided into elements (e.g., 16×32-bit words) and organized as a 4×4 matrix of data (e.g., 32-bit words), as shown in Table 1 below.

TABLE 1

Example ChaCha State Organization

| $C0_0$ | $C1_1$ | $C2_2$ | $C3_3$ |
|---|---|---|---|
| $K[255:224]_4$ | $K[223:192]_5$ | $K[191:160]_6$ | $K[159:128]_7$ |
| $K[127:96]_8$ | $K[95:64]_9$ | $K[63:32]_{10}$ | $K[31:0]_{11}$ |
| $BC[31:0]_{12}$ | $N[95:64]_{13}$ | $N[63:32]_{14}$ | $N[31:0]_{15}$ |

In one embodiment, the starting elements of the ChaCha state include:
1. Constants ("C0, C1, C2, and C3")—C0 to C3 are (e.g., 32-bit) constants initialized after every 20 rounds of encryption.
2. Key ("N")—The (e.g., 256-bit) secret key.
3. Block Counter ("BC")—(e.g., 32-bit) block counter that is incremented every 20 rounds of encryption.
4. Nonce ("N")—A (e.g., 96-bit) nonce or Initialization Vector.

In one embodiment, the data from Table 1 is loaded into a (e.g., single) packed data (e.g., vector) register, for example, by a hardware component that is offloading an operation utilizing the data to a hardware accelerator. Table 1 includes example element positions for each data element. Although shown in a two-dimensional matrix, the data may be stored in a single dimensional array (e.g., vector). The matrix notation is utilized herein to illustrate why some rounds (e.g., quarter rounds) are referred to as column rounds (e.g., using a subset of data from a column of the Table 1 matrix) while others are referred to as diagonal rounds (e.g., using a subset of data from a diagonal of the Table 1 matrix). A hardware accelerator may utilize the above data (e.g., data loaded into a vector register coupled to the hardware accelerator) to perform its operation(s). The hardware accelerator may utilize a (e.g., specialized) circuit to perform a round (or a portion of a round, e.g., a quarter of a round (quarter round)), for example, a ChaCha quarter round circuit as in FIG. 6 or a unified ChaCha quarter round/Blake round circuit as in FIG. 7.

An (e.g., main) operation for ChaCha encryption standards is the quarter round (ground) operation. Embodiments of a Blake cryptographic hash function may also be based on ChaCha encryption standard with a similar round operation to a ChaCha quarter round operation. A configurable accelerator can have two separate input ports for the (e.g., 512-bit) Blake input value and the (e.g., 384-bit) ChaCha input value (e.g., as shown by input 501 and input 505 in FIG. 5) or instead share a common (e.g., 512-bit) input (e.g., as shown by unified input 511 in FIG. 5), e.g., from which the key, nonce and initial counter values are extracted during ChaCha mode. Similarly, an accelerator may have two separate output ports for the two modes (e.g., as shown by output 503 and output 507 in FIG. 5) or instead share a common 512-bit output port (e.g., as shown by unified output 513 in FIG. 5). In certain embodiments, a coupling (e.g., input and output) for an accelerator (e.g., a common 512-bit input/output (I/O) bus) provides the inputs to the selected mode as well as sampled the output, e.g., at the end of the operation. An example logical circuit implementation for Qround is as shown in FIG. 6.

FIG. 6 illustrates a ChaCha quarter round circuit 600 according to embodiments of the disclosure. Depicted circuit 600 includes four inputs (e.g., input ports) (602, 604, 606, and 608) to receive four inputs values, respectively (e.g., referred to as values A, B, C, D herein). Depicted circuit 600 includes four outputs (e.g., output ports) (652, 654, 656, and 658) to output four outputs values, respectively (e.g., referred to as values $A_{new}$, $B_{new}$, $C_{new}$ and $D_{new}$ herein). In one embodiment, circuit 600 performs its computation (e.g., according to an encryption standard) in a single cycle (e.g., cycle of the accelerator). Circuit 600 includes a data path A from input 602 to output 652, a data path B from input 604 to output 654, a data path C from input 606 to output 656, and a data path D from input 608 to output 658. Data path A includes an adder 610 (e.g., modular adder) coupled to input 602 and input 604 to add value A and value B and provide that as a resultant on its output. Output of adder 610 is coupled to a first input of adder 612 (e.g., modular adder) and second input of adder 612 is coupled to the output of rotate circuit 616 of data path B to add those input values and provide that as a resultant $A_{new}$ on its output 652. Data path B includes a logical XOR circuit 614 coupled to input 604 and an output from adder 622 in data path C to XOR those values and provide that as a resultant on its output. Output of logical XOR circuit 614 is coupled to input of (e.g., 12 bit, left) rotate circuit 616 to rotate that value (e.g., 12 bits to the left) and provide that as a resultant on its output. Output of rotate circuit 616 is coupled to a first input of logical XOR circuit 618 and a second input of logical XOR circuit 618 is coupled to the output of adder 624 in data path C to add those values and provide that as a resultant on its output. Output of logical XOR circuit 618 is coupled to input of (e.g., 7 bit, left) rotate circuit 620 to rotate that value (e.g., 7 bits to the left) and provide that as a resultant $B_{new}$ on its output 654. Data path C includes an adder 622 (e.g., modular adder) coupled to input 606 and output of rotate circuit 628 of data path D to add those values and provide that as a resultant on its output. Output of adder 622 is coupled to a first input of adder 624 (e.g., modular adder) and second input of adder 624 is coupled to the output of rotate circuit 632 of data path D to add those input values and provide that as a resultant $C_{new}$ on its output 656. Data path D includes a logical XOR circuit 626 coupled to input 608 and output from adder 610 in data path A to XOR those values and provide that as a resultant on its output. Output of logical XOR circuit 626 is coupled to input of (e.g., 16 bit, left) rotate circuit 628 to rotate that value (e.g., 16 bits to the left) and provide that as a resultant on its output. Output of rotate circuit 628 is coupled to a first input of logical XOR circuit 630 and a second input of logical XOR circuit 630 is coupled to the output of adder 612 in data path A to add those values and provide that as a resultant on its output. Output of logical XOR circuit 630 is coupled to input of (e.g., 8 bit, left) rotate circuit 632 to rotate that value (e.g., 8 bits to the left) and provide that as a resultant $D_{new}$ on its output 658.

In certain embodiments, a modular adder outputs the actual resultant for the resultant X when X is less than (or equal to) the modulus (e.g., a modulus of $2^{32}$ or $2^{64}$) and output X=X-modulus (e.g., a modulus of $2^{32}$ or $2^{64}$) otherwise. In certain embodiments, a logical XOR circuit outputs a true value (e.g., a one) only when its inputs differ (one is true, the other is false), and otherwise outputs a false value (e.g., a zero). In one embodiment, a logical XOR circuit is an XOR gate or other logic circuit implementation. In certain embodiments, a rotate circuit is to perform a circular shift on its input value (e.g., a plurality of bits) without discarding any bits (e.g., the wrap around from one end to the other instead of being discarded). A rotate circuit may perform a right rotate or left rotate for a given number of bits, e.g., rotate circuit 616 in FIG. 6 is perform a left rotate of 12 bits, for example, based on a control value from a control circuit. In certain embodiments, a shift circuit is to perform a shift on its input value (e.g., a plurality of bits) and discarding any bits that fall off from an end.

In certain embodiments, the Qround circuit 600 operates on 4 (e.g., 32-bit each) inputs named A, B, C, D and consists of four serial addition (modulo $2^{32}$), XOR and rotate operations. The output of Qround circuit 600 in this embodiment is four newly computed (e.g., 32-bit) values $A_{new}$, $B_{new}$, $C_{new}$ and $D_{new}$ that are used to update the input elements of the ChaCha state. In one embodiment, a control circuit is control circuit 806 in FIG. 8.

Figure 7:
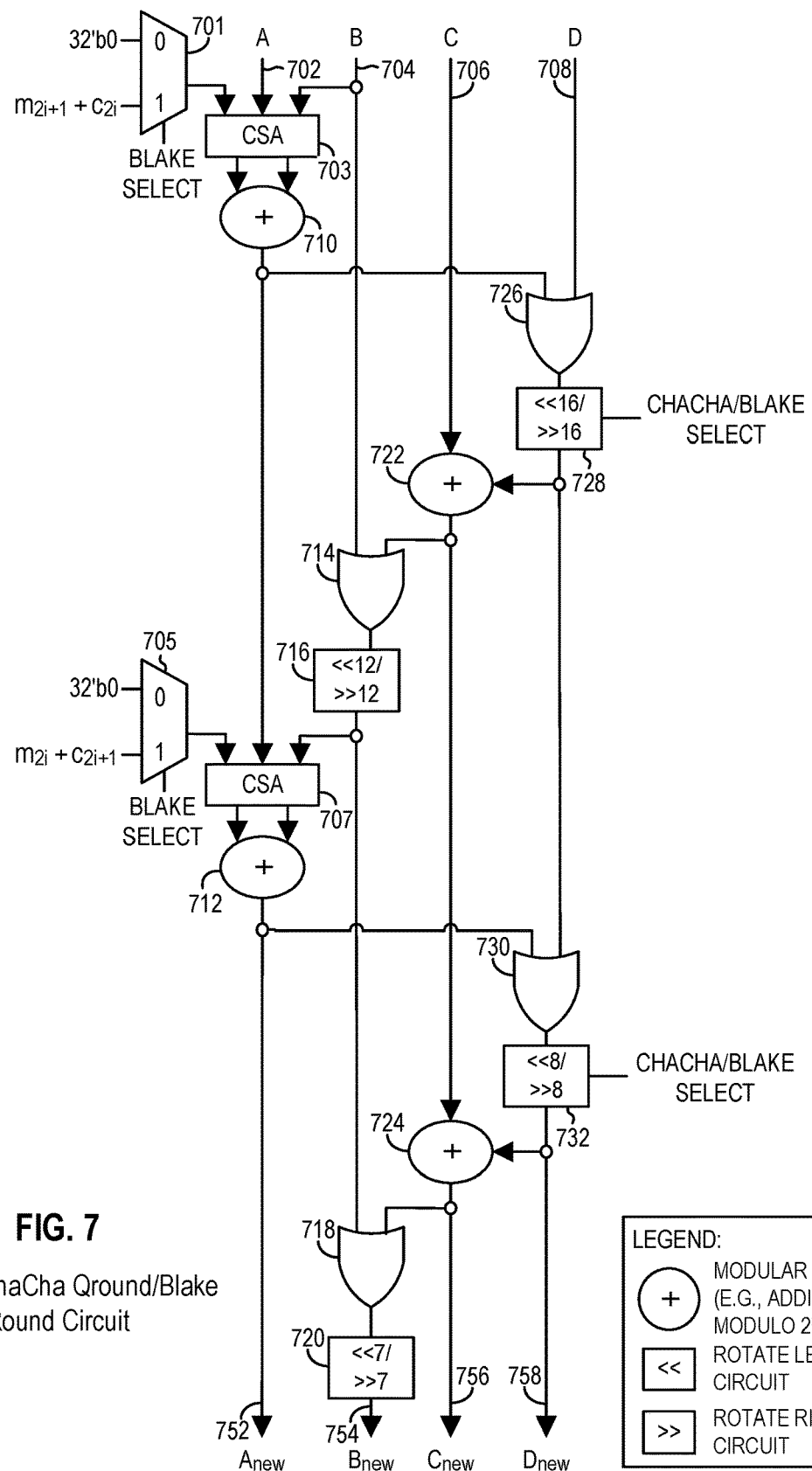
FIG. 7 illustrates a unified ChaCha quarter round and Blake round circuit according to embodiments of the disclosure.

FIG. 7 illustrates a unified ChaCha quarter round and Blake round circuit 700 according to embodiments of the disclosure. Depicted circuit 700 includes four inputs (e.g., input ports) (702, 704, 706, and 708) to receive four inputs values, respectively (e.g., referred to as values A, B, C, D herein). In contrast to circuit 600 in FIG. 6, depicted circuit 700 further includes multiplexer 701, adder 703 (e.g., carry-save adder for adding three or more inputs), multiplexer 705, adder 707 (e.g., carry-save adder for adding three or more inputs), and the control lines to control the multiplexers. Depicted multiplexer 701 is to select one of the first subset (e.g., 32 bits) of Blake state (e.g., 32'b0) and a first message+constant as its output, for example, see FIG. 5. A control line (Blake select) is to select from those inputs, e.g., by a value provided by a control circuit (e.g., control circuit 806 in FIG. 8). Depicted multiplexer 701 is to select one of the first subset (e.g., 32 bits) of Blake state (e.g., 32'b0) and a second message+constant as its output, for example, see FIG. 5. A control line (Blake select) is to select from those inputs, e.g., by a value provided by a control circuit (e.g., control circuit 806 in FIG. 8). Depicted circuit 700 includes four outputs (e.g., output ports) (752, 754, 756, and 758) to output four outputs values, respectively (e.g., referred to as values $A_{new}$, $B_{new}$, $C_{new}$ and $D_{new}$ herein). In one embodiment, circuit 700 performs its computation (e.g., according to an encryption standard) in a single cycle (e.g., cycle of the accelerator). Circuit 700 includes a data path A from input 702 to output 752, a data path B from input 704 to output 754, a data path C from input 706 to output 756, and a data path D from input 708 to output 758. Data path A includes a multiplexer 701 that is to select one of the first subset (e.g., 32 bits) of Blake state (e.g., 32'b0) and a first message+constant as its output. Output of multiplexer 701 is coupled to adder 703 (e.g., carry-save adder (CSA) for adding three or more inputs) as a first input, and input 702, and input 704 are also coupled to adder 703 to add those values and provide that as a resultant. Carry and save outputs of CSA adder 703 may be input to adder 710 (e.g., modular adder) and adder 710 is to provide that as a resultant on its output.

In one embodiment, in ChaCha mode only two values (A and B) are added, but, in Blake mode, three values are to be added. In certain embodiments, circuit 700 includes a carry save adder (e.g., CSA adder 703) to add those three value terms to generate both a sum value and a carry value. The sum value and carry value may be added by adder 710 to complete the addition and obtain the final sum. In certain embodiments, in ChaCha mode, one of the three inputs to CSA adder 703 is zero and the output of CSA adder 703 is thus the sum value/carry value of A+B, which are added together by adder 710 to obtain the value of A added to B.

Data path A also includes a multiplexer 705 that is to select one of the first subset (e.g., 32 bits) of Blake state (e.g., 32'b0) and a second, different message+constant as its output. Output of multiplexer 705 is coupled to adder 707 (e.g., carry-save adder for adding three or more inputs) as a first input, a second input of adder 707 is coupled to the output from adder 710, and a third input of adder 707 is coupled to output of (e.g., 12 bit, left or right) rotate circuit 716 to add those values and provide that as a resultant.

In one embodiment, in ChaCha mode only two values (A and B) are added, but, in Blake mode, three values are to be added. In certain embodiments, circuit 700 includes another carry save adder (e.g., CSA adder 707) to add three value terms to generate both a sum value and a carry value. The sum value and carry value may be added by adder 712 to complete the addition and obtain the final sum. In certain embodiments, in ChaCha mode, one of the three inputs to CSA adder 707 is zero and the output of CSA adder 707 is thus the sum value/carry value of A+B, which are added together by adder 712 to obtain the value of A added to B.

Output of adder 712 is coupled to a first input of logical XOR circuit 730 in data path D and is provided as a resultant $A_{new}$ on its output 752. Data path B includes a logical XOR circuit 714 coupled to input 704 and an output from adder 722 in data path C to XOR those values and provide that as a resultant on its output. Output of logical XOR circuit 714 is coupled to input of (e.g., 12 bit, left or right) rotate circuit 716 to rotate that value (e.g., 12 bits to the left or right, respectively) and provide that as a resultant on its output. Output of rotate circuit 716 is coupled to a first input of logical XOR circuit 718 and a second input of logical XOR circuit 718 is coupled to the output of adder 724 in data path C to add those values and provide that as a resultant on its output. Output of logical XOR circuit 718 is coupled to input of (e.g., 7 bit, left or right) rotate circuit 720 to rotate that value (e.g., 7 bits to the left or right, respectively) and provide that as a resultant $B_{new}$ on its output 754. Data path C includes an adder 722 (e.g., modular adder) coupled to input 706 and output of rotate circuit 728 of data path D to add those values and provide that as a resultant on its output. Output of adder 722 is coupled to a first input of adder 724 (e.g., modular adder) and second input of adder 724 is coupled to the output of rotate circuit 732 of data path D to add those input values and provide that as a resultant $C_{new}$ on its output 756. Data path D includes a logical XOR circuit 726 coupled to input 708 and output from adder 710 in data path A to XOR those values and provide that as a resultant on its output. Output of logical XOR circuit 726 is coupled to input of (e.g., 16 bit, left or right) rotate circuit 728 to rotate that value (e.g., 16 bits to the left or right, respectively) and provide that as a resultant on its output. Output of rotate circuit 728 is coupled to a first input of logical XOR circuit 730 and a second input of logical XOR circuit 730 is coupled to the output of adder 712 in data path A to add those values and provide that as a resultant on its output. Output of logical XOR circuit 730 is coupled to input of (e.g., 8 bit, left or right) rotate circuit 732 to rotate that value (e.g., 8 bits to the left or right, respectively) and provide that as a resultant $D_{new}$ on its output 758.

In certain embodiments, a modular adder outputs the actual resultant for the resultant X when X is less than (or equal to) the modulus (e.g., a modulus of 2^32 or 2^64) and output X=X-modulus (e.g., a modulus of 2^32 or 2^64) otherwise. In certain embodiments, a logical XOR circuit outputs a true value (e.g., a one) only when its inputs differ (one is true, the other is false), and otherwise outputs a false value (e.g., a zero). In one embodiment, a logical XOR circuit is an XOR gate or other logic circuit implementation. In certain embodiments, a rotate circuit is to perform a circular shift on its input value (e.g., a plurality of bits) without discarding any bits (e.g., the wrap around from one end to the other instead of being discarded). A rotate circuit may perform a right rotate or left rotate for a given number of bits, e.g., rotate circuit 716 in FIG. 7 is perform a left rotate of 12 bits, for example, based on a control value from a control circuit. In certain embodiments, a shift circuit is to perform a shift on its input value (e.g., a plurality of bits) and discarding any bits that fall off from an end.

In certain embodiments, in Blake mode the circuit 700 includes inputs of 4 (e.g., x32-bit) values A through D, that go through similar operations as the Qround. However, in certain embodiments, the input message to the hash function and a round constant are also added to the round function state A twice during the round operation and/or all the rotate left operations in ChaCha are replaced by a rotate right operation in the Blake round function.

In the Blake mode, the (e.g, 512-bit) state and the two additional message+constant terms may be computed external (e.g., by a processor core) from the hardware accelerator (e.g., that includes the circuit 700) and provided to the accelerator as a primary input. Thus, a ChaCha Qround circuit may be extended to support the Blake round function as shown in FIG. 7. In one embodiment, the unified datapath selects between 32'b0 and message+constant depending on the mode of operation. In certain embodiments, the rotate circuits are configured to perform left or right rotate by introducing a 2:1 multiplexer at the output of each XOR function. As a result of one or more of the additional components discussed in reference to FIG. 7, embodiments of a configurable accelerator can support both ChaCha cipher and Blake hash function with minimal changes to the data paths.

Referring again to Table 1, in certain embodiments a ChaCha encryption standard (e.g., single) round operation includes four quarter rounds (Qrounds), e.g., comprising serial add, XOR and shift operations. In one embodiment, each Qround operates on four values (e.g., 32-bit values, i.e., words) chosen among the column elements or the diagonal elements of Table 1 to generate four new values (e.g., 32-bit values) to replace the Qround inputs. In certain embodiments, the first round of a ChaCha operation operates along the column data of Table 1, and the four Qrounds of the first round are:

1. Qround (0, 4, 8, 12) (e.g., the first column of Table 1 from the left)
2. Qround (1, 5, 9, 13) (e.g., the second column of Table 1 from the left)
3. Qround (2, 6, 10, 14) (e.g., the third column of Table 1 from the left)
4. Qround (3, 7, 11, 15) (e.g., the fourth column of Table 1 from the left)

In certain of those embodiments, the second round of the ChaCha operation operates on the diagonal elements of Table 1, and the four Qrounds of the second round are:

5. Qround (0, 5, 10, 15)
6. Qround (1, 6, 11, 12)
7. Qround (2, 7, 8, 13)
8. Qround (3, 4, 9, 14)

In certain of those embodiments, in subsequent rounds, the inputs to the Qround repeat through Qrounds 1-8 above (e.g., the inputs are chosen alternately along the columns and diagonal elements), for example, such that to perform twenty rounds, ten iterations of the above eight quarter rounds would be performed in that order. In certain embodiments of a ChaCha encryption standard (e.g., ChaCha20), at the end of the total number of rounds (e.g., 20 rounds for ChaCha20), the ChaCha state is added to the initial state to generate a 512-bit key stream to be XORed with the plaintext. On completion of that total number of rounds (e.g., 20 rounds) for a ChaCha operations, the ChaCha states are re-initialized (e.g., according to Table 1 and the associated text) with the constant, key, nonce and an incremented value of the block counter (BC). In certain embodiments of a Blake operation, each round function consists of 4 column steps and 4 diagonal steps, which match the 8 Qround operations in ChaCha performed across 2 rounds. Hence, the following architectural optimizations also reduce the critical path when an accelerator is operating in Blake mode.

Figure 8:
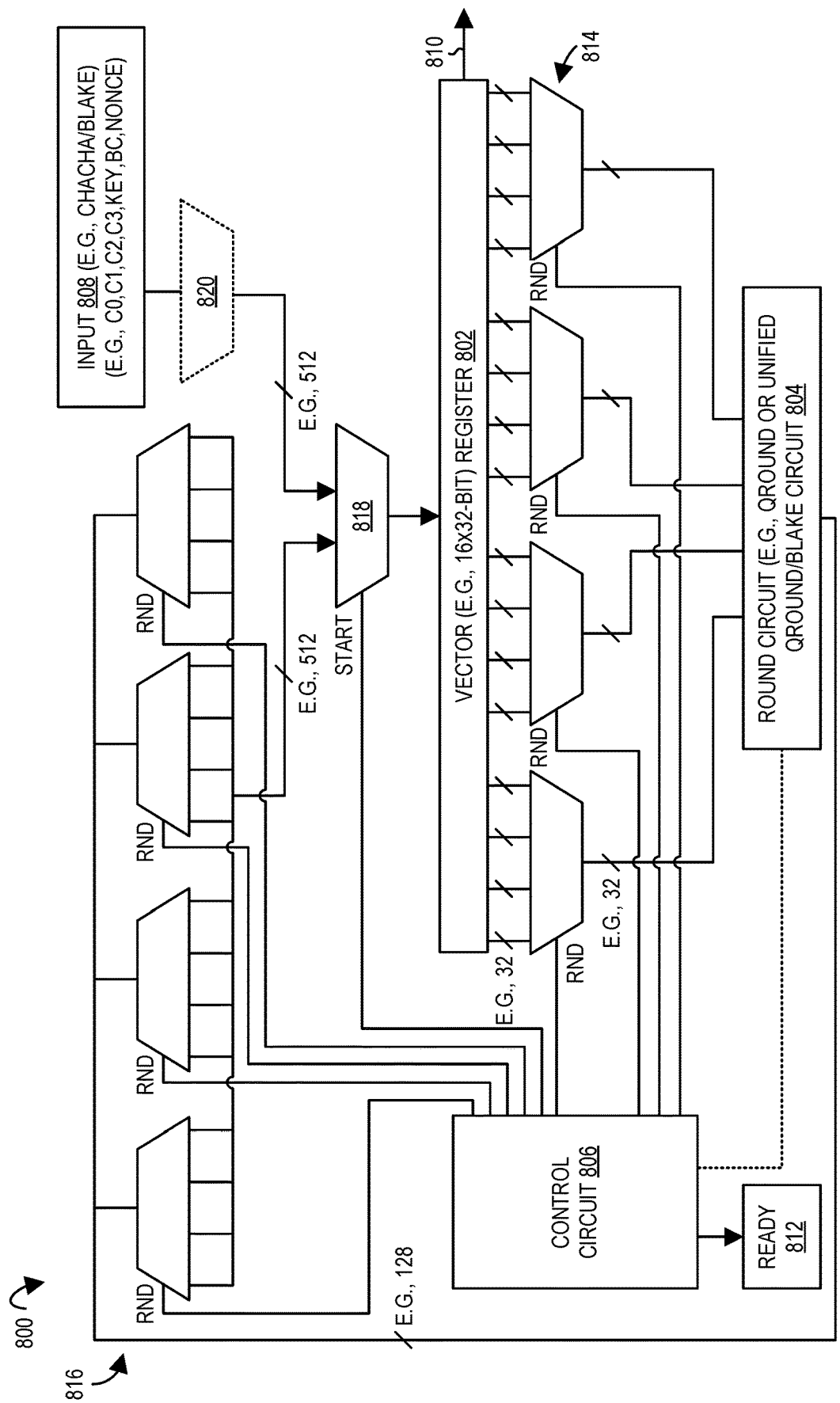
FIG. 8 illustrates circuitry of a hardware accelerator according to embodiments of the disclosure.

FIG. 8 illustrates circuitry of a hardware accelerator 800 according to embodiments of the disclosure. In one embodiment, a (e.g., vector) (e.g., 16×32-bit) register 802 stores the working state of the encryption standard (e.g., ChaCha) round. At the start of each encryption (e.g., every 20 rounds for ChaCha20), the encryption standard (e.g., ChaCha) state is initialized, e.g., to the constants, secret key, updated block count, and the nonce (e.g., according to Table 1 and the associated text). In one embodiment, that state is provided through input 808. In subsequent rounds (e.g., with each round consisting of 4 iterations) for an encryption in certain embodiments, either column or diagonal elements are chosen for the encryption standard (e.g., ChaCha) computation based on the round and iteration values. In certain embodiments, the (e.g., 4×32-bit) output of the encryption standard (e.g., ChaCha) is used the update the input elements while the remaining (e.g., 12×32-bit) states remain unchanged.

Hardware accelerator 800 includes an input 808 (e.g., input port) to receive input values, e.g., from a processor or other component that is requesting the hardware accelerator perform an encryption operation, for example, control circuit 806 sending a control value to multiplexer 818 for sourcing from input 808 before the first iteration (e.g., Qround) of the encryption and sourcing from multiplexers 816 for the other iterations of the encryption (for example, until a different input 808 is needed, e.g., every 20 rounds for ChaCha20). In one embodiment, an additional multiplexer 820 (or set of parallel multiplexers) (e.g., having at least 16 data inputs) is provided to place the (e.g., initial for an encrytpion) input values into a (e.g., any) desired order (e.g., the order discussed below in reference to FIG. 12), for example, before the first operation of a round (e.g., Qround) circuit on the input data. In one embodiment, multiplexer 818 includes multiple inputs (e.g., at least 16 inputs) to place the input values into a (e.g., any) desired order (e.g., the order discussed below in reference to FIG. 12), for example, before the first operation of a round (e.g., Qround) circuit on the input data. Hardware accelerator 800 includes an output 810 (e.g., output port) to provide output values, e.g., to the processor or other component that requested the hardware accelerator perform the encryption operation. Depicted output 810 is coupled to vector register 802, e.g., to store the input values and/or store the working state values of the encryption operation. In the depicted embodiment, control circuit 806 may send a ready value in ready storage 812 to indicate the requested encryption operation (e.g., desired number of rounds) is complete, e.g., so that the processor or other component that requested the hardware accelerator perform the encryption operation can monitor the ready storage 812 and the load the value from vector register 802 (e.g., via output 810). In one embodiment, the setting of the ready value in ready storage 812 causes the hardware accelerator 800 to send the value from vector register 802 (e.g., via output 810) to the processor or other component that requested the hardware accelerator perform the encryption operation.

In certain embodiments, a control circuit 806 is included to provide the control values (e.g., multiplexer control values) to control the (e.g., iterations) according to an encryption standard (for example, to perform Qrounds 1-8 discussed above). In one embodiment, hardware accelerator 800 includes round circuit 804 (e.g., Qround circuit 600 from FIG. 6 or unified Qround/Blake round circuit 700 from FIG. 7). Control circuit 806 may include a control line (shown as a dotted line) to round circuit 804 (e.g., to provide the rotate directions and/or values used in ChaCha quarter round circuit 600 or unified ChaCha quarter round and Blake round circuit 700, and/or provide the multiplexer inputs and control values, etc. used in unified ChaCha quarter round and Blake round circuit 700). In one embodiment, set of multiplexers 814 (e.g., which may be a single multiplexer in certain embodiments) is to switch data sources from vector register 802 to an input of round circuit 804, e.g., according to control values from control circuit 806. In one embodiment, set of multiplexers 816 (e.g., which may be a single multiplexer in certain embodiments) is to switch data sourced from round circuit 804 into vector register 802, e.g., according to control values from control circuit 806. In one embodiment, multiplexers 816 (e.g., demultiplexers) in FIG. 8 are multiplexers 916A or multiplexers 916B, e.g., when multiplexers 916A or multiplexers 916B are the same (e.g., single) circuit. In one embodiment, the control circuit 806 includes values to perform multiple cycles of a round (e.g., Qround) operation.

Figure 9:
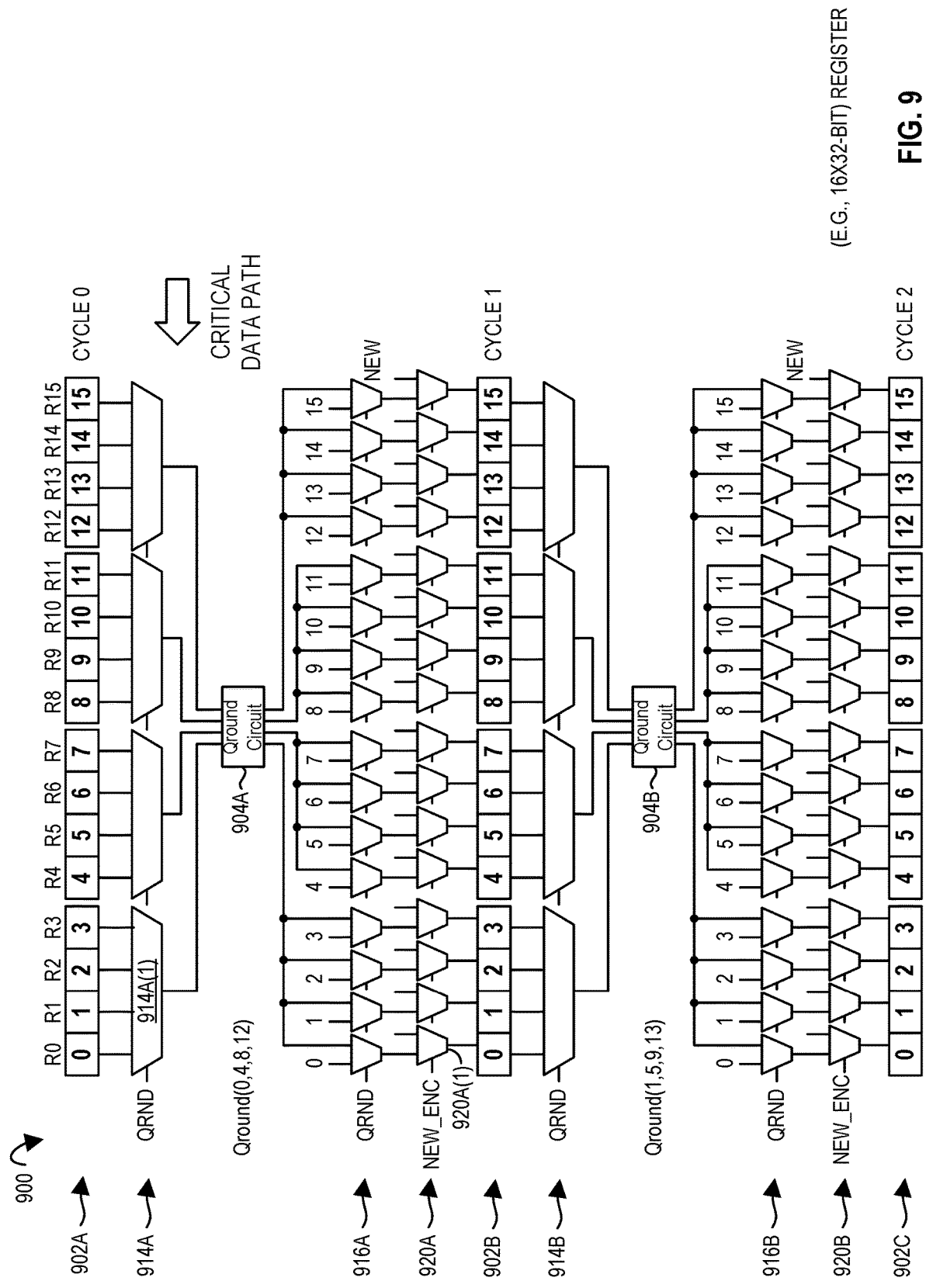
FIG. 9 illustrates multiple cycles of a round of an encryption operation of a hardware accelerator according to embodiments of the disclosure.

FIG. 9 illustrates multiple cycles (e.g., Qrounds) of a round of an encryption operation of a hardware accelerator 900 according to embodiments of the disclosure. In certain embodiments, a control circuit (e.g., control circuit 806 from FIG. 8) is included to provide the control values (e.g., multiplexer control values) to control the (e.g., iterations) according to an encryption standard (for example, to perform Qrounds 1-8 discussed above). In one embodiment, multiplexers 916A and multiplexers 916B are separate circuits. In another embodiment, multiplexers 916A and multiplexers 916B are the same circuit, e.g., such that FIG. 9 illustrates multiple iterations (e.g., Qrounds) looped through the same circuitry. In an embodiment where multiplexers 916A and multiplexers 916B are the same (e.g., single) circuit, the multiplexers may be used as multiplexers 816 (e.g., demultiplexers) in FIG. 8. In one embodiment, multiplexers 914A and multiplexers 914B are separate circuits. In another embodiment, multiplexers 914A and multiplexers 914B are the same circuit, e.g., such that FIG. 9 illustrates multiple iterations (e.g., Qrounds) looped through the same circuitry. In an embodiment where multiplexers 914A and multiplexers 914B are the same (e.g., single) circuit, the multiplexers may be used as multiplexers 814 (e.g., demultiplexers) in FIG. 8. In one embodiment, Qround circuit 904A and Qround circuit 904B are separate circuits. In another embodiment, Qround circuit 904A and Qround circuit 904B are the same circuit, e.g., such that FIG. 9 illustrates multiple iterations (e.g., Qrounds) looped through the same circuitry. In an embodiment where Qround circuit 904A and Qround circuit 904B are the same (e.g., single) circuit, the Qround circuit may be used as round circuit 804 in FIG. 8. Vector register 902A, vector register 902B, and vector register 902C (or any combination thereof) may be the same vector register. In an embodiment where vector register 902A, vector register 902B, and vector register 902C (or any combination thereof) are the same (e.g., single) register, the vector register circuit may be used as vector register 802 in FIG. 8. Note that R0-R15 illustrate an embodiment where a vector register includes 16 elements. In following embodiments, note that the numbers shown inside the elements (e.g., 0, 1, 2, and 3 in elements R0, R1, R2, and R3, respectively at cycle zero) are indicative of the values from Table 1, for example, 0 is constant C0 and 12 is BC[bits 31:0], and not the actual values themselves merely for the sake of clarity here. In certain embodiments, the vector register is to store the actual values. In one embodiment, an optional, additional set of parallel multiplexers 920A and 920B (e.g., each having at least 16 data inputs) are provided to place the (e.g., initial for an encryption) input values into a (e.g., any) desired order (e.g., the order discussed below in reference to FIG. 12), for example, before the first operation of a round (e.g., Qround) circuit on the input data. In one embodiment, multiplexers 920A and multiplexers 914B are separate circuits. In another embodiment, multiplexers 920A and multiplexers 920B are the same circuit, e.g., such that FIG. 9 illustrates multiple iterations (e.g., Qrounds) looped through the same circuitry. In an embodiment where multiplexers 920A and multiplexers 920B are the same (e.g., single) circuit, the multiplexers may be used as multiplexers 820 or multiplexer 818 in FIG. 8. In one embodiment, the new (e.g., right most input) of multiplexers 920A and/or multiplexers 920B receive input values, e.g., from a processor or other component that is requesting the hardware accelerator perform an encryption operation, for example, by a control circuit (e.g., control circuit 806 in FIG. 8) sending a control value to multiplexers 920A and/or multiplexers 920B to source data from (i) the new input (e.g., from input 808 in FIG. 8), for example, before the first iteration (e.g., Qround) of the encryption and/or (ii) to source data from multiplexers 916A and/or multiplexers 916B, respectively, for the other iterations of the encryption (for example, until a different "new" input is needed, e.g., every 20 rounds for ChaCha20).

The following discuss a ChaCha Qround as an example, but other implementations are foreseen, for example, Blake rounds, etc.

In one embodiment for Qround (0, 4, 8, 12) (e.g., the first column of Table 1 from the left) at cycle zero, the ChaCha state is stored in vector register 902A in the order of elements 0-15 of Table 1. As the Qround circuit 904A is to operate on data elements 0, 4, 8, and 12 for cycle one, the multiplexers are to output the values from R0, R4, R8, and R12 of vector register 902A into the Qround circuit 904A (e.g., as values A, B, C, D, respectively for ChaCha quarter round circuit 600 or unified ChaCha quarter round and Blake round circuit 700). The Qround circuit 904A then operates on the data according to the circuitry to produce the new values (referred to as values $A_{new}$, $B_{new}$, $C_{new}$ and $D_{new}$ herein). The new values are then stored into R0, R4, R8, and R12 of vector register 902B (which may be the same physical register as vector register 902A). The other values (e.g., not including the values from R0, R4, R8, and R12) of vector register 902A may be stored (for example, without any operations performed on them, e.g., merely passing the same value input as an output) into the same data element positions in vector register 902B. Note that the values are updated for R0, R4, R8, and R12 of vector register 902B but the numbers shown inside the elements (e.g., 0, 4, 8, and 12 in elements R0, R4, R8, and R12, respectively at cycle one) are indicative that the values therein are based on the respective values from Table 1 (for example, the value $A_{new}$ stored at element 0 of vector register 902B was based on the input of A being constant C0 from Table 1, the value $B_{new}$ stored at element 4 of vector register 902B was based on the input of B being key[bits 255:224] from Table 1, the value $C_{new}$ stored at element 8 of vector register 902B was based on the input of C being key[bits 127:96] from Table 1, and the value $D_{new}$ stored at element 12 of vector register 902B was based on the input of D being BC[bits 31:0] from Table 1) and not the actual values themselves merely for the sake of clarity here. In certain embodiments, the vector register is to store the actual values.

As the Qround circuit 904B is to operate on data elements 1, 5, 9, and 13 for cycle two, the multiplexers are to output the values from R1, R5, R9, and R12 of vector register 902B into the Qround circuit 904B (e.g., as values A, B, C, D, respectively for ChaCha quarter round circuit 600 or unified ChaCha quarter round and Blake round circuit 700). The Qround circuit 904B then operates on the data according to the circuitry to produce the new values (referred to as values $A_{new}$, $B_{new}$, $C_{new}$ and $D_{new}$ herein). The new values are then stored into R1, R5, R9, and R13 of vector register 902C (which may be the same physical register as vector register 902A and/or vector register 902B). The other values (e.g., not including the values from R1, R5, R9, and R13) of vector register 902B may be stored (for example, without any operations performed on them, e.g., merely passing the same value input as an output) into the same data element positions in vector register 902C. Note that the values are updated for R1, R5, R9, and R13 of vector register 902C but the numbers shown inside the elements (e.g., 1, 5, 9, and 13 in elements R1, R5, R9, and R13, respectively at cycle two) are indicative that the values therein are based on the respective values from Table 1 (for example, the value $A_{new}$ stored at element 1 of vector register 902C was based on the input of A being constant C1 from Table 1, the value $B_{new}$ stored at element 5 of vector register 902C was based on the input of B being key[bits 223:192] from Table 1, the value $C_{new}$ stored at element 9 of vector register 902C was based on the input of C being key[bits 95:64] from Table 1, and the value $D_{new}$ stored at element 13 of vector register 902C was based on the input of D being nonce[bits 95:64] from Table 1) and not the actual values themselves merely for the sake of clarity here. In certain embodiments, the vector register is to store the actual values.

In these embodiments, note that the element positions 0-15 from Table 1 match the physical register elements in the vector registers.

Figure 10:
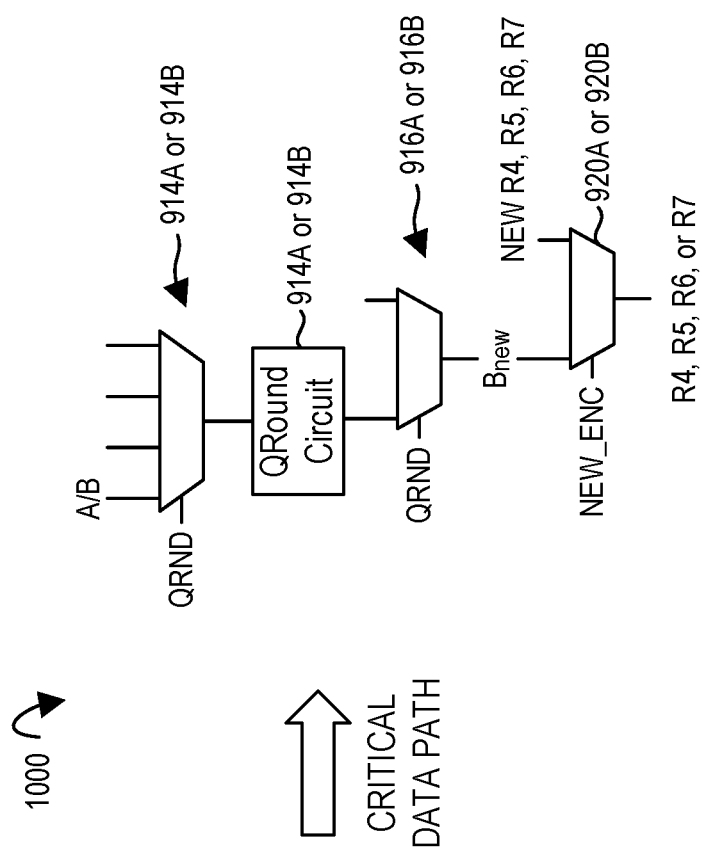
FIG. 10 illustrates a critical data path of the hardware accelerator in FIG. 9 according to embodiments of the disclosure.

FIG. 10 illustrates a critical data path 1000 of the hardware accelerator 904A/904B in FIG. 9 according to embodiments of the disclosure. The term critical may refer to the path that takes the longest time, e.g., that includes the most gate stages to traverse.

In the above implementation in FIG. 9, the initial ChaCha state is stored in the (e.g., 16×32-bit) vector registers (902A-902C) in the order matching the 4×4 matrix shown in Table 1. In cycle one (e.g., at the beginning of cycle one), the first input to Qround (0, 4, 8, 12) is chosen between the subset of values at register elements 0, 1, 2, and 3 and thus utilizing a (e.g., 4:1) multiplexer 914A(1) to source the input for the round (e.g., Qround) circuit, for example, as shown as multiplexer 814A in FIG. 8. The other 3 inputs also go through (e.g., 4:1) multiplexers at 914, for example, adding at least four gate stages to the critical path. Further, at the output of the Qround in the depicted embodiment, only the subset (e.g., four) input values of the Qround are updated, while the remaining 12 states remain unchanged. In certain embodiments, a de-multiplexing operation utilizes a (e.g., 2:1) multiplexer at the input of each state register, for example, adding an additional at least two gate stage delay in the critical path. In one embodiment, the critical path in the Qround computation starts from the inputs A or B (e.g., in FIG. 6 or FIG. 7) from vector register 902A (or 902B) and ends at the computation of $B_{new}$, for example, spanning about 34 gate stages through input multiplexer 914A (or 914B), Qround circuit 904A (or 904B), and output multiplexer 916A (or 916B) as shown in FIG. 10. Optionally, an additional set of parallel multiplexers 920A (e.g., having at least 16 data inputs) is provided to place the (e.g., initial for an encryption) input values into a (e.g., any) desired order (e.g., the order discussed below in reference to FIG. 12), for example, before the first operation of a round (e.g., Qround) circuit on the input data.

Figure 11:
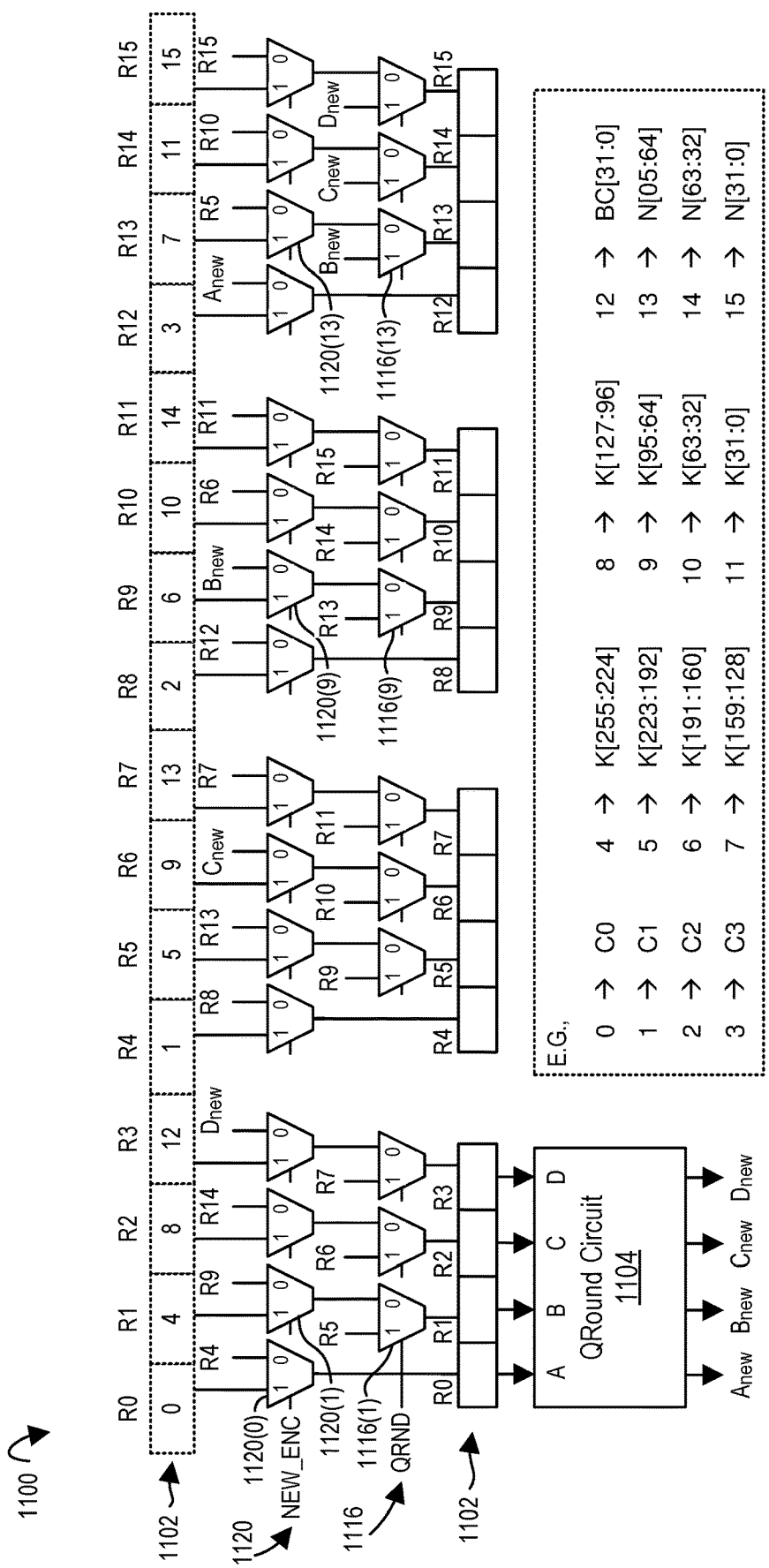
FIG. 11 illustrates circuitry of a hardware accelerator according to embodiments of the disclosure.
Figure 12:
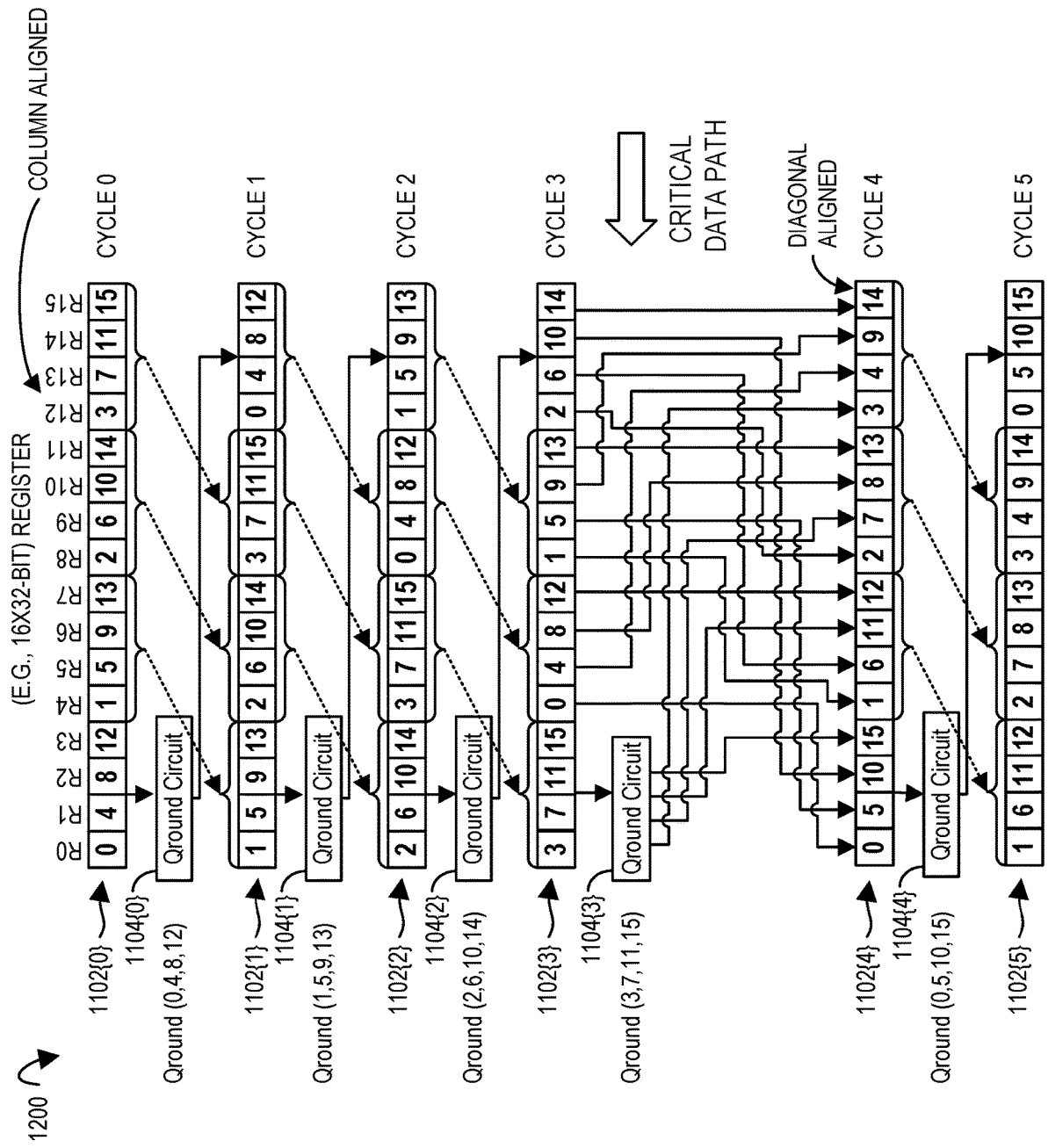
FIG. 12 illustrates multiple cycles of a round of an encryption operation of the hardware accelerator of FIG. 11 according to embodiments of the disclosure.

In certain embodiments, it may be desirable to decrease the number of gate stages in a critical path. For example, the sourcing multiplexer (e.g., multiplexers 914 in FIG. 9 and/or multiplexers 820 in FIG. 8) that sources the input values (e.g., from the in order of 0-15 format of Table 1) into the Qround circuit into a desired order, e.g., to source the elements to the Qround circuit according to the 8 Qround operations discussed above in reference to a ChaCha encryption standard. Certain embodiments herein utilize circuitry that presumes a column and diagonal auto-alignment technique to cluster the (for example, four, e.g., 32-bit) input values of the Qround in the same register in multiple cycles (e.g., all but the last cycle of each round), e.g., as shown in FIGS. 11 and 12. For example, the embodiments shown in FIGS. 11-16 remove the (e.g., 4:1) multiplexer in the critical path that was to be used to reorder the input values (e.g., removes multiplexers 914A and 914B in FIGS. 9 and 10).

In certain embodiments, during initialization, the (e.g., 16×32-bit) ChaCha input values (e.g., states) are stored in the (e.g., 512-bit) register in the column aligned fashion, such that register [e.g., bits 511:384] stores the (e.g., 4×32-bit) states that go into the first Qround of round-1. Similarly, register [e.g., bits 383:256], register [e.g., bits 255:128], and register [127:0] contain the input words for Qrounds 2, 3, and 4, respectively, of round-1. In cycle-1, after the computation of Qround-1, the output is stored in register [e.g., bits 127:0] and the remaining bits are left shifted (for example, by the same amount of bits, e.g., by 128 positions) to automatically align the next (e.g., 4×32-bit) input in register [511:384]. Since the input to the Qround logic in this embodiment is always obtained from the same 128-bits of the state register, the use of the (e.g., 4:1) sourcing multiplexer is eliminated. At the end of the 4th Qround operation, the output of the Qround and remaining states in this embodiment are shuffled into the register appropriately to align the whole (e.g., 512-bit) data for the next diagonal aligned round operation, e.g., with the input to the next Qround stored in the register [e.g., bits 511:384]. The next 3 cycles may perform the Qround operations and state shift/store similar to column aligned rounds, e.g., as shown in FIG. 12. At the end of the 4th Qround, the contents of the state register and the output of the Qround may be appropriately shuffled to align the states for column round operation. In certain embodiments, the elimination of the (e.g., 4:1) sourcing multiplexer at the input of the Qround reduces the critical path by 10%.

FIG. 11 illustrates circuitry of a hardware accelerator 1100 according to embodiments of the disclosure. FIG. 12 illustrates multiple cycles 1200 of a round of an encryption operation of the hardware accelerator 1100 of FIG. 11 according to embodiments of the disclosure.

In one embodiment, the vector register 1102 is loaded (e.g., is input by a processor) with the values from Table 1 in the element order depicted, i.e., 0, 4, 8, 12, 1, 5, 9, 13, 2, 6, 10, 14, 3, 7, 11, 15. Those value references are merely references to the elements in Table 1, e.g., that have their own respective data values, or references to the new data formed by the Qround operation on that input data (e.g., if value 0 symbolizes constant C0 and that is input into Qround circuit as value A, the $A_{new}$ produced based on at least C0 is also referred to as value 0 in this Figure to show the dataflow through the circuitry). R0-R15 are references to the sixteen register elements themselves, e.g., not the data stored in those elements. Hardware accelerator 1100 includes a vector register 1102. Vector register 1102 is shown twice in FIG. 11 to illustrate that the circuitry may feed back into itself. For example, the inputs labeled R0-R15 to the multiplexers may indicate the register element positions of the vector register 1102 (e.g., to source date from the vector register 1102 in the lower half of FIG. 11 in certain embodiments). In another embodiment, optional vector register 1102 at the top of FIG. 11 is not the same hardware instance as vector register 1102 in the lower half of FIG. 11, for example, left inputs of multiplexers 1120 may be coupled to an input (e.g., input 808 in FIG. 8) to source new data, e.g., from a processor or other component that is requesting the hardware accelerator perform an encryption operation. In one embodiment, a control circuit (e.g., control circuit 806 in FIG. 8) sends a control value to multiplexers 1120 to (i) source new data from their left inputs (e.g., from input 808 in FIG. 8) (for example, before the first iteration (e.g., Qround) of the encryption) and/or (ii) source iterative data from Qround circuit 1104 and/or vector register 1102 in the lower half of FIG. 11 for the other iterations of the encryption (for example, until the different "new" input is needed, e.g., every 20 rounds for ChaCha20).

The vector register 1102 shown at the top of FIG. 11 illustrates the initial values as loaded into the vector register (e.g., at cycle 0 in FIG. 12) in column alignment in reference to Table 1. For example, elements 0, 4, 8, and 12 in register storage locations R0, R1, R2, and R3, respectively, at cycle zero are indicative of the values from Table 1, for example, 0 is constant C0 and 12 is BC[bits 31:0], and not the actual values themselves merely for the sake of clarity here. In this embodiment, Qround circuit 1104 (e.g., Qround circuit 600 from FIG. 6 or unified Qround/Blake round circuit 700 from FIG. 7) is to receive the data value from adjacent elements at a first end of the vector register 1102 for a certain number of (e.g., all) Qrounds (e.g., the more than four Qrounds), for example, to receive the data value from R0 of vector register 1102 as input value A, the data value from R1 of vector register 1102 as input value B, the data value from R2 of vector register 1102 as input value C, and the data value from R3 of vector register 1102 as input value D for those cycles of the encryption operation. In certain embodiments, the Qround circuit 1104 is to output the resultant values $A_{new}$, $B_{new}$, $C_{new}$, and $D_{new}$ to the other, opposite end of vector register 1102 for a certain number of (e.g., column aligned) Qrounds (e.g., the first three Qrounds), for example, to store the output data value $A_{new}$ into R12 of vector register 1102, the output data value $B_{new}$ into R13 of vector register 1102, the output data value $C_{new}$ into R14 of vector register 1102, and the output data value $D_{new}$ into R15 of vector register 1102. The remaining values from R4-R15 may be shifted (e.g., the same number of bits that are consumed by the Qround circuit 1104) from the second end to the first end for the same, certain number of (e.g., column aligned) Qrounds (e.g., the first three Qrounds), for example, as shown with the dotted lines from cycle 0 to cycle 1, cycle 1 to cycle 2, and cycle 2 to cycle 3 in FIG. 12.

In one cycle (e.g., from cycle 3 to cycle 4), a different scheme is to be utilized. For example, the Qround circuit 1104 is to output the resultant values $A_{new}$, B new, $C_{new}$, and $D_{new}$ to the particular (e.g., non-adjacent) elements of vector register 1102 for a certain number of (e.g., diagonal aligned) Qrounds (e.g., the last of four Qrounds), for example, to store the output data value $A_{new}$ into R12 of vector register 1102, the output data value $B_{new}$ into R9 of vector register 1102, the output data value $C_{new}$ into R6 of vector register 1102, and the output data value $D_{new}$ into R3 of vector register 1102. For example, the remaining values from R4-R15 may be also be scattered according to the depicted pattern (e.g., from cycle 3 to cycle 4) to obtain a full diagonal alignment (e.g., as depicted in vector register 1102 at cycle four). In one embodiment, a new cycle begins immediately after the data from the previous cycle is latched in (e.g., based on the clock signal).

A next Qround (e.g., number 5 of the 8 rounds discussed above) may then begin, for example, where Qround circuit 1104 (e.g., Qround circuit 600 from FIG. 6 or unified Qround/Blake round circuit 700 from FIG. 7) is to receive the data value from adjacent elements at a first end of the vector register 1102 for a certain number of (e.g., all) Qrounds (e.g., Qrounds 1-8 of the 8 discussed above), for example, to receive the data value from R0 of vector register 1102 as input value A, the data value from R1 of vector register 1102 as input value B, the data value from R2 of vector register 1102 as input value C, and the data value from R3 of vector register 1102 as input value D for those cycles of the encryption operation. In certain embodiments, the Qround circuit 1104 is to output the resultant values $A_{new}$, $B_{new}$, $C_{new}$, and $D_{new}$ to the other, opposite end of vector register 1102 for a certain number of (e.g., column aligned) Qrounds (e.g., these next three Qrounds 5-7), for example, to store the output data value $A_{new}$ into R12 of vector register 1102, the output data value $B_{new}$ into R13 of vector register 1102, the output data value $C_{new}$ into R14 of vector register 1102, and the output data value $D_{new}$ into R15 of vector register 1102. The remaining values from R4-R15 may be shifted (e.g., the same number of bits that consumed by the Qround circuit 1104) from the second end to the first end for the same, certain number of (e.g., column aligned) Qrounds (e.g., the next three Qrounds 5-7), for example, as shown with the dotted lines from cycle 4 to cycle 5 in FIG. 12.

The Qround control values (QRND) to each of the multiplexers 1116 and/or new encryption control values (NEW_ENC) to each of the multiplexers 1120 may be sent from control circuit, e.g., control circuit 806 in FIG. 8. Control values may cause their multiplexers to output the input values into their respective locations, e.g., according to which Qround is being performed, see, e.g., FIG. 12. In one embodiment, the multiplexers 1116 source the column aligned values (e.g., as shown from cycle 0 to cycle 1, cycle 1 to cycle 2, and cycle 2 to cycle 3 in FIG. 12) for a subset of the Qrounds (e.g., the first three of the four Qrounds) and source the diagonal aligned values (e.g., as shown from cycle 3 to cycle 4 in FIG. 12) for the remaining Qrounds (e.g., the fourth of the four Qrounds). In one embodiment, the new encryption control values (NEW_ENC) to each of the multiplexers 1120 sources the input data according to the encryption operation, for example, providing data from the depicted elements of the vector register 1102 (which may be multiple physical registers or a single physical register) according to the operation to be performed. For example, depicted multiplexer 1120(1) includes a first input coupled to register element R1 of vector register 1102 and a second input coupled to register element R9 of vector register 1102, and a first encryption control value (e.g., a logical zero) (NEW_ENC) (e.g., indicating it is a new encryption) is to cause the multiplexer 1120(1) to output the value from register element R1 of vector register 1102 to an input of multiplexer 1116(1), and a second encryption control value (e.g., a logical one) (NEW_ENC) (e.g., indicating it is not a new encryption) is to cause the multiplexer 1120(1) to output the value from register element R9 of vector register 1102 to an input of multiplexer 1116(1). In the depicted embodiment, the other input of multiplexer 1116(1) is coupled to register element R5 of vector register 1102. In one embodiment, a first multiplexer control value (e.g., a logical one) is to cause multiplexer 1116(1) to output the input from register element R5 of vector register 1102 to register element R1 of vector register 1102 (e.g., to input B of the Qround circuit 1104), and a second multiplexer control value (e.g., a logical zero) is to cause multiplexer 1116(1) to output the input from multiplexer 1120(1) to register element R1 of vector register 1102 (e.g., to input B of the Qround circuit 1104) (e.g., according to which Qround pattern (e.g., of the 1-8 patterns discussed above) that the Qround circuit 1104 is to perform on that data).

In FIG. 12, for cycle 0 to cycle 1, cycle 1 to cycle 2, and cycle 2 to cycle 3, the output values of the Qround (e.g., $A_{new}$, $B_{new}$, $C_{new}$, and $D_{new}$) are generated from R0, R1, R2, and R3, respectively, and stored in R12, R13, R12, and R15, respectively. In the depicted embodiment, outputs from Qround circuit 1104 (e.g., $A_{new}$, $B_{new}$, $C_{new}$, and $D_{new}$) are looped back into the accelerator 1100 (e.g., as inputs to the multiplexers). The numbers in curly parenthesis in FIG. 12 may indicate the cycle number or a different instance of the hardware.

In one embodiment, for an initial cycle (e.g., a new encryption), the hardware accelerator 1100 is to source (e.g., by asserting a logical one as a control value NEW_ENC) the left inputs of the first set of parallel multiplexers 1120 (e.g., to vector register 1102 that is initially storing values from Table 1 for its elements 0, 4, 8, 12, 1, 5, 9, 13, 2, 6, 10, 14, 3, 7, 11, 15 in that order) and pass those values through the second set of parallel multiplexers (if present) (e.g., by asserting a logical zero as a control value QRND) into (e.g., back into) vector register 1102 (e.g., vector register instance shown in the lower half of FIG. 11).

In one embodiment, for column aligned (e.g., first, second, third, fifth, sixth, or seventh) cycles of a Qround, the hardware accelerator 1100 is to steer the data as indicted in FIG. 12, for example, to select the right input of multiplexers 1120 (e.g., by asserting a logical zero as a control value NEW_ENC) to pass the values to vector register 1102 for multiplexer 1120(0), multiplexer 1120(4), multiplexer 1120(8), and multiplexer 1120(12) and to pass the values to multiplexers 1116 for the remaining multiplexers 1120, and to select the left input of multiplexers 1116 (e.g., by asserting a logical one as a control value QRND) to provide those values to vector register 1102, for example, to be operated on by Qround circuit 1104. A logical zero and a logical one are discussed herein with certain functionality, but they may both be swapped).

In one embodiment, for diagonal aligned (e.g., fourth or eighth) cycles of a Qround, the hardware accelerator 1100 is to steer the data as indicted in FIG. 12, for example, to select the right input of multiplexers 1120 (e.g., by asserting a logical zero as a control value NEW_ENC) to pass the values to vector register 1102 for multiplexer 1120(0), multiplexer 1120(4), multiplexer 1120(8), and multiplexer 1120(12) and to pass the values to multiplexers 1116 for the remaining multiplexers 1120, and to select the right input of multiplexers 1116 (e.g., by asserting a logical zero as a control value QRND) to provide those values to vector register 1102, for example, to be operated on by Qround circuit 1104.

Vector register instances may be referred to with cycle number in curly parenthesis. In one embodiment, these are the same vector register (e.g., vector register 1102 in FIG. 11). For example, from cycle 3 to cycle 4 in FIG. 12, the depicted hardware accelerator 1100 is to store the data from R4 of vector register 1102(3) into R0 of vector register 1102(4), R9 of vector register 1102(3) into R1 of vector register 1102(4), R14 of vector register 1102(3) into R2 of vector register 1102(4), $D_{new}$ from Qround circuit 1104 (based on input of R3 of vector register 1102(3) as value D) into R3 of vector register 1102(4), R8 of vector register 1102(3) into R4 of vector register 1102(4), R13 of vector register 1102(3) into R5 of vector register 1102(4), $C_{new}$ from Qround circuit 1104 (based on input of R2 of vector register 1102(3) as value C) into R6 of vector register 1102(4), R7 of vector register 1102(3) into R7 of vector register 1102(4), R12 of vector register 1102(3) into R8 of vector register 1102(4), $B_{new}$ from Qround circuit 1104 (based on input of R1 of vector register 1102(3) as value B) into R9 of vector register 1102(4), R6 of vector register 1102(3) into R10 of vector register 1102(4), R11 of vector register 1102(3) into R11 of vector register 1102(4), $A_{new}$ from Qround circuit 1104 (based on input of R0 of vector register 1102(3) as value A) into R12 of vector register 1102(4), R5 of vector register 1102(3) into R13 of vector register 1102(4), R10 of vector register 1102(3) into R14 of vector register 1102(4), and R15 of vector register 1102(3) into R15 of vector register 1102(4).

In one embodiment, vector register 1102 at the top and bottom of FIG. 11 are separate registers (e.g., with one being a temporary register to store input data while output data is being generated (e.g., to avoid any overwrites). Note that certain paths (e.g., the leftmost multiplexers of multiplexers 1120) only include one multiplexer in series and not two multiplexers in series in the depicted embodiment.

Figure 13:
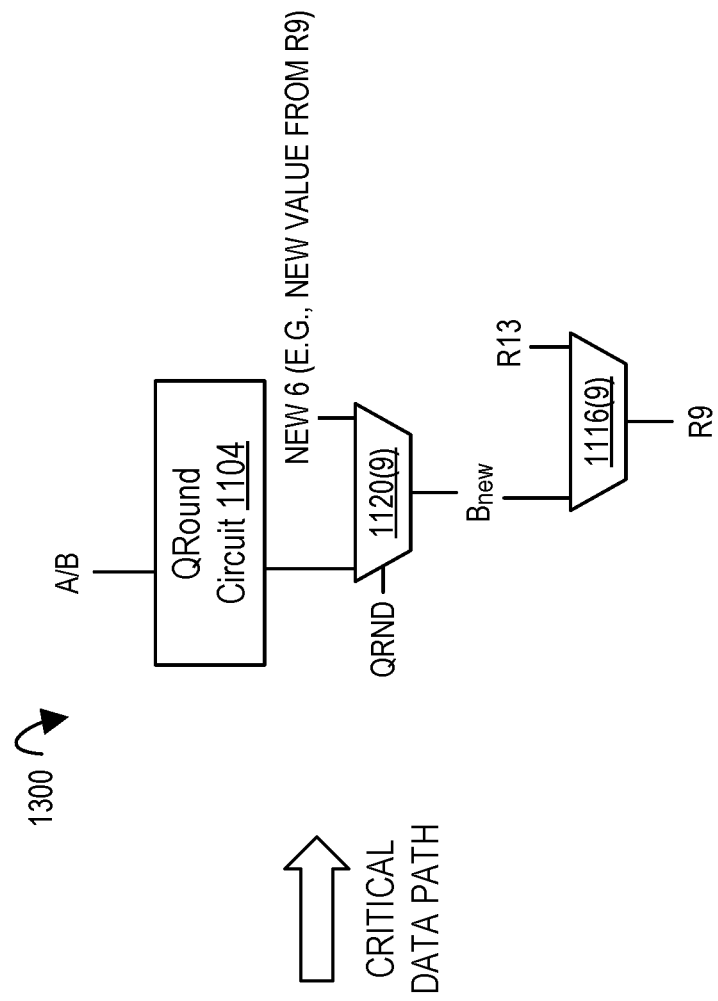
FIG. 13 illustrates a critical data path of the hardware accelerator in FIG. 12 according to embodiments of the disclosure.

FIG. 13 illustrates a critical data path of the hardware accelerator in FIG. 12 according to embodiments of the disclosure. Note that in comparison to the critical path 1000 in FIG. 10, neither (e.g., input of Qround circuit steering) multiplexer 914A or 914B is present, e.g., improving the functionality of the accelerator (e.g., of a computer) by improving the speed of the most time consuming of the data generation operations. The term critical may refer to the path that takes the longest time, e.g., that includes the most gate stages to traverse. In the above implementation in FIG. 12, the initial ChaCha state is stored in the (e.g., 16×32-bit) vector register 1102 in the order matching a (e.g., first) column of the 4×4 matrix shown in Table 1. The critical data path in FIG. 13 is to source (e.g., on inputs A or B), traverse the Qround circuit 1104 (e.g., on paths A or B in FIG. 6 or FIG. 7), and then traverse multiplexer(s), e.g., multiplexer 1120(9) followed in series by multiplexer 1116(9) and/or multiplexer 1120(13) followed in series by multiplexer 1116(13) (e.g., before coupling to vector register 1102).

Figure 14:
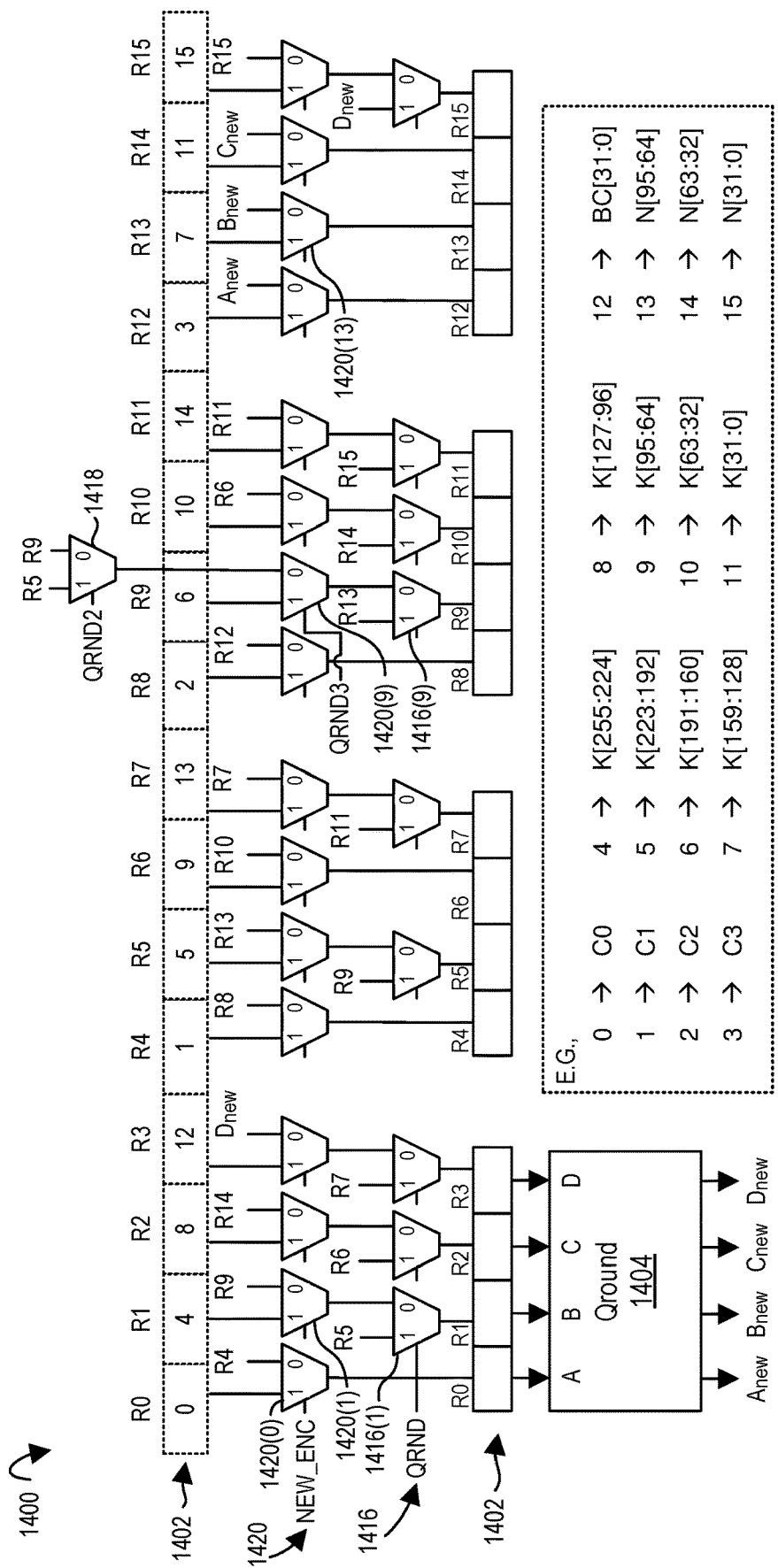
FIG. 14 illustrates circuitry of a hardware accelerator according to embodiments of the disclosure.
Figure 15:
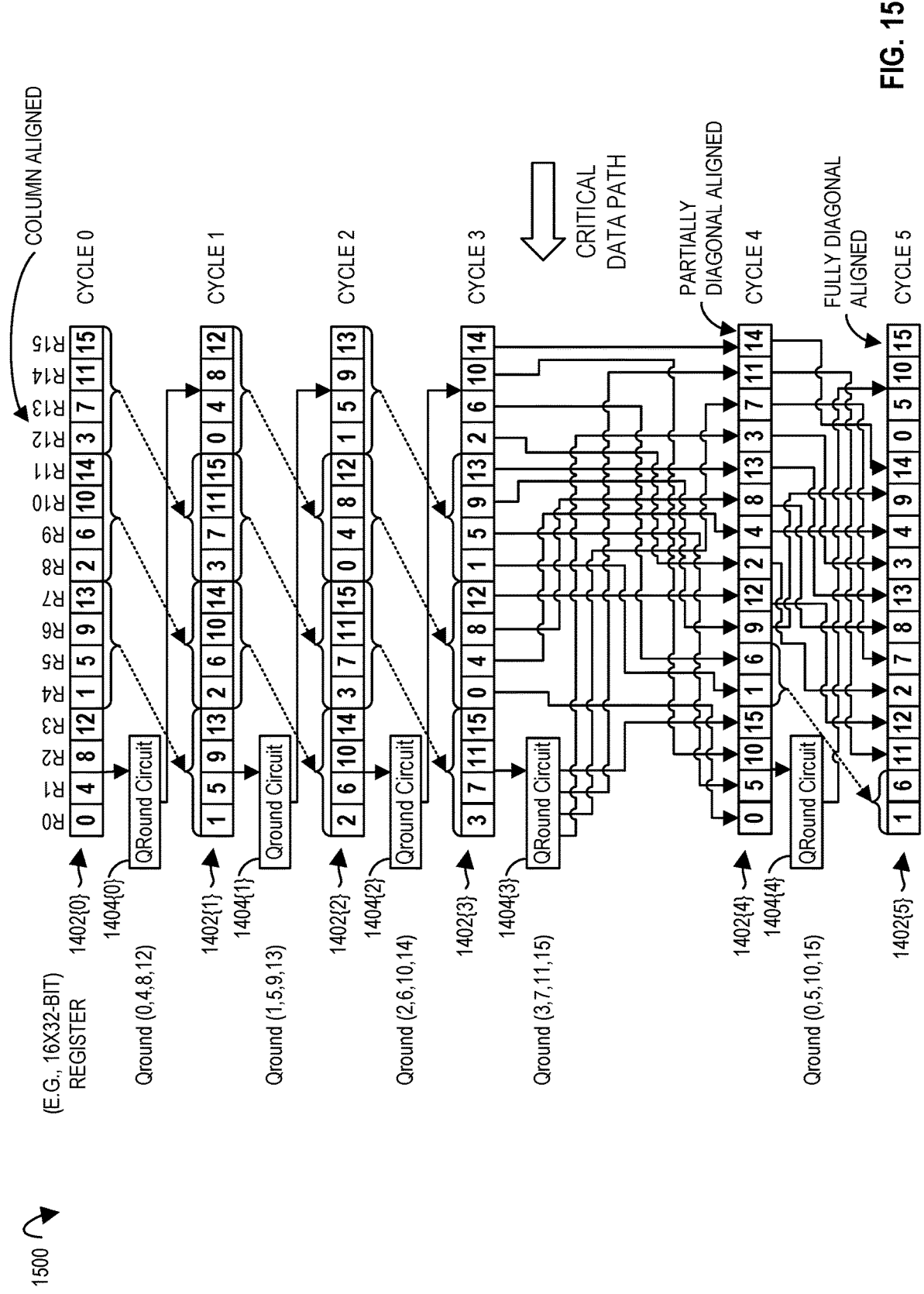
FIG. 15 illustrates multiple cycles of a round of an encryption operation of the hardware accelerator of FIG. 14 according to embodiments of the disclosure.

FIG. 14 illustrates circuitry of a hardware accelerator 1400 according to embodiments of the disclosure. FIG. 15 illustrates multiple cycles 1500 of a round of an encryption operation of the hardware accelerator 1400 of FIG. 14 according to embodiments of the disclosure. The numbers in curly parenthesis in FIG. 15 may indicate the cycle number or a different instance of the hardware.

In one embodiment, the vector register 1402 is loaded with the values from Table 1 in the element order depicted, i.e., 0, 4, 8, 12, 1, 5, 9, 13, 2, 6, 10, 14, 3, 7, 11, 15. Those value references are merely references to the elements in Table 1, e.g., that have their own respective data values, or references to the new data formed by the Qround operation on that input data (e.g., if value 0 symbolizes constant C0 and that is input into Qround circuit as value A, the $A_{new}$ produced based on at least C0 is also referred to as value 0 in this Figure to show the dataflow through the circuitry). R0-R15 are references to the sixteen register elements themselves, e.g., not the data stored in those elements. Hardware accelerator 1400 includes a vector register 1402. Vector register 1402 is shown twice in FIG. 14 to illustrate that the circuitry may feed back into itself. For example, the inputs labeled R0-R15 to the multiplexers may indicate the register element positions of the vector register 1402 (e.g., to source date from the vector register 1402 in the lower half of FIG. 14 in certain embodiments). In another embodiment, optional vector register 1402 at the top of FIG. 14 is not the same hardware instance as vector register 1402 in the lower half of FIG. 14, for example, left inputs of multiplexers 1420 may be coupled to an input (e.g., input 808 in FIG. 8) to source new data, e.g., from a processor or other component that is requesting the hardware accelerator perform an encryption operation. In one embodiment, a control circuit (e.g., control circuit 806 in FIG. 8) sends a control value to multiplexers 1420 to (i) source new data from their left inputs (e.g., from input 808 in FIG. 8) (for example, before the first iteration (e.g., Qround) of the encryption) and/or (ii) source iterative data from Qround circuit 1404 and/or vector register 1402 in the lower half of FIG. 11 for the other iterations of the encryption (for example, until the different "new" input is needed, e.g., every 20 rounds for ChaCha20).

The vector register 1402 shown at the top of FIG. 14 illustrates the initial values as loaded into the vector register (e.g., at cycle 0 in FIG. 15) in column alignment in reference to Table 1. For example, elements 0, 4, 8, and 12 in register storage locations R0, R1, R2, and R3, respectively, at cycle zero are indicative of the values from Table 1, for example, 0 is constant C0 and 15 is BC[bits 31:0], and not the actual values themselves merely for the sake of clarity here. In this embodiment, Qround circuit 1404 (e.g., Qround circuit 600 from FIG. 6 or unified Qround/Blake round circuit 700 from FIG. 7) is to receive the data value from adjacent elements at a first end of the vector register 1402 for a certain number of (e.g., all) Qrounds (e.g., the more than four Qrounds), for example, to receive the data value from R0 of vector register 1402 as input value A, the data value from R1 of vector register 1402 as input value B, the data value from R2 of vector register 1402 as input value C, and the data value from R3 of vector register 1402 as input value D for those cycles of the encryption operation. In certain embodiments, the Qround circuit 1404 is to output the resultant values $A_{new}$, $B_{new}$, $C_{new}$, and $D_{new}$ to the other, opposite end of vector register 1402 for a certain number of (e.g., column aligned) Qrounds (e.g., the first three Qrounds), for example, to store the output data value $A_{new}$ into R12 of vector register 1402, the output data value $B_{new}$ into R13 of vector register 1402, the output data value $C_{new}$ into R14 of vector register 1402, and the output data value $D_{new}$ into R15 of vector register 1402. The remaining values from R4-R15 may be shifted (e.g., the same number of bits that are consumed by the Qround circuit 1404) from the second end to the first end for the same, certain number of (e.g., column aligned) Qrounds (e.g., the first three Qrounds), for example, as shown with the dotted lines from cycle 0 to cycle 1, cycle 1 to cycle 2, and cycle 2 to cycle 3 in FIG. 15.

For example, the embodiments illustrated in FIGS. 11-12 show that the diagonal alignment occurs on (e.g., within) one cycle (e.g., from cycle 3 to cycle 4). However, in certain embodiments this causes a (e.g., 2:1) multiplexer at the output of the Qround circuit (e.g., multiplexer 1116(9) in FIGS. 11 and 13) to select the appropriate state register input when transitioning from column aligned to diagonal aligned round computation. In certain embodiments, this multiplexer is eliminated by delaying the column/diagonal auto-alignment by one clock cycle, e.g., as shown in FIG. 15. Vector register instances may be referred to with cycle number in curly parenthesis. In one embodiment, these are the same vector register (e.g., vector register 1402 in FIG. 14).

In one embodiment, at the end of the 4th Qround of round-1, the output of $B_{new}$ of the Qround (e.g., which is part of the critical path) is still stored in vector register 1402(4) [e.g., bits 95:64]. As a result, all states (e.g., elements) except states (e.g., elements) 4, 7, 9 and 11 (e.g., in register elements R9, R13, R6, and R14, respectively in vector register 1402(4)) are aligned appropriately for a column round operation, e.g., the vector is partially aligned. Since these 4 states (e.g., elements) do not participate in the first Qround operation of the next cycle, (e.g., round-2, cycle 5), they can be shifted appropriately in cycle 5 to fully align all states (e.g., elements) to diagonal round operation. In this embodiment, where the critical output $B_{new}$ of Qround is always stored in the same register, a (e.g., 2:1) (e.g., output of Qround circuit steering) multiplexer (e.g., multiplexer 1116(9) in FIGS. 11 and 13) in the critical path may thus be eliminated, further improving the performance by 5% in certain embodiments. A similar delayed alignment may be performed when transitioning from diagonal aligned to column aligned round computation. In one embodiment, accelerator 1400 has a cell area of 18 k gates and has a throughput of 5.3 gigabit per second (Gbps) when operating at a cycle time of 1.2 nanoseconds (ns).

For example, from cycle 3 to cycle 4 in FIG. 15, the depicted hardware accelerator 1400 is to store the data from R4 of vector register 1402(3) into R0 of vector register 1402(4), R9 of vector register 1402(3) into R1 of vector register 1402(4), R14 of vector register 1402(3) into R2 of vector register 1402(4), $D_{new}$ from Qround circuit 1404 (based on input of R3 of vector register 1402(3) as value D) into R3 of vector register 1402(4), R8 of vector register 1402(3) into R4 of vector register 1402(4), R13 of vector register 1402(3) into R5 of vector register 1402(4), R10 of vector register 1402(3) into R6 of vector register 1402(4), R7 of vector register 1402(3) into R7 of vector register 1402(4), R12 of vector register 1402(3) into R8 of vector register 1402(4), R5 of vector register 1402(3) into R9 of vector register 1402(4), R6 of vector register 1402(3) into R10 of vector register 1402(4), R11 of vector register 1402(3) into R11 of vector register 1402(4), $A_{new}$ from Qround circuit 1404 (based on input of R0 of vector register 1402(3) as value A) into R12 of vector register 1402(4), $B_{new}$ from Qround circuit 1404 (based on input of R1 of vector register 1402(3) as value B) into R13 of vector register 1402(4), $C_{new}$ from Qround circuit 1404 (based on input of R2 of vector register 1402(3) as value C) into R14 of vector register 1402(4), and R15 of vector register 1402(3) into R15 of vector register 1402(4).

The Qround control values (QRND) to each of the multiplexers 1416 and 1418 and/or new encryption control values (NEW_ENC) to each of the multiplexers 1420 may be sent from control circuit, e.g., control circuit 806 in FIG. 8. Control values may cause (e.g., for a cycle) their multiplexers to output the input values into their respective locations, e.g., according to which Qround is being performed, see, e.g., FIG. 15. In one embodiment, the new encryption control values (NEW_ENC) to each of the multiplexers 1420 sources the input data according to the encryption operation, for example, providing data from the depicted elements of the vector register 1402 (which may be multiple physical registers or a single physical register) according to the operation to be performed. In one embodiment, from cycle 3 to cycle 4 in FIG. 15, the depicted hardware accelerator 1400 (e.g., a control circuit thereof) is to assert an encryption control value (e.g., a logical zero) (NEW_ENC) to cause multiplexers 1420 (e.g., except multiplexer 1420(9), which may include its own control line QRND3) to send an output of their right input to the vector register 1402 (e.g., when there is not a serial multiplexer 1416 also in that path of a multiplexer of multiplexers 1420) and assert a Qround control value (e.g., a logical zero) (QRND) to cause multiplexers 1416 to send an output of their right input to the vector register 1402, another Qround control value two (e.g., a logical one) (QRND2) to cause multiplexer 1418 to send an output of its left input (e.g., R5) to the downstream multiplexer 1420(9), and another Qround control value three (e.g., a logical zero) (QRND3) to cause multiplexer 1420(9) to source data from its right input (e.g., from output of multiplexer 1418).

In this embodiment, Qround circuit 1404 (e.g., Qround circuit 600 from FIG. 6 or unified Qround/Blake round circuit 700 from FIG. 7) receives the data value from adjacent elements at a first end of the vector register 1402 for certain Qrounds (e.g., for a next Qround after a fourth or eighth Qround), for example, to receive the data value from R0 of vector register 1402(4) as input value A, the data value from R1 of vector register 1402(4) as input value B, the data value from R2 of vector register 1402(4) as input value C, and the data value from R3 of vector register 1402(4) as input value D for those cycles of the encryption operation into Qround circuit 1404, and output the resultant values $A_{new}$, $B_{new}$, $C_{new}$, and $D_{new}$ to the other, opposite end of vector register 1402 for the certain Qrounds (e.g., for the fifth Qround), for example, to store the output data value $A_{new}$ into R12 of vector register 1402(5), the output data value $B_{new}$ into R13 of vector register 1402(5), the output data value $C_{new}$ into R14 of vector register 1402(5), and the output data value $D_{new}$ into R15 of vector register 1402(5). The remaining values from R4-R15 may be shifted (e.g., the same number of bits that are consumed by the Qround circuit 1404) from the second end to the first end for a certain number of (e.g., column aligned) Qrounds (e.g., the first three Qrounds of a round), for example, as shown with the dotted lines from cycle 0 to cycle 1, cycle 1 to cycle 2, and cycle 2 to cycle 3 in FIG. 15.

As a further example, from cycle 4 to cycle 5 in FIG. 15, the depicted hardware accelerator 1400 is to store the data from R4 of vector register 1402(4) into R0 of vector register 1402(5), R5 of vector register 1402(4) into R1 of vector register 1402(5), R14 of vector register 1402(4) into R2 of vector register 1402(5), R7 of vector register 1402(4) into R3 of vector register 1402(5), R8 of vector register 1402(4) into R4 of vector register 1402(5), R13 of vector register 1402(4) into R5 of vector register 1402(5), R10 of vector register 1402(4) into R6 of vector register 1402(5), R11 of vector register 1402(4) into R7 of vector register 1402(5), R12 of vector register 1402(4) into R8 of vector register 1402(5), R9 of vector register 1402(4) into R9 of vector register 1402(5), R6 of vector register 1402(4) into R10 of vector register 1402(5), R15 of vector register 1402(4) into R11 of vector register 1402(5), $A_{new}$ from Qround circuit 1404 (based on input of R0 of vector register 1402(4) as value A) into R12 of vector register 1402(5), $B_{new}$ from Qround circuit 1404 (based on input of R1 of vector register 1402(4) as value B) into R13 of vector register 1402(5), $C_{new}$ from Qround circuit 1404 (based on input of R2 of vector register 1402(4) as value C) into R14 of vector register 1402(5), and $D_{new}$ from Qround circuit 1404 (based on input of R3 of vector register 1402(4) as value D) into R15 of vector register 1402(5).

The Qround control values (QRND) to each of the multiplexers 1416 and 1418 and/or new encryption control values (NEW_ENC) to each of the multiplexers 1420 may be sent from control circuit, e.g., control circuit 806 in FIG. 8. Control values may cause (e.g., for a cycle) their multiplexers to output the input values into their respective locations, e.g., according to which Qround is being performed, see, e.g., FIG. 15. In one embodiment, the new encryption control values (NEW_ENC) to each of the multiplexers 1420 sources the input data according to the encryption operation, for example, providing data from the depicted elements of the vector register 1402 (which may be multiple physical registers or a single physical register) according to the operation to be performed. In one embodiment, from cycle 4 to cycle 5 in FIG. 15, the depicted hardware accelerator 1400 (e.g., a control circuit thereof) is to assert an encryption control value (e.g., a logical zero) (NEW_ENC) to cause multiplexers 1420 (e.g., except multiplexer 1420(9), which may include its own control line QRND3) to send an output of their right input to the vector register 1402 (e.g., when there is not a serial multiplexer 1416 also in that path of a multiplexer of multiplexers 1420) and assert a Qround control value (e.g., a logical one) (QRND) to cause multiplexers 1416 to send an output of their left input to the vector register 1402, another Qround control value two (e.g., a logical one) (QRND2) to cause multiplexer 1418 to send an output of its right input (e.g., R9) to the downstream multiplexer 1420(9), and another Qround control value three (e.g., a logical zero) (QRND3) to cause multiplexer 1420(9) to source data from its right input (e.g., from output of multiplexer 1418).

Thus, a hardware accelerator 1400 may steer (e.g., via control values) the data as indicted in FIG. 15, for example, to select the corresponding inputs of multiplexer 1418, multiplexers 1420, and multiplexers 1416 to achieve the data steering and operations depicted in FIG. 15. In one embodiment, vector register 1402 at the top and bottom of FIG. 14 are separate registers (e.g., with one being a temporary register to store input data while output data is being generated (e.g., to avoid any overwrites). Note that certain paths (e.g., the leftmost multiplexers in a group) only include one multiplexer and not two multiplexers in the depicted embodiment.

For any of the embodiments herein, separate control lines (e.g., having their own control value independent from one or more of the other control values) may be utilized (e.g., a control circuit may generate a unique control value for each multiplexer control line).

FIG. 16 illustrates a critical data path 1600 of the hardware accelerator in FIG. 15 according to embodiments of the disclosure. Note that in comparison to the critical path 1000 in FIG. 10, neither (e.g., input of Qround circuit steering) multiplexer 914A or 914B is present, e.g., improving the functionality of the accelerator (e.g., of a computer) by improving the speed of the most time consuming of the data generation operations. Note that in comparison to the critical path 1300 in FIG. 13, at least one of (e.g., output of Qround circuit steering) multiplexer 1116(9) or multiplexer 1120(9) is not present, e.g., improving the functionality of the accelerator (e.g., of a computer) by improving the speed of the most time consuming of the data generation operations. The term critical may refer to the path that takes the longest time, e.g., that includes the most gate stages to traverse. In the above implementation in FIG. 15, the initial ChaCha state is stored in the (e.g., 16×32-bit) vector register 1402 in the order matching a (e.g., first) column of the 4×4 matrix shown in Table 1. The critical data path in FIG. 15 is to source (e.g., on inputs A or B), traverse the Qround circuit 1404 (e.g., on paths A or B in FIG. 6 or FIG. 7), and then traverse multiplexer, e.g., single multiplexer 1420(13) followed in series by no other multiplexer (e.g., before coupling to vector register 1402).

FIG. 17 illustrates a flow diagram 1700 according to embodiments of the disclosure. Depicted flow 1700 includes storing an input vector of a round of an encryption operation in a vector register 1702; performing a portion of the round on the input vector with a circuit by: in a first data path of the circuit comprising a first modular adder coupled to a first input from the vector register and a second input from the vector register, and a second modular adder coupled to the first modular adder and a second data path of the circuit from the vector register, adding with the first modular adder a first value from the first input from the input vector and a second value from the second input from the vector register to produce a first intermediate result, and adding with the second modular adder the first intermediate result and a third intermediate result from the second data path to produce a first result, and in the second data path of the circuit comprising a first logical XOR circuit coupled to the second input and a third data path of the circuit from the vector register, a first rotate circuit coupled to the first logical XOR circuit, a second logical XOR circuit coupled to the first rotate circuit and the third data path, and a second rotate circuit coupled to the second logical XOR circuit, logical XORing with the first logical XOR circuit the second value from the second input from the vector register and a third result from the third data path to produce a second intermediate result, rotating with the first rotate circuit the second intermediate result according to one or more control values to produce a third intermediate result, logical XORing the third intermediate result and a fourth result from the third data path to produce a fifth intermediate result, and rotating with the second rotate circuit the fifth intermediate result according to one or more control values to produce a second result 1704; and storing the first result from the first data path for the portion and the second result from the second data path for the portion into the vector register 1706.

In one embodiment, an apparatus includes a vector register to store an input vector of a round of an encryption operation; a circuit including: a first data path including a first modular adder coupled to a first input from the vector register and a second input from the vector register, and a second modular adder coupled to the first modular adder and a second data path from the vector register, and the second data path including a first logical XOR circuit coupled to the second input and a third data path from the vector register, a first rotate circuit coupled to the first logical XOR circuit, a second logical XOR circuit coupled to the first rotate circuit and the third data path, and a second rotate circuit coupled to the second logical XOR circuit; and a control circuit to cause the first modular adder and the second modular adder of the first data path and the first logical XOR circuit, the second logical XOR circuit, the first rotate circuit, and the second rotate circuit of the second data path to perform a portion (e.g., less than all) of the round according to one or more control values, and (e.g., cause one or more multiplexers of the circuit to) store a first result from the first data path for the portion and a second result from the second data path for the portion into the vector register. The input vector in an initial cycle may be a first constant value stored in a first element and a second constant value stored in a second element that is adjacent to the first element, and the control circuit may control a multiplexer coupled between the vector register and the circuit to source the first constant value or the second constant value as an input to the circuit in the initial cycle. The input vector in an initial cycle (e.g., cycle one in FIGS. 12 and 15) may be a first constant value, a first key value, a second key value, and a first block counter value stored in adjacent elements (e.g., without any intervening elements), and the control circuit may provide the first constant value, the first key value, the second key value, and the first block counter value as inputs (e.g., A, B, C, and D as discussed in reference to FIGS. 6 and 7) into the circuit in the initial cycle. The control circuit may provide the first constant value to the first input from the vector register for the first data path of the circuit and provide the first key value to the second input from the vector register for the second data path of the circuit in the initial cycle. The first constant value, the first key value, the second key value, and the first block counter value may be stored in adjacent elements at a first end of the vector register in the initial cycle, and the control circuit may input the first constant value, the first key value, the second key value, and the first block counter value into the circuit to produce output values (e.g., $A_{new}$, $B_{new}$, $C_{new}$, and $D_{new}$ as discussed in reference to FIGS. 6 and 7), and store the output values into adjacent elements of a second end of the vector register for a next cycle of the round. The control circuit may shift the input vector of the initial cycle other than the first constant value, the first key value, the second key value, and the first block counter value to elements that begin at the first end of the vector register for the next cycle of the round, and the output values are stored in the adjacent elements of the second end of the vector register for the next cycle of the round. The control circuit may input values for an additional cycle of the round from a plurality of adjacent elements at the first end of the vector register into the circuit to produce output values for the additional cycle of the round, and cause a store of the output values for the additional cycle of the round and values from elements of the vector register other than the plurality of adjacent elements into the vector register in a fully aligned state for a (e.g., immediately) next cycle after the additional cycle. The control circuit may input values for an additional cycle of the round from a plurality of adjacent elements at the first end of the vector register into the circuit to produce output values for the additional cycle of the round, cause a store of values from a subset of the output values for the additional cycle of the round and values from elements of the vector register other than the plurality of adjacent elements into adjacent elements at the first end of the vector register in a fully aligned state for a next cycle after the additional cycle, and cause a store of values other than the subset into elements of the vector register other than the first end in a partially aligned state for the next cycle after the additional cycle.

In another embodiment, a method includes storing an input vector of a round of an encryption operation in a vector register; performing a portion of the round on the input vector with a circuit by: in a first data path of the circuit including a first modular adder coupled to a first input from the vector register and a second input from the vector register, and a second modular adder coupled to the first modular adder and a second data path of the circuit from the vector register, adding with the first modular adder a first value from the first input from the input vector and a second value from the second input from the vector register to produce a first intermediate result, and adding with the second modular adder the first intermediate result and a third intermediate result from the second data path to produce a first result, and in the second data path of the circuit including a first logical XOR circuit coupled to the second input and a third data path of the circuit from the vector register, a first rotate circuit coupled to the first logical XOR circuit, a second logical XOR circuit coupled to the first rotate circuit and the third data path, and a second rotate circuit coupled to the second logical XOR circuit, logical XORing with the first logical XOR circuit the second value from the second input from the vector register and a third result from the third data path to produce a second intermediate result, rotating with the first rotate circuit the second intermediate result according to one or more control values to produce a third intermediate result, logical XORing the third intermediate result and a fourth result from the third data path to produce a fifth intermediate result, and rotating with the second rotate circuit the fifth intermediate result according to one or more control values to produce a second result; and storing the first result from the first data path for the portion and the second result from the second data path for the portion into the vector register. The storing of the input vector may include storing, in an initial cycle, a first constant value in a first element and a second constant value in a second element that is adjacent to the first element, and further including switching a multiplexer coupled between the vector register and the circuit to source the first constant value or the second constant value as an input to the circuit in the initial cycle. The storing of the input vector may include storing, in an initial cycle, a first constant value, a first key value, a second key value, and a first block counter value stored in adjacent elements of the input vector, and further include sending the first constant value, the first key value, the second key value, and the first block counter value as inputs into the circuit in the initial cycle. The sending may include sending the first constant value as the first value to the first input from the vector register for the first data path of the circuit and sending the first key value as the second value to the second input from the vector register for the second data path of the circuit in the initial cycle. The storing of the input vector may include storing, in an initial cycle, the first constant value, the first key value, the second key value, and the first block counter value in adjacent elements at a first end of the vector register, the sending may include sending the first constant value, the first key value, the second key value, and the first block counter value into the circuit to produce output values including the first result and the second result, and storing the output values into adjacent elements of a second end of the vector register for a next cycle of the round. The performing may include shifting the input vector of the initial cycle other than the first constant value, the first key value, the second key value, and the first block counter value to elements that begin at the first end of the vector register for the next cycle of the round, and storing the output values in the adjacent elements of the second end of the vector register for the next cycle of the round. The method may include sending input values for an additional cycle of the round from a plurality of adjacent elements at the first end of the vector register into the circuit to produce output values for the additional cycle of the round, and storing the output values for the additional cycle of the round and values from elements of the vector register other than the plurality of adjacent elements into the vector register in a fully aligned state for a next cycle after the additional cycle. The method may include sending input values for an additional cycle of the round from a plurality of adjacent elements at the first end of the vector register into the circuit to produce output values for the additional cycle of the round, storing values from a subset of the output values for the additional cycle of the round and values from elements of the vector register other than the plurality of adjacent elements into adjacent elements at the first end of the vector register in a fully aligned state for a next cycle after the additional cycle, and storing values other than the subset into elements of the vector register other than the first end in a partially aligned state for the next cycle after the additional cycle.

In yet another embodiment, a system includes a hardware processor to execute a thread and offload an encryption operation; a vector register to store an input vector of a round of the encryption operation; and a hardware accelerator including: a circuit including: a first data path including a first modular adder coupled to a first input from the vector register and a second input from the vector register, and a second modular adder coupled to the first modular adder and a second data path from the vector register, and the second data path including a first logical XOR circuit coupled to the second input and a third data path from the vector register, a first rotate circuit coupled to the first logical XOR circuit, a second logical XOR circuit coupled to the first rotate circuit and the third data path, and a second rotate circuit coupled to the second logical XOR circuit, and a control circuit to cause the first modular adder and the second modular adder of the first data path and the first logical XOR circuit, the second logical XOR circuit, the first rotate circuit, and the second rotate circuit of the second data path to perform a portion of the round according to one or more control values, and store a first result from the first data path for the portion and a second result from the second data path for the portion into the vector register. The input vector in an initial cycle may include (e.g., may be) a first constant value stored in a first element and a second constant value stored in a second element that is adjacent to the first element, and the control circuit may control a multiplexer coupled between the vector register and the circuit to source the first constant value or the second constant value as an input to the circuit in the initial cycle. The input vector in an initial cycle may be a first constant value, a first key value, a second key value, and a first block counter value stored in adjacent elements, and the control circuit may provide the first constant value, the first key value, the second key value, and the first block counter value as inputs into the circuit in the initial cycle. The control circuit may provide the first constant value to the first input from the vector register for the first data path of the circuit and provide the first key value to the second input from the vector register for the second data path of the circuit in the initial cycle. The first constant value, the first key value, the second key value, and the first block counter value may be stored in adjacent elements at a first end of the vector register in the initial cycle, and the control circuit may input the first constant value, the first key value, the second key value, and the first block counter value into the circuit to produce output values, and store the output values into adjacent elements of a second end of the vector register for a next cycle of the round. The control circuit may shift the input vector of the initial cycle other than the first constant value, the first key value, the second key value, and the first block counter value to elements that begin at the first end of the vector register for the next cycle of the round, and the output values are stored in the adjacent elements of the second end of the vector register for the next cycle of the round. The control circuit may input values for an additional cycle of the round from a plurality of adjacent elements at the first end of the vector register into the circuit to produce output values for the additional cycle of the round, and cause a store of the output values for the additional cycle of the round and values from elements of the vector register other than the plurality of adjacent elements into the vector register in a fully aligned state for a next cycle after the additional cycle. The control circuit may input values for an additional cycle of the round from a plurality of adjacent elements at the first end of the vector register into the circuit to produce output values for the additional cycle of the round, cause a store of values from a subset of the output values for the additional cycle of the round and values from elements of the vector register other than the plurality of adjacent elements into adjacent elements at the first end of the vector register in a fully aligned state for a next cycle after the additional cycle, and cause a store of values other than the subset into elements of the vector register other than the first end in a partially aligned state for the next cycle after the additional cycle.

In another embodiment, an apparatus includes a vector register to store an input vector of a round of an encryption operation; a circuit including: a first data path including a first modular adder coupled to a first input from the vector register and a second input from the vector register, and a second modular adder coupled to the first modular adder and a second data path from the vector register, and the second data path including a first logical XOR circuit coupled to the second input and a third data path from the vector register, a first rotate circuit coupled to the first logical XOR circuit, a second logical XOR circuit coupled to the first rotate circuit and the third data path, and a second rotate circuit coupled to the second logical XOR circuit; and means to cause the first modular adder and the second modular adder of the first data path and the first logical XOR circuit, the second logical XOR circuit, the first rotate circuit, and the second rotate circuit of the second data path to perform a portion of the round, and store a first result from the first data path for the portion and a second result from the second data path for the portion into the vector register.

In yet another embodiment, an apparatus comprises a data storage device that stores code that when executed by a hardware processor causes the hardware processor to perform any method disclosed herein. An apparatus may be as described in the detailed description. A method may be as described in the detailed description.

An instruction set may include one or more instruction formats. A given instruction format may define various fields (e.g., number of bits, location of bits) to specify, among other things, the operation to be performed (e.g., opcode) and the operand(s) on which that operation is to be performed and/or other data field(s) (e.g., mask). Some instruction formats are further broken down though the definition of instruction templates (or subformats). For example, the instruction templates of a given instruction format may be defined to have different subsets of the instruction format's fields (the included fields are typically in the same order, but at least some have different bit positions because there are less fields included) and/or defined to have a given field interpreted differently. Thus, each instruction of an ISA is expressed using a given instruction format (and, if defined, in a given one of the instruction templates of that instruction format) and includes fields for specifying the operation and the operands. For example, an exemplary ADD instruction has a specific opcode and an instruction format that includes an opcode field to specify that opcode and operand fields to select operands (source1/destination and source2); and an occurrence of this ADD instruction in an instruction stream will have specific contents in the operand fields that select specific operands. A set of SIMD extensions referred to as the Advanced Vector Extensions (AVX) (AVX1 and AVX2) and using the Vector Extensions (VEX) coding scheme has been released and/or published (e.g., see Intel® 64 and IA-32 Architectures Software Developer's Manual, January 2018; and see Intel® Architecture Instruction Set Extensions Programming Reference, January 2018).

Exemplary Instruction Formats

Embodiments of the instruction(s) described herein may be embodied in different formats. Additionally, exemplary systems, architectures, and pipelines are detailed below. Embodiments of the instruction(s) may be executed on such systems, architectures, and pipelines, but are not limited to those detailed.

Generic Vector Friendly Instruction Format

A vector friendly instruction format is an instruction format that is suited for vector instructions (e.g., there are certain fields specific to vector operations). While embodiments are described in which both vector and scalar operations are supported through the vector friendly instruction format, alternative embodiments use only vector operations the vector friendly instruction format.

Figure 18A:
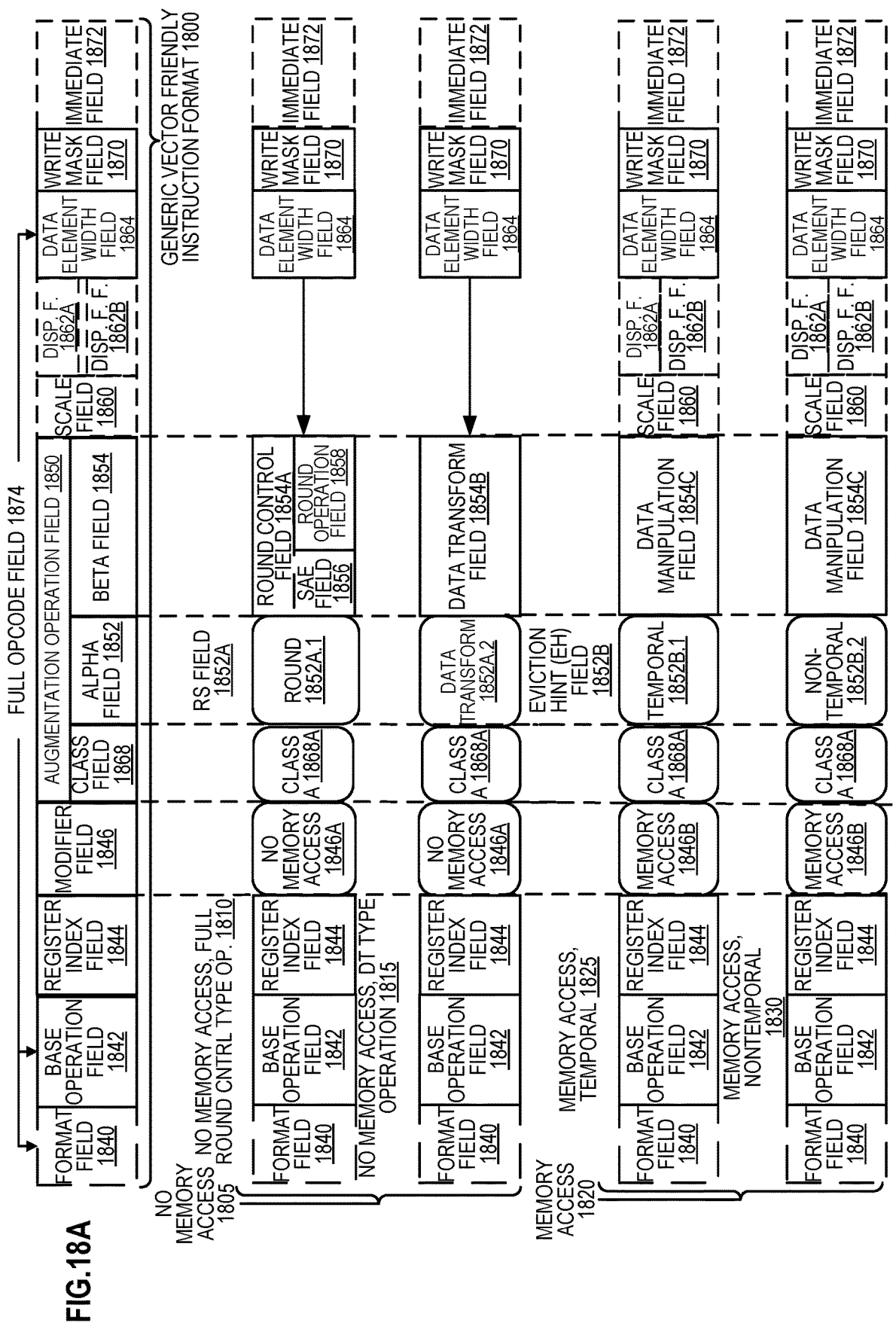
FIG. 18A is a block diagram illustrating a generic vector friendly instruction format and class A instruction templates thereof according to embodiments of the disclosure.
Figure 18B:
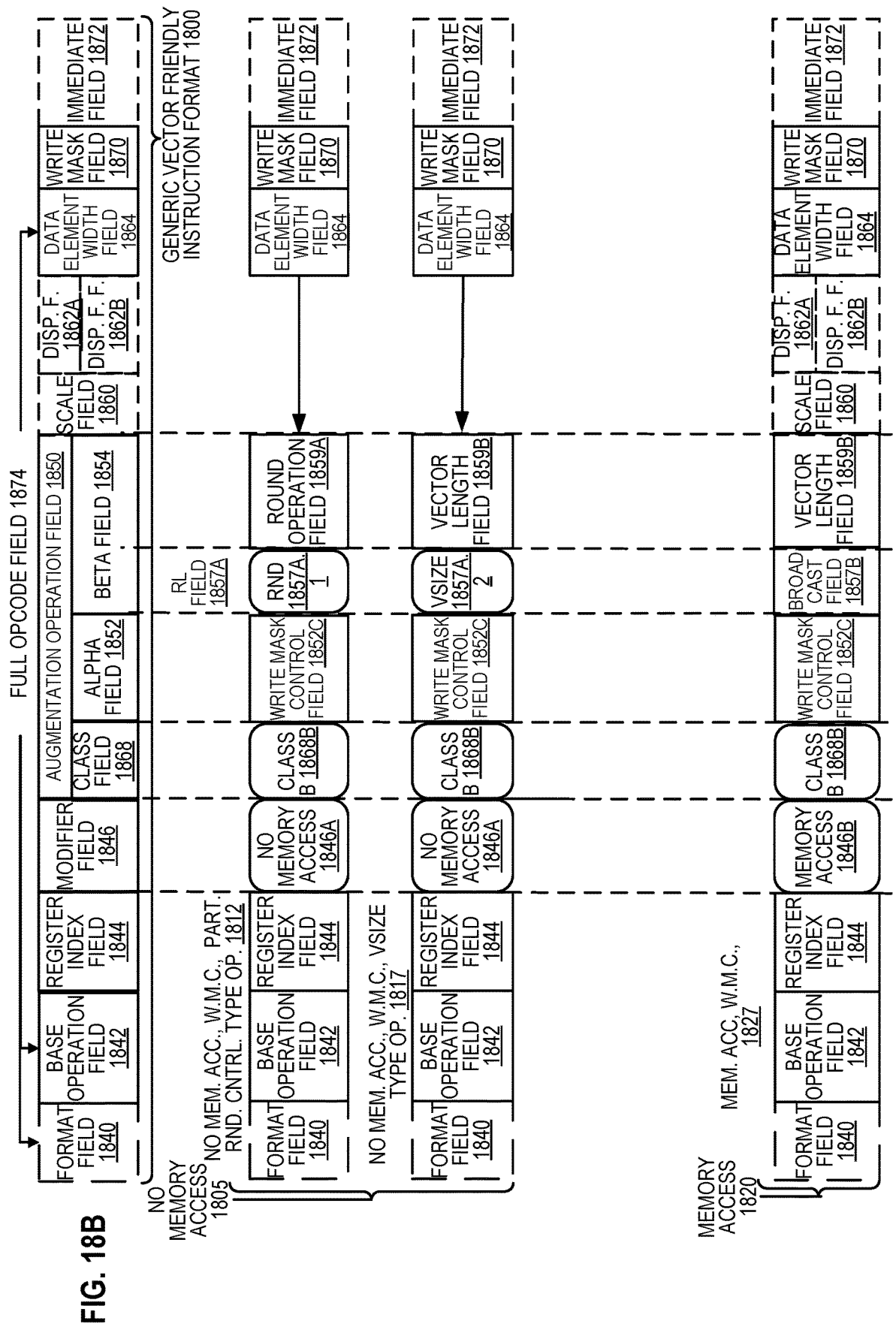
FIG. 18B is a block diagram illustrating the generic vector friendly instruction format and class B instruction templates thereof according to embodiments of the disclosure.

FIGS. 18A-18B are block diagrams illustrating a generic vector friendly instruction format and instruction templates thereof according to embodiments of the disclosure. FIG. 18A is a block diagram illustrating a generic vector friendly instruction format and class A instruction templates thereof according to embodiments of the disclosure; while FIG. 18B is a block diagram illustrating the generic vector friendly instruction format and class B instruction templates thereof according to embodiments of the disclosure. Specifically, a generic vector friendly instruction format 1800 for which are defined class A and class B instruction templates, both of which include no memory access 1805 instruction templates and memory access 1820 instruction templates. The term generic in the context of the vector friendly instruction format refers to the instruction format not being tied to any specific instruction set.

While embodiments of the disclosure will be described in which the vector friendly instruction format supports the following: a 64 byte vector operand length (or size) with 32 bit (4 byte) or 64 bit (8 byte) data element widths (or sizes) (and thus, a 64 byte vector consists of either 16 doubleword-size elements or alternatively, 8 quadword-size elements); a 64 byte vector operand length (or size) with 16 bit (2 byte) or 8 bit (1 byte) data element widths (or sizes); a 32 byte vector operand length (or size) with 32 bit (4 byte), 64 bit (8 byte), 16 bit (2 byte), or 8 bit (1 byte) data element widths (or sizes); and a 16 byte vector operand length (or size) with 32 bit (4 byte), 64 bit (8 byte), 16 bit (2 byte), or 8 bit (1 byte) data element widths (or sizes); alternative embodiments may support more, less and/or different vector operand sizes (e.g., 256 byte vector operands) with more, less, or different data element widths (e.g., 128 bit (16 byte) data element widths).

The class A instruction templates in FIG. 18A include: 1) within the no memory access 1805 instruction templates there is shown a no memory access, full round control type operation 1810 instruction template and a no memory access, data transform type operation 1815 instruction template; and 2) within the memory access 1820 instruction templates there is shown a memory access, temporal 1825 instruction template and a memory access, non-temporal 1830 instruction template. The class B instruction templates in FIG. 18B include: 1) within the no memory access 1805 instruction templates there is shown a no memory access, write mask control, partial round control type operation 1812 instruction template and a no memory access, write mask control, vsize type operation 1817 instruction template; and 2) within the memory access 1820 instruction templates there is shown a memory access, write mask control 1827 instruction template.

The generic vector friendly instruction format 1800 includes the following fields listed below in the order illustrated in FIGS. 18A-18B.

Format field 1840—a specific value (an instruction format identifier value) in this field uniquely identifies the vector friendly instruction format, and thus occurrences of instructions in the vector friendly instruction format in instruction streams. As such, this field is optional in the sense that it is not needed for an instruction set that has only the generic vector friendly instruction format.

Base operation field 1842—its content distinguishes different base operations.

Register index field 1844—its content, directly or through address generation, specifies the locations of the source and destination operands, be they in registers or in memory. These include a sufficient number of bits to select N registers from a PxQ (e.g. 32×512, 16×128, 32×1024, 64×1024) register file. While in one embodiment N may be up to three sources and one destination register, alternative embodiments may support more or less sources and destination registers (e.g., may support up to two sources where one of these sources also acts as the destination, may support up to three sources where one of these sources also acts as the destination, may support up to two sources and one destination).

Modifier field 1846—its content distinguishes occurrences of instructions in the generic vector instruction format that specify memory access from those that do not; that is, between no memory access 1805 instruction templates and memory access 1820 instruction templates. Memory access operations read and/or write to the memory hierarchy (in some cases specifying the source and/or destination addresses using values in registers), while non-memory access operations do not (e.g., the source and destinations are registers). While in one embodiment this field also selects between three different ways to perform memory address calculations, alternative embodiments may support more, less, or different ways to perform memory address calculations.

Augmentation operation field 1850—its content distinguishes which one of a variety of different operations to be performed in addition to the base operation. This field is context specific. In one embodiment of the disclosure, this field is divided into a class field 1868, an alpha field 1852, and a beta field 1854. The augmentation operation field 1850 allows common groups of operations to be performed in a single instruction rather than 2, 3, or 4 instructions.

Scale field 1860—its content allows for the scaling of the index field's content for memory address generation (e.g., for address generation that uses $2^{scale}*\text{index}+\text{base}$).

Displacement Field 1862A—its content is used as part of memory address generation (e.g., for address generation that uses $2^{scale}*\text{index}+\text{base}+\text{displacement}$).

Displacement Factor Field 1862B (note that the juxtaposition of displacement field 1862A directly over displacement factor field 1862B indicates one or the other is used)—its content is used as part of address generation; it specifies a displacement factor that is to be scaled by the size of a memory access (N)—where N is the number of bytes in the memory access (e.g., for address generation that uses $2^{scale}*\text{index}+\text{base}+\text{scaled displacement}$). Redundant low-order bits are ignored and hence, the displacement factor field's content is multiplied by the memory operands total size (N) in order to generate the final displacement to be used in calculating an effective address. The value of N is determined by the processor hardware at runtime based on the full opcode field 1874 (described later herein) and the data manipulation field 1854C. The displacement field 1862A and the displacement factor field 1862B are optional in the sense that they are not used for the no memory access 1805 instruction templates and/or different embodiments may implement only one or none of the two.

Data element width field 1864—its content distinguishes which one of a number of data element widths is to be used (in some embodiments for all instructions; in other embodiments for only some of the instructions). This field is optional in the sense that it is not needed if only one data element width is supported and/or data element widths are supported using some aspect of the opcodes.

Write mask field 1870—its content controls, on a per data element position basis, whether that data element position in the destination vector operand reflects the result of the base operation and augmentation operation. Class A instruction templates support merging-writemasking, while class B instruction templates support both merging- and zeroing-writemasking. When merging, vector masks allow any set of elements in the destination to be protected from updates during the execution of any operation (specified by the base operation and the augmentation operation); in other one embodiment, preserving the old value of each element of the destination where the corresponding mask bit has a 0. In contrast, when zeroing vector masks allow any set of elements in the destination to be zeroed during the execution of any operation (specified by the base operation and the augmentation operation); in one embodiment, an element of the destination is set to 0 when the corresponding mask bit has a 0 value. A subset of this functionality is the ability to control the vector length of the operation being performed (that is, the span of elements being modified, from the first to the last one); however, it is not necessary that the elements that are modified be consecutive. Thus, the write mask field 1870 allows for partial vector operations, including loads, stores, arithmetic, logical, etc. While embodiments of the disclosure are described in which the write mask field's 1870 content selects one of a number of write mask registers that contains the write mask to be used (and thus the write mask field's 1870 content indirectly identifies that masking to be performed), alternative embodiments instead or additional allow the mask write field's 1870 content to directly specify the masking to be performed.

Immediate field 1872—its content allows for the specification of an immediate. This field is optional in the sense that is it not present in an implementation of the generic vector friendly format that does not support immediate and it is not present in instructions that do not use an immediate.

Class field 1868—its content distinguishes between different classes of instructions. With reference to FIGS. 18A-B, the contents of this field select between class A and class B instructions. In FIGS. 18A-B, rounded corner squares are used to indicate a specific value is present in a field (e.g., class A 1868A and class B 1868B for the class field 1868 respectively in FIGS. 18A-B).

Instruction Templates of Class A

In the case of the non-memory access 1805 instruction templates of class A, the alpha field 1852 is interpreted as an RS field 1852A, whose content distinguishes which one of the different augmentation operation types are to be performed (e.g., round 1852A.1 and data transform 1852A.2 are respectively specified for the no memory access, round type operation 1810 and the no memory access, data transform type operation 1815 instruction templates), while the beta field 1854 distinguishes which of the operations of the specified type is to be performed. In the no memory access 1805 instruction templates, the scale field 1860, the displacement field 1862A, and the displacement scale filed 1862B are not present.

No-Memory Access Instruction Templates—Full Round Control Type Operation

In the no memory access full round control type operation 1810 instruction template, the beta field 1854 is interpreted as a round control field 1854A, whose content(s) provide static rounding. While in the described embodiments of the disclosure the round control field 1854A includes a suppress all floating point exceptions (SAE) field 1856 and a round operation control field 1858, alternative embodiments may support may encode both these concepts into the same field or only have one or the other of these concepts/fields (e.g., may have only the round operation control field 1858).

SAE field 1856—its content distinguishes whether or not to disable the exception event reporting; when the SAE field's 1856 content indicates suppression is enabled, a given instruction does not report any kind of floating-point exception flag and does not raise any floating point exception handler.

Round operation control field 1858—its content distinguishes which one of a group of rounding operations to perform (e.g., Round-up, Round-down, Round-towards-zero and Round-to-nearest). Thus, the round operation control field 1858 allows for the changing of the rounding mode on a per instruction basis. In one embodiment of the disclosure where a processor includes a control register for specifying rounding modes, the round operation control field's 1850 content overrides that register value.

No Memory Access Instruction Templates—Data Transform Type Operation

In the no memory access data transform type operation 1815 instruction template, the beta field 1854 is interpreted as a data transform field 1854B, whose content distinguishes which one of a number of data transforms is to be performed (e.g., no data transform, swizzle, broadcast).

In the case of a memory access 1820 instruction template of class A, the alpha field 1852 is interpreted as an eviction hint field 1852B, whose content distinguishes which one of the eviction hints is to be used (in FIG. 18A, temporal 1852B.1 and non-temporal 1852B.2 are respectively specified for the memory access, temporal 1825 instruction template and the memory access, non-temporal 1830 instruction template), while the beta field 1854 is interpreted as a data manipulation field 1854C, whose content distinguishes which one of a number of data manipulation operations (also known as primitives) is to be performed (e.g., no manipulation; broadcast; up conversion of a source; and down conversion of a destination). The memory access 1820 instruction templates include the scale field 1860, and optionally the displacement field 1862A or the displacement scale field 1862B.

Vector memory instructions perform vector loads from and vector stores to memory, with conversion support. As with regular vector instructions, vector memory instructions transfer data from/to memory in a data element-wise fashion, with the elements that are actually transferred is dictated by the contents of the vector mask that is selected as the write mask.

Memory Access Instruction Templates—Temporal

Temporal data is data likely to be reused soon enough to benefit from caching. This is, however, a hint, and different processors may implement it in different ways, including ignoring the hint entirely.

Memory Access Instruction Templates—Non-Temporal

Non-temporal data is data unlikely to be reused soon enough to benefit from caching in the 1st-level cache and should be given priority for eviction. This is, however, a hint, and different processors may implement it in different ways, including ignoring the hint entirely.

Instruction Templates of Class B

In the case of the instruction templates of class B, the alpha field 1852 is interpreted as a write mask control (Z) field 1852C, whose content distinguishes whether the write masking controlled by the write mask field 1870 should be a merging or a zeroing.

In the case of the non-memory access 1805 instruction templates of class B, part of the beta field 1854 is interpreted as an RL field 1857A, whose content distinguishes which one of the different augmentation operation types are to be performed (e.g., round 1857A.1 and vector length (VSIZE) 1857A.2 are respectively specified for the no memory access, write mask control, partial round control type operation 1812 instruction template and the no memory access, write mask control, VSIZE type operation 1817 instruction template), while the rest of the beta field 1854 distinguishes which of the operations of the specified type is to be performed. In the no memory access 1805 instruction templates, the scale field 1860, the displacement field 1862A, and the displacement scale filed 1862B are not present.

In the no memory access, write mask control, partial round control type operation 1810 instruction template, the rest of the beta field 1854 is interpreted as a round operation field 1859A and exception event reporting is disabled (a given instruction does not report any kind of floating-point exception flag and does not raise any floating point exception handler).

Round operation control field 1859A—just as round operation control field 1858, its content distinguishes which one of a group of rounding operations to perform (e.g., Round-up, Round-down, Round-towards-zero and Round-to-nearest). Thus, the round operation control field 1859A allows for the changing of the rounding mode on a per instruction basis. In one embodiment of the disclosure where a processor includes a control register for specifying rounding modes, the round operation control field's 1850 content overrides that register value.

In the no memory access, write mask control, VSIZE type operation 1817 instruction template, the rest of the beta field 1854 is interpreted as a vector length field 1859B, whose content distinguishes which one of a number of data vector lengths is to be performed on (e.g., 128, 256, or 512 byte).

In the case of a memory access 1820 instruction template of class B, part of the beta field 1854 is interpreted as a broadcast field 1857B, whose content distinguishes whether or not the broadcast type data manipulation operation is to be performed, while the rest of the beta field 1854 is interpreted the vector length field 1859B. The memory access 1820 instruction templates include the scale field 1860, and optionally the displacement field 1862A or the displacement scale field 1862B.

With regard to the generic vector friendly instruction format 1800, a full opcode field 1874 is shown including the format field 1840, the base operation field 1842, and the data element width field 1864. While one embodiment is shown where the full opcode field 1874 includes all of these fields, the full opcode field 1874 includes less than all of these fields in embodiments that do not support all of them. The full opcode field 1874 provides the operation code (opcode).

The augmentation operation field 1850, the data element width field 1864, and the write mask field 1870 allow these features to be specified on a per instruction basis in the generic vector friendly instruction format.

The combination of write mask field and data element width field create typed instructions in that they allow the mask to be applied based on different data element widths.

The various instruction templates found within class A and class B are beneficial in different situations. In some embodiments of the disclosure, different processors or different cores within a processor may support only class A, only class B, or both classes. For instance, a high performance general purpose out-of-order core intended for general-purpose computing may support only class B, a core intended primarily for graphics and/or scientific (throughput) computing may support only class A, and a core intended for both may support both (of course, a core that has some mix of templates and instructions from both classes but not all templates and instructions from both classes is within the purview of the disclosure). Also, a single processor may include multiple cores, all of which support the same class or in which different cores support different class. For instance, in a processor with separate graphics and general purpose cores, one of the graphics cores intended primarily for graphics and/or scientific computing may support only class A, while one or more of the general purpose cores may be high performance general purpose cores with out of order execution and register renaming intended for general-purpose computing that support only class B. Another processor that does not have a separate graphics core, may include one more general purpose in-order or out-of-order cores that support both class A and class B. Of course, features from one class may also be implement in the other class in different embodiments of the disclosure. Programs written in a high level language would be put (e.g., just in time compiled or statically compiled) into an variety of different executable forms, including: 1) a form having only instructions of the class(es) supported by the target processor for execution; or 2) a form having alternative routines written using different combinations of the instructions of all classes and having control flow code that selects the routines to execute based on the instructions supported by the processor which is currently executing the code.

Exemplary Specific Vector Friendly Instruction Format

FIG. 19 is a block diagram illustrating an exemplary specific vector friendly instruction format according to embodiments of the disclosure. FIG. 19 shows a specific vector friendly instruction format 1900 that is specific in the sense that it specifies the location, size, interpretation, and order of the fields, as well as values for some of those fields. The specific vector friendly instruction format 1900 may be used to extend the x86 instruction set, and thus some of the fields are similar or the same as those used in the existing x86 instruction set and extension thereof (e.g., AVX). This format remains consistent with the prefix encoding field, real opcode byte field, MOD R/M field, SIB field, displacement field, and immediate fields of the existing x86 instruction set with extensions. The fields from FIG. 18 into which the fields from FIG. 19 map are illustrated.

It should be understood that, although embodiments of the disclosure are described with reference to the specific vector friendly instruction format 1900 in the context of the generic vector friendly instruction format 1800 for illustrative purposes, the disclosure is not limited to the specific vector friendly instruction format 1900 except where claimed. For example, the generic vector friendly instruction format 1800 contemplates a variety of possible sizes for the various fields, while the specific vector friendly instruction format 1900 is shown as having fields of specific sizes. By way of specific example, while the data element width field 1864 is illustrated as a one bit field in the specific vector friendly instruction format 1900, the disclosure is not so limited (that is, the generic vector friendly instruction format 1800 contemplates other sizes of the data element width field 1864).

The generic vector friendly instruction format 1800 includes the following fields listed below in the order illustrated in FIG. 19A.

EVEX Prefix (Bytes 0-3) 1902—is encoded in a four-byte form.

Format Field 1840 (EVEX Byte 0, bits [7:0])—the first byte (EVEX Byte 0) is the format field 1840 and it contains 0x62 (the unique value used for distinguishing the vector friendly instruction format in one embodiment of the disclosure).

The second-fourth bytes (EVEX Bytes 1-3) include a number of bit fields providing specific capability.

REX field 1905 (EVEX Byte 1, bits [7-5])—consists of a EVEX.R bit field (EVEX Byte 1, bit [7]-R), EVEX.X bit field (EVEX byte 1, bit [6]-X), and 1857 BEX byte 1, bit[5]-B). The EVEX.R, EVEX.X, and EVEX.B bit fields provide the same functionality as the corresponding VEX bit fields, and are encoded using is complement form, i.e.

ZMM0 is encoded as 1111B, ZMM15 is encoded as 0000B. Other fields of the instructions encode the lower three bits of the register indexes as is known in the art (rrr, xxx, and bbb), so that Rrrr, Xxxx, and Bbbb may be formed by adding EVEX.R, EVEX.X, and EVEX.B.

REX' field 1810—this is the first part of the REX' field 1810 and is the EVEX.R' bit field (EVEX Byte 1, bit [4]-R') that is used to encode either the upper 16 or lower 16 of the extended 32 register set. In one embodiment of the disclosure, this bit, along with others as indicated below, is stored in bit inverted format to distinguish (in the well-known x86 32-bit mode) from the BOUND instruction, whose real opcode byte is 62, but does not accept in the MOD R/M field (described below) the value of 11 in the MOD field; alternative embodiments of the disclosure do not store this and the other indicated bits below in the inverted format. A value of 1 is used to encode the lower 16 registers. In other words, R'Rrrr is formed by combining EVEX.R', EVEX.R, and the other RRR from other fields.

Opcode map field 1915 (EVEX byte 1, bits [3:0]-mmmm)—its content encodes an implied leading opcode byte (0F, 0F 38, or 0F 3).

Data element width field 1864 (EVEX byte 2, bit [7]-W)—is represented by the notation EVEX.W. EVEX.W is used to define the granularity (size) of the datatype (either 32-bit data elements or 64-bit data elements).

EVEX.vvvv 1920 (EVEX Byte 2, bits [6:3]—vvvv)—the role of EVEX.vvvv may include the following: 1) EVEX.vvvv encodes the first source register operand, specified in inverted (1s complement) form and is valid for instructions with 2 or more source operands; 2) EVEX.vvvv encodes the destination register operand, specified in 1s complement form for certain vector shifts; or 3) EVEX.vvvv does not encode any operand, the field is reserved and should contain 1111b. Thus, EVEX.vvvv field 1920 encodes the 4 low-order bits of the first source register specifier stored in inverted (1s complement) form. Depending on the instruction, an extra different EVEX bit field is used to extend the specifier size to 32 registers.

EVEX.U 1868 Class field (EVEX byte 2, bit [2]-U)—If EVEX.U=0, it indicates class A or EVEX.U0; if EVEX.U=1, it indicates class B or EVEX.U1.

Prefix encoding field 1925 (EVEX byte 2, bits [1:0]-pp)—provides additional bits for the base operation field. In addition to providing support for the legacy SSE instructions in the EVEX prefix format, this also has the benefit of compacting the SIMD prefix (rather than requiring a byte to express the SIMD prefix, the EVEX prefix requires only 2 bits). In one embodiment, to support legacy SSE instructions that use a SIMD prefix (66H, F2H, F3H) in both the legacy format and in the EVEX prefix format, these legacy SIMD prefixes are encoded into the SIMD prefix encoding field; and at runtime are expanded into the legacy SIMD prefix prior to being provided to the decoder's PLA (so the PLA can execute both the legacy and EVEX format of these legacy instructions without modification). Although newer instructions could use the EVEX prefix encoding field's content directly as an opcode extension, certain embodiments expand in a similar fashion for consistency but allow for different meanings to be specified by these legacy SIMD prefixes. An alternative embodiment may redesign the PLA to support the 2 bit SIMD prefix encodings, and thus not require the expansion.

Alpha field 1852 (EVEX byte 3, bit [7]-EH; also known as EVEX.EH, EVEX.rs, EVEX.RL, EVEX.write mask control, and EVEX.N; also illustrated with α)—as previously described, this field is context specific.

Beta field 1854 (EVEX byte 3, bits [6:4]-SSS, also known as EVEX.$s_{2-0}$, EVEX.$r_{2-0}$, EVEX.rr1, EVEX.LL0, EVEX.LLB; also illustrated with βββ—as previously described, this field is context specific.

REX' field 1810—this is the remainder of the REX' field and is the EVEX.V' bit field (EVEX Byte 3, bit [3]-V') that may be used to encode either the upper 16 or lower 16 of the extended 32 register set. This bit is stored in bit inverted format. A value of 1 is used to encode the lower 16 registers. In other words, V'VVVV is formed by combining EVEX.V', EVEX.vvvv.

Write mask field 1870 (EVEX byte 3, bits [2:0]-kkk)—its content specifies the index of a register in the write mask registers as previously described. In one embodiment of the disclosure, the specific value EVEX.kkk=000 has a special behavior implying no write mask is used for the particular instruction (this may be implemented in a variety of ways including the use of a write mask hardwired to all ones or hardware that bypasses the masking hardware).

Real Opcode Field 1930 (Byte 4) is also known as the opcode byte. Part of the opcode is specified in this field.

MOD R/M Field 1940 (Byte 5) includes MOD field 1942, Reg field 1944, and R/M field 1946. As previously described, the MOD field's 1942 content distinguishes between memory access and non-memory access operations. The role of Reg field 1944 can be summarized to two situations: encoding either the destination register operand or a source register operand, or be treated as an opcode extension and not used to encode any instruction operand. The role of R/M field 1946 may include the following: encoding the instruction operand that references a memory address, or encoding either the destination register operand or a source register operand.

Scale, Index, Base (SIB) Byte (Byte 6)—As previously described, the scale field's 1850 content is used for memory address generation. SIB.xxx 1954 and SIB.bbb 1956—the contents of these fields have been previously referred to with regard to the register indexes Xxxx and Bbbb.

Displacement field 1862A (Bytes 7-10)—when MOD field 1942 contains 10, bytes 7-10 are the displacement field 1862A, and it works the same as the legacy 32-bit displacement (disp32) and works at byte granularity.

Displacement factor field 1862B (Byte 7)—when MOD field 1942 contains 01, byte 7 is the displacement factor field 1862B. The location of this field is that same as that of the legacy x86 instruction set 8-bit displacement (disp8), which works at byte granularity. Since disp8 is sign extended, it can only address between −128 and 127 bytes offsets; in terms of 64 byte cache lines, disp8 uses 8 bits that can be set to only four really useful values −128, −64, 0, and 64; since a greater range is often needed, disp32 is used; however, disp32 requires 4 bytes. In contrast to disp8 and disp32, the displacement factor field 1862B is a reinterpretation of disp8; when using displacement factor field 1862B, the actual displacement is determined by the content of the displacement factor field multiplied by the size of the memory operand access (N). This type of displacement is referred to as disp8*N. This reduces the average instruction length (a single byte of used for the displacement but with a much greater range). Such compressed displacement is based on the assumption that the effective displacement is multiple of the granularity of the memory access, and hence, the redundant low-order bits of the address offset do not need to be encoded. In other words, the displacement factor field 1862B substitutes the legacy x86 instruction set 8-bit displacement. Thus, the displacement factor field 1862B is encoded the same way as an x86 instruction set 8-bit displacement (so no changes in the ModRM/SIB encoding rules) with the only exception that disp8 is overloaded to disp8*N. In other words, there are no changes in the encoding rules or encoding lengths but only in the interpretation of the displacement value by hardware (which needs to scale the displacement by the size of the memory operand to obtain a byte-wise address offset). Immediate field 1872 operates as previously described.

Full Opcode Field

FIG. 19B is a block diagram illustrating the fields of the specific vector friendly instruction format 1900 that make up the full opcode field 1874 according to one embodiment of the disclosure. Specifically, the full opcode field 1874 includes the format field 1840, the base operation field 1842, and the data element width (W) field 1864. The base operation field 1842 includes the prefix encoding field 1925, the opcode map field 1915, and the real opcode field 1930.

Register Index Field

FIG. 19C is a block diagram illustrating the fields of the specific vector friendly instruction format 1900 that make up the register index field 1844 according to one embodiment of the disclosure. Specifically, the register index field 1844 includes the REX field 1905, the REX' field 1910, the MODR/M.reg field 1944, the MODR/M.r/m field 1946, the VVVV field 1920, xxx field 1954, and the bbb field 1956.

Augmentation Operation Field

Figure 19D:
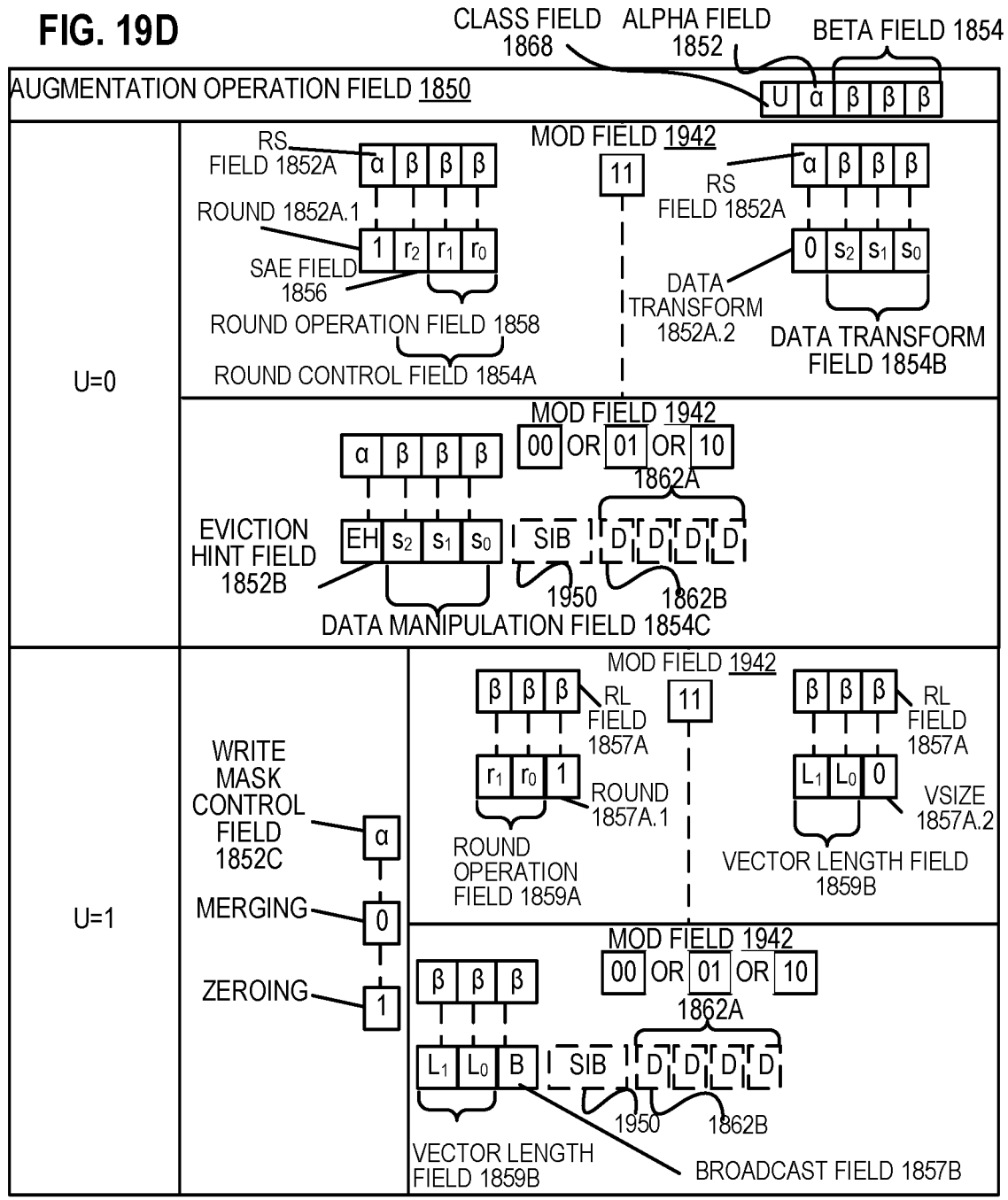
FIG. 19D is a block diagram illustrating the fields of the specific vector friendly instruction format in FIG. 19A that make up the augmentation operation field 1850 according to one embodiment of the disclosure.

FIG. 19D is a block diagram illustrating the fields of the specific vector friendly instruction format 1900 that make up the augmentation operation field 1850 according to one embodiment of the disclosure. When the class (U) field 1868 contains 0, it signifies EVEX.U0 (class A 1868A); when it contains 1, it signifies EVEX.U1 (class B 1868B). When U=0 and the MOD field 1942 contains 11 (signifying a no memory access operation), the alpha field 1852 (EVEX byte 3, bit [7]-EH) is interpreted as the rs field 1852A. When the rs field 1852A contains a 1 (round 1852A.1), the beta field 1854 (EVEX byte 3, bits [6:4]-SSS) is interpreted as the round control field 1854A. The round control field 1854A includes a one bit SAE field 1856 and a two bit round operation field 1858. When the rs field 1852A contains a 0 (data transform 1852A.2), the beta field 1854 (EVEX byte 3, bits [6:4]-SSS) is interpreted as a three bit data transform field 1854B. When U=0 and the MOD field 1942 contains 00, 01, or 10 (signifying a memory access operation), the alpha field 1852 (EVEX byte 3, bit [7]-EH) is interpreted as the eviction hint (EH) field 1852B and the beta field 1854 (EVEX byte 3, bits [6:4]-SSS) is interpreted as a three bit data manipulation field 1854C.

When U=1, the alpha field 1852 (EVEX byte 3, bit [7]-EH) is interpreted as the write mask control (Z) field 1852C. When U=1 and the MOD field 1942 contains 11 (signifying a no memory access operation), part of the beta field 1854 (EVEX byte 3, bit [4]-$S_0$) is interpreted as the RL field 1857A; when it contains a 1 (round 1857A.1) the rest of the beta field 1854 (EVEX byte 3, bit [6-5]-$S_{2-1}$) is interpreted as the round operation field 1859A, while when the RL field 1857A contains a 0 (VSIZE 1857.A2) the rest of the beta field 1854 (EVEX byte 3, bit [6-5]-$S_{2-1}$) is interpreted as the vector length field 1859B (EVEX byte 3, bit [6-5]-$L_{1-0}$). When U=1 and the MOD field 1942 contains 00, 01, or 10 (signifying a memory access operation), the beta field 1854 (EVEX byte 3, bits [6:4]-SSS) is interpreted as the vector length field 1859B (EVEX byte 3, bit [6-5]-$L_{1-0}$) and the broadcast field 1857B (EVEX byte 3, bit [4]-B).

Exemplary Register Architecture

Figure 20:
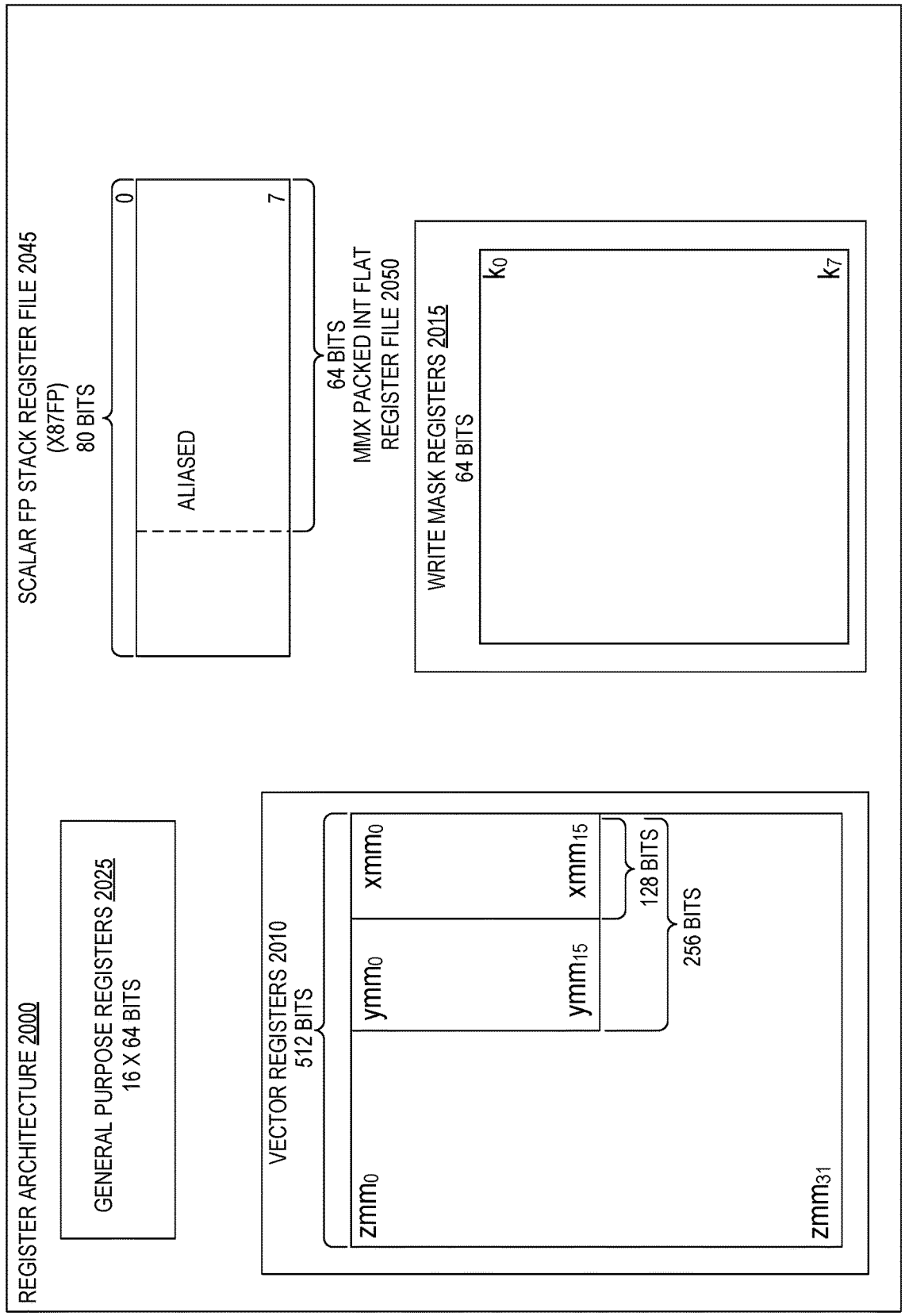
FIG. 20 is a block diagram of a register architecture according to one embodiment of the disclosure

FIG. 20 is a block diagram of a register architecture 2000 according to one embodiment of the disclosure. In the embodiment illustrated, there are 32 vector registers 2010 that are 512 bits wide; these registers are referenced as zmm0 through zmm31. The lower order 256 bits of the lower 16 zmm registers are overlaid on registers ymm0-16. The lower order 128 bits of the lower 16 zmm registers (the lower order 128 bits of the ymm registers) are overlaid on registers xmm0-15. The specific vector friendly instruction format 1900 operates on these overlaid register file as illustrated in the below tables.

| Adjustable Vector Length | Class | Operations | Registers |
|---|---|---|---|
| Instruction Templates that do not include the vector length field 1859B | A (FIG. 18A; U = 0) | 1810, 1815, 1825, 1830 | zmm registers (the vector length is 64 byte) |
| | B (FIG. 18B; U = 1) | 1812 | zmm registers (the vector length is 64 byte) |
| Instruction templates that do include the vector length field 1859B | B (FIG. 18B; U = 1) | 1817, 1827 | zmm, ymm, or xmm registers (the vector length is 64 byte, 32 byte, or 16 byte) depending on the vector length field 1859B |

In other words, the vector length field 1859B selects between a maximum length and one or more other shorter lengths, where each such shorter length is half the length of the preceding length; and instructions templates without the vector length field 1859B operate on the maximum vector length. Further, in one embodiment, the class B instruction templates of the specific vector friendly instruction format 1900 operate on packed or scalar single/double-precision floating point data and packed or scalar integer data. Scalar operations are operations performed on the lowest order data element position in an zmm/ymm/xmm register; the higher order data element positions are either left the same as they were prior to the instruction or zeroed depending on the embodiment.

Write mask registers 2015—in the embodiment illustrated, there are 8 write mask registers (k0 through k7), each 64 bits in size. In an alternate embodiment, the write mask registers 2015 are 16 bits in size. As previously described, in one embodiment of the disclosure, the vector mask register k0 cannot be used as a write mask; when the encoding that would normally indicate k0 is used for a write mask, it selects a hardwired write mask of 0xFFFF, effectively disabling write masking for that instruction.

General-purpose registers 2025—in the embodiment illustrated, there are sixteen 64-bit general-purpose registers that are used along with the existing x86 addressing modes to address memory operands. These registers are referenced by the names RAX, RBX, RCX, RDX, RBP, RSI, RDI, RSP, and R8 through R15.

Scalar floating point stack register file (x87 stack) 2045, on which is aliased the MMX packed integer flat register file 2050—in the embodiment illustrated, the x87 stack is an eight-element stack used to perform scalar floating-point operations on 32/64/80-bit floating point data using the x87 instruction set extension; while the MMX registers are used to perform operations on 64-bit packed integer data, as well as to hold operands for some operations performed between the MMX and XMM registers.

Alternative embodiments of the disclosure may use wider or narrower registers. Additionally, alternative embodiments of the disclosure may use more, less, or different register files and registers.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Exemplary Core Architectures

In-Order and Out-of-Order Core Block Diagram

FIG. 21A is a block diagram illustrating both an exemplary in-order pipeline and an exemplary register renaming, out-of-order issue/execution pipeline according to embodiments of the disclosure. FIG. 21B is a block diagram illustrating both an exemplary embodiment of an in-order architecture core and an exemplary register renaming, out-of-order issue/execution architecture core to be included in a processor according to embodiments of the disclosure. The solid lined boxes in FIGS. 21A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 21A, a processor pipeline 2100 includes a fetch stage 2102, a length decode stage 2104, a decode stage 2106, an allocation stage 2108, a renaming stage 2110, a scheduling (also known as a dispatch or issue) stage 2112, a register read/memory read stage 2114, an execute stage 2116, a write back/memory write stage 2118, an exception handling stage 2122, and a commit stage 2124.

FIG. 21B shows processor core 2190 including a front end unit 2130 coupled to an execution engine unit 2150, and both are coupled to a memory unit 2170. The core 2190 may be a reduced instruction set computing (RISC) core, a complex instruction set computing (CISC) core, a very long instruction word (VLIW) core, or a hybrid or alternative core type. As yet another option, the core 2190 may be a special-purpose core, such as, for example, a network or communication core, compression engine, coprocessor core, general purpose computing graphics processing unit (GPGPU) core, graphics core, or the like.

The front end unit 2130 includes a branch prediction unit 2132 coupled to an instruction cache unit 2134, which is coupled to an instruction translation lookaside buffer (TLB) 2136, which is coupled to an instruction fetch unit 2138, which is coupled to a decode unit 2140. The decode unit 2140 (or decoder or decoder unit) may decode instructions (e.g., macro-instructions), and generate as an output one or more micro-operations, micro-code entry points, micro-instructions, other instructions, or other control signals, which are decoded from, or which otherwise reflect, or are derived from, the original instructions. The decode unit 2140 may be implemented using various different mechanisms. Examples of suitable mechanisms include, but are not limited to, look-up tables, hardware implementations, programmable logic arrays (PLAs), microcode read only memories (ROMs), etc. In one embodiment, the core 2190 includes a microcode ROM or other medium that stores microcode for certain macro-instructions (e.g., in decode unit 2140 or otherwise within the front end unit 2130). The decode unit 2140 is coupled to a rename/allocator unit 2152 in the execution engine unit 2150.

The execution engine unit 2150 includes the rename/allocator unit 2152 coupled to a retirement unit 2154 and a set of one or more scheduler unit(s) 2156. The scheduler unit(s) 2156 represents any number of different schedulers, including reservations stations, central instruction window, etc. The scheduler unit(s) 2156 is coupled to the physical register file(s) unit(s) 2158. Each of the physical register file(s) units 2158 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 2158 comprises a vector registers unit, a write mask registers unit, and a scalar registers unit. These register units may provide architectural vector registers, vector mask registers, and general purpose registers. The physical register file(s) unit(s) 2158 is overlapped by the retirement unit 2154 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 2154 and the physical register file(s) unit(s) 2158 are coupled to the execution cluster(s) 2160. The execution cluster(s) 2160 includes a set of one or more execution units 2162 and a set of one or more memory access units 2164. The execution units 2162 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 2156, physical register file(s) unit(s) 2158, and execution cluster(s) 2160 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 2164). It should also be understood that where separate pipelines are used, one or more of these pipelines may be out-of-order issue/execution and the rest in-order.

The set of memory access units 2164 is coupled to the memory unit 2170, which includes a data TLB unit 2172 coupled to a data cache unit 2174 coupled to a level 2 (L2) cache unit 2176. In one exemplary embodiment, the memory access units 2164 may include a load unit, a store address unit, and a store data unit, each of which is coupled to the data TLB unit 2172 in the memory unit 2170. The instruction cache unit 2134 is further coupled to a level 2 (L2) cache unit 2176 in the memory unit 2170. The L2 cache unit 2176 is coupled to one or more other levels of cache and eventually to a main memory.

By way of example, the exemplary register renaming, out-of-order issue/execution core architecture may implement the pipeline 2100 as follows: 1) the instruction fetch 2138 performs the fetch and length decoding stages 2102 and 2104; 2) the decode unit 2140 performs the decode stage 2106; 3) the rename/allocator unit 2152 performs the allocation stage 2108 and renaming stage 2110; 4) the scheduler unit(s) 2156 performs the schedule stage 2112; 5) the physical register file(s) unit(s) 2158 and the memory unit 2170 perform the register read/memory read stage 2114; the execution cluster 2160 perform the execute stage 2116; 6) the memory unit 2170 and the physical register file(s) unit(s) 2158 perform the write back/memory write stage 2118; 7) various units may be involved in the exception handling stage 2122; and 8) the retirement unit 2154 and the physical register file(s) unit(s) 2158 perform the commit stage 2124.

The core 2190 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 2190 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 2134/2174 and a shared L2 cache unit 2176, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary In-Order Core Architecture

Figure 22B:
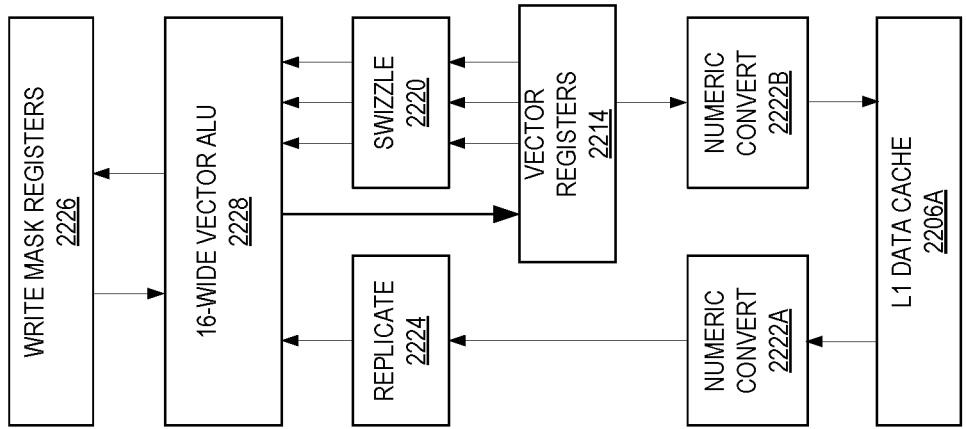
FIG. 22B is an expanded view of part of the processor core in FIG. 22A according to embodiments of the disclosure.
Figure 22A:
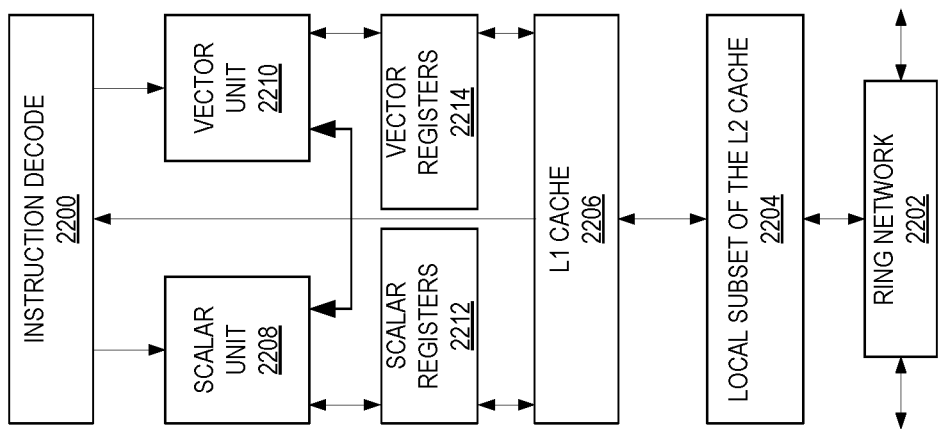
FIG. 22A is a block diagram of a single processor core, along with its connection to the on-die interconnect network and with its local subset of the Level 2 (L2) cache, according to embodiments of the disclosure.

FIGS. 22A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 22A is a block diagram of a single processor core, along with its connection to the on-die interconnect network 2202 and with its local subset of the Level 2 (L2) cache 2204, according to embodiments of the disclosure. In one embodiment, an instruction decode unit 2200 supports the x86 instruction set with a packed data instruction set extension. An L1 cache 2206 allows low-latency accesses to cache memory into the scalar and vector units. While in one embodiment (to simplify the design), a scalar unit 2208 and a vector unit 2210 use separate register sets (respectively, scalar registers 2212 and vector registers 2214) and data transferred between them is written to memory and then read back in from a level 1 (L1) cache 2206, alternative embodiments of the disclosure may use a different approach (e.g., use a single register set or include a communication path that allow data to be transferred between the two register files without being written and read back).

The local subset of the L2 cache 2204 is part of a global L2 cache that is divided into separate local subsets, one per processor core. Each processor core has a direct access path to its own local subset of the L2 cache 2204. Data read by a processor core is stored in its L2 cache subset 2204 and can be accessed quickly, in parallel with other processor cores accessing their own local L2 cache subsets. Data written by a processor core is stored in its own L2 cache subset 2204 and is flushed from other subsets, if necessary. The ring network ensures coherency for shared data. The ring network is bi-directional to allow agents such as processor cores, L2 caches and other logic blocks to communicate with each other within the chip. Each ring datapath is 1012-bits wide per direction.

FIG. 22B is an expanded view of part of the processor core in FIG. 22A according to embodiments of the disclosure. FIG. 22B includes an L1 data cache 2206A part of the L1 cache 2204, as well as more detail regarding the vector unit 2210 and the vector registers 2214. Specifically, the vector unit 2210 is a 16-wide vector processing unit (VPU) (see the 16-wide ALU 2228), which executes one or more of integer, single-precision float, and double-precision float instructions. The VPU supports swizzling the register inputs with swizzle unit 2220, numeric conversion with numeric convert units 2222A-B, and replication with replication unit 2224 on the memory input. Write mask registers 2226 allow predicating resulting vector writes.

Figure 23:
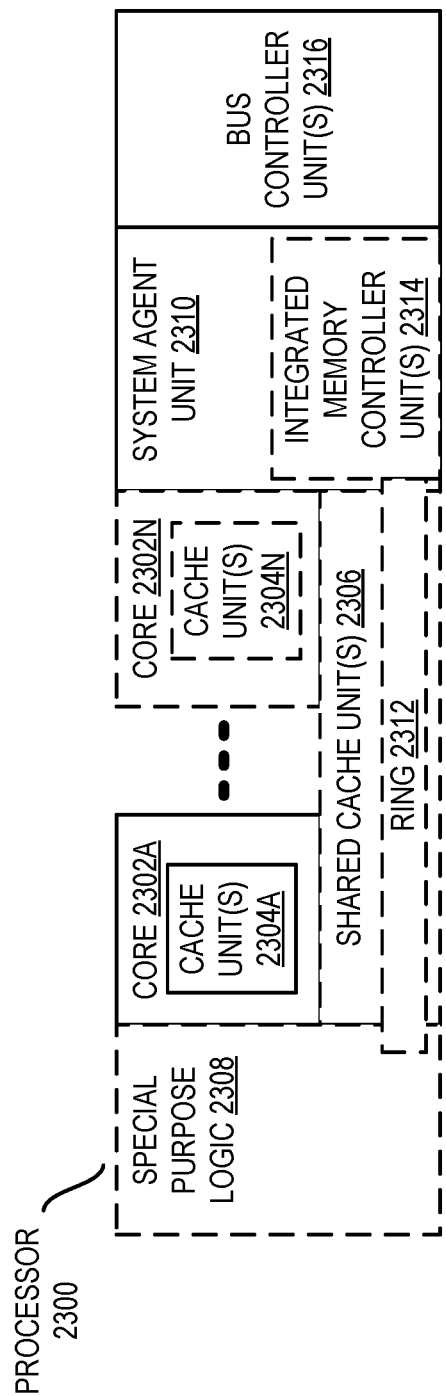
FIG. 23 is a block diagram of a processor that may have more than one core, may have an integrated memory controller, and may have integrated graphics according to embodiments of the disclosure.

FIG. 23 is a block diagram of a processor 2300 that may have more than one core, may have an integrated memory controller, and may have integrated graphics according to embodiments of the disclosure. The solid lined boxes in FIG. 23 illustrate a processor 2300 with a single core 2302A, a system agent 2310, a set of one or more bus controller units 2316, while the optional addition of the dashed lined boxes illustrates an alternative processor 2300 with multiple cores 2302A-N, a set of one or more integrated memory controller unit(s) 2314 in the system agent unit 2310, and special purpose logic 2308.

Thus, different implementations of the processor 2300 may include: 1) a CPU with the special purpose logic 2308 being integrated graphics and/or scientific (throughput) logic (which may include one or more cores), and the cores 2302A-N being one or more general purpose cores (e.g., general purpose in-order cores, general purpose out-of-order cores, a combination of the two); 2) a coprocessor with the cores 2302A-N being a large number of special purpose cores intended primarily for graphics and/or scientific (throughput); and 3) a coprocessor with the cores 2302A-N being a large number of general purpose in-order cores. Thus, the processor 2300 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 2300 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 2306, and external memory (not shown) coupled to the set of integrated memory controller units 2314. The set of shared cache units 2306 may include one or more mid-level caches, such as level 2 (L2), level 3 (L3), level 4 (L4), or other levels of cache, a last level cache (LLC), and/or combinations thereof. While in one embodiment a ring based interconnect unit 2312 interconnects the integrated graphics logic 2308, the set of shared cache units 2306, and the system agent unit 2310/integrated memory controller unit(s) 2314, alternative embodiments may use any number of well-known techniques for interconnecting such units. In one embodiment, coherency is maintained between one or more cache units 2306 and cores 2302-A-N.

In some embodiments, one or more of the cores 2302A-N are capable of multithreading. The system agent 2310 includes those components coordinating and operating cores 2302A-N. The system agent unit 2310 may include for example a power control unit (PCU) and a display unit. The PCU may be or include logic and components needed for regulating the power state of the cores 2302A-N and the integrated graphics logic 2308. The display unit is for driving one or more externally connected displays.

The cores 2302A-N may be homogenous or heterogeneous in terms of architecture instruction set; that is, two or more of the cores 2302A-N may be capable of execution the same instruction set, while others may be capable of executing only a subset of that instruction set or a different instruction set.

Exemplary Computer Architectures

FIGS. 24-27 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 24:
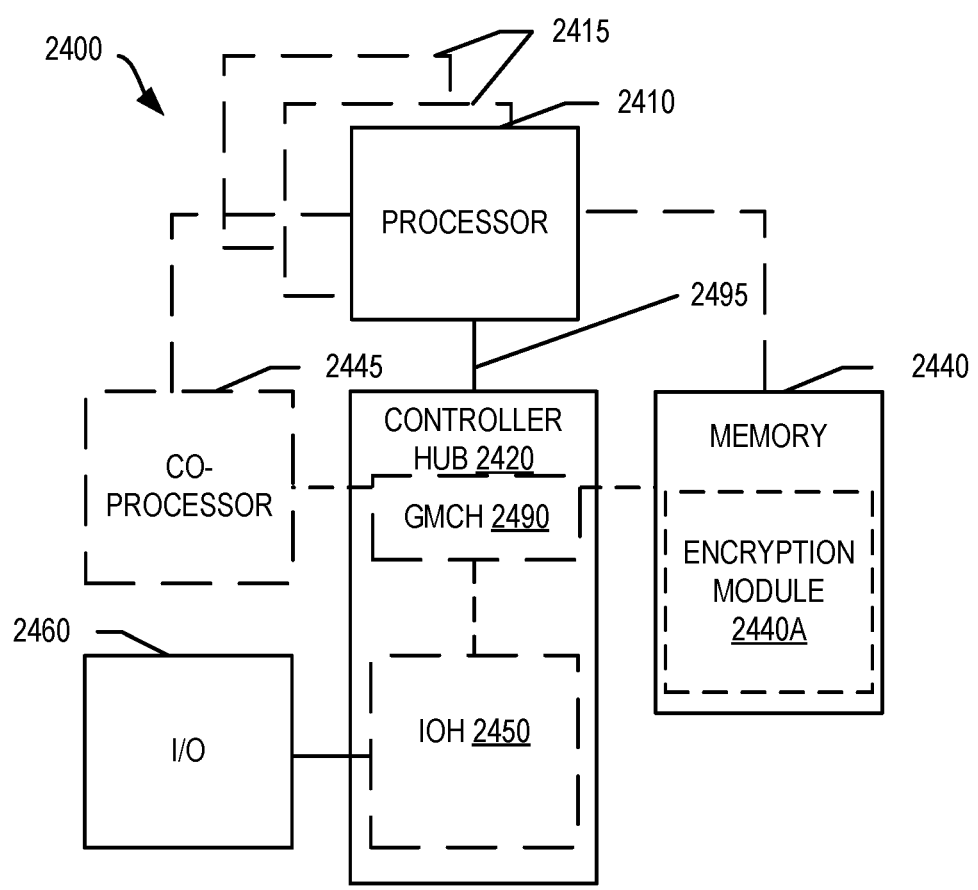
FIG. 24 is a block diagram of a system in accordance with one embodiment of the present disclosure.

Referring now to FIG. 24, shown is a block diagram of a system 2400 in accordance with one embodiment of the present disclosure. The system 2400 may include one or more processors 2410, 2415, which are coupled to a controller hub 2420. In one embodiment the controller hub 2420 includes a graphics memory controller hub (GMCH) 2490 and an Input/Output Hub (IOH) 2450 (which may be on separate chips); the GMCH 2490 includes memory and graphics controllers to which are coupled memory 2440 and a coprocessor 2445; the IOH 2450 is couples input/output (I/O) devices 2460 to the GMCH 2490. Alternatively, one or both of the memory and graphics controllers are integrated within the processor (as described herein), the memory 2440 and the coprocessor 2445 are coupled directly to the processor 2410, and the controller hub 2420 in a single chip with the IOH 2450. Memory 2440 may include an encryption module 2440A, for example, to store code that when executed causes a processor to perform any method of this disclosure.

The optional nature of additional processors 2415 is denoted in FIG. 24 with broken lines. Each processor 2410, 2415 may include one or more of the processing cores described herein and may be some version of the processor 2300.

The memory 2440 may be, for example, dynamic random access memory (DRAM), phase change memory (PCM), or a combination of the two. For at least one embodiment, the controller hub 2420 communicates with the processor(s) 2410, 2415 via a multi-drop bus, such as a frontside bus (FSB), point-to-point interface such as Quickpath Interconnect (QPI), or similar connection 2495.

In one embodiment, the coprocessor 2445 is a special-purpose processor, such as, for example, a high-throughput MIC processor, a network or communication processor, compression engine, graphics processor, GPGPU, embedded processor, or the like. In one embodiment, controller hub 2420 may include an integrated graphics accelerator.

There can be a variety of differences between the physical resources 2410, 2415 in terms of a spectrum of metrics of merit including architectural, microarchitectural, thermal, power consumption characteristics, and the like.

In one embodiment, the processor 2410 executes instructions that control data processing operations of a general type. Embedded within the instructions may be coprocessor instructions. The processor 2410 recognizes these coprocessor instructions as being of a type that should be executed by the attached coprocessor 2445. Accordingly, the processor 2410 issues these coprocessor instructions (or control signals representing coprocessor instructions) on a coprocessor bus or other interconnect, to coprocessor 2445. Coprocessor(s) 2445 accept and execute the received coprocessor instructions.

Figure 25:
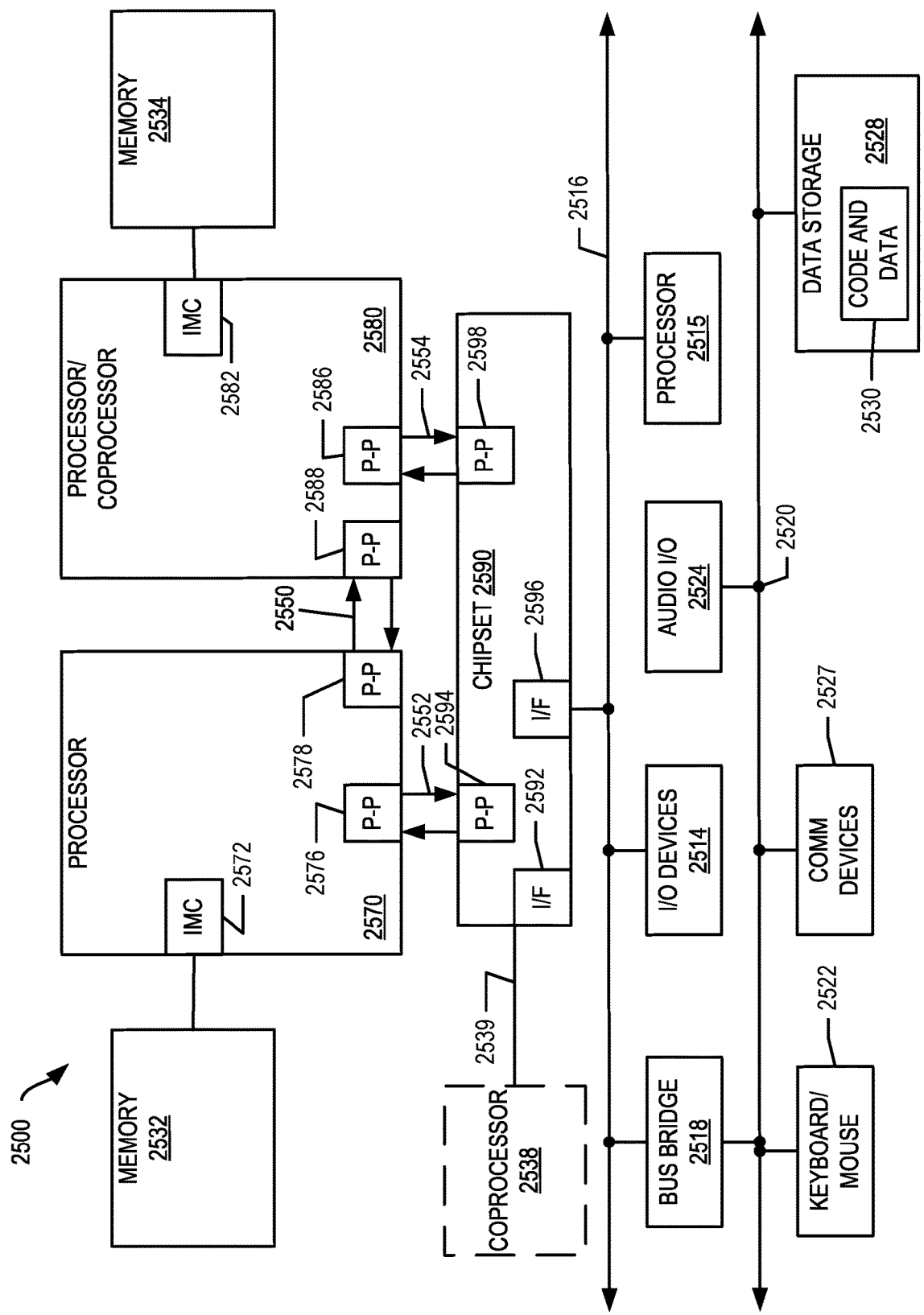
FIG. 25 is a block diagram of a more specific exemplary system in accordance with an embodiment of the present disclosure.

Referring now to FIG. 25, shown is a block diagram of a first more specific exemplary system 2500 in accordance with an embodiment of the present disclosure. As shown in FIG. 25, multiprocessor system 2500 is a point-to-point interconnect system, and includes a first processor 2570 and a second processor 2580 coupled via a point-to-point interconnect 2550. Each of processors 2570 and 2580 may be some version of the processor 2300. In one embodiment of the disclosure, processors 2570 and 2580 are respectively processors 2410 and 2415, while coprocessor 2538 is coprocessor 2445. In another embodiment, processors 2570 and 2580 are respectively processor 2410 coprocessor 2445.

Processors 2570 and 2580 are shown including integrated memory controller (IMC) units 2572 and 2582, respectively. Processor 2570 also includes as part of its bus controller units point-to-point (P-P) interfaces 2576 and 2578; similarly, second processor 2580 includes P-P interfaces 2586 and 2588. Processors 2570, 2580 may exchange information via a point-to-point (P-P) interface 2550 using P-P interface circuits 2578, 2588. As shown in FIG. 25, IMCs 2572 and 2582 couple the processors to respective memories, namely a memory 2532 and a memory 2534, which may be portions of main memory locally attached to the respective processors.

Processors 2570, 2580 may each exchange information with a chipset 2590 via individual P-P interfaces 2552, 2554 using point to point interface circuits 2576, 2594, 2586, 2598. Chipset 2590 may optionally exchange information with the coprocessor 2538 via a high-performance interface 2539. In one embodiment, the coprocessor 2538 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 2590 may be coupled to a first bus 2516 via an interface 2596. In one embodiment, first bus 2516 may be a Peripheral Component Interconnect (PCI) bus, or a bus such as a PCI Express bus or another third generation I/O interconnect bus, although the scope of the present disclosure is not so limited.

As shown in FIG. 25, various I/O devices 2514 may be coupled to first bus 2516, along with a bus bridge 2518 which couples first bus 2516 to a second bus 2520. In one embodiment, one or more additional processor(s) 2515, such as coprocessors, high-throughput MIC processors, GPGPU's, accelerators (such as, e.g., graphics accelerators or digital signal processing (DSP) units), field programmable gate arrays, or any other processor, are coupled to first bus 2516. In one embodiment, second bus 2520 may be a low pin count (LPC) bus. Various devices may be coupled to a second bus 2520 including, for example, a keyboard and/or mouse 2522, communication devices 2527 and a storage unit 2528 such as a disk drive or other mass storage device which may include instructions/code and data 2530, in one embodiment. Further, an audio I/O 2524 may be coupled to the second bus 2520. Note that other architectures are possible. For example, instead of the point-to-point architecture of FIG. 25, a system may implement a multi-drop bus or other such architecture.

Figure 26:
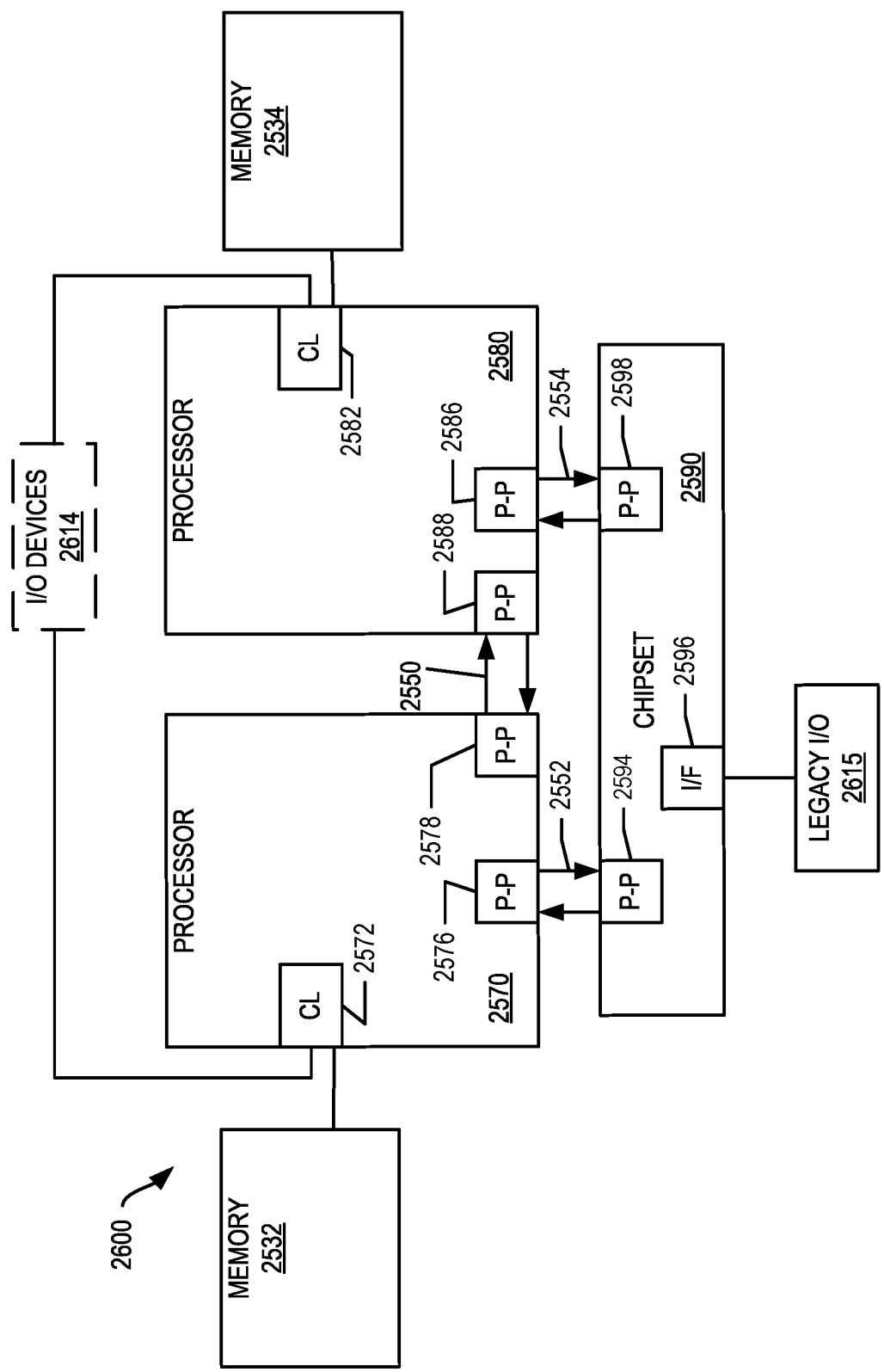
FIG. 26, shown is a block diagram of a second more specific exemplary system in accordance with an embodiment of the present disclosure.

Referring now to FIG. 26, shown is a block diagram of a second more specific exemplary system 2600 in accordance with an embodiment of the present disclosure Like elements in FIGS. 25 and 26 bear like reference numerals, and certain aspects of FIG. 25 have been omitted from FIG. 26 in order to avoid obscuring other aspects of FIG. 26.

FIG. 26 illustrates that the processors 2570, 2580 may include integrated memory and I/O control logic ("CL") 2572 and 2582, respectively. Thus, the CL 2572, 2582 include integrated memory controller units and include I/O control logic. FIG. 26 illustrates that not only are the memories 2532, 2534 coupled to the CL 2572, 2582, but also that I/O devices 2614 are also coupled to the control logic 2572, 2582. Legacy I/O devices 2615 are coupled to the chipset 2590.

Figure 27:
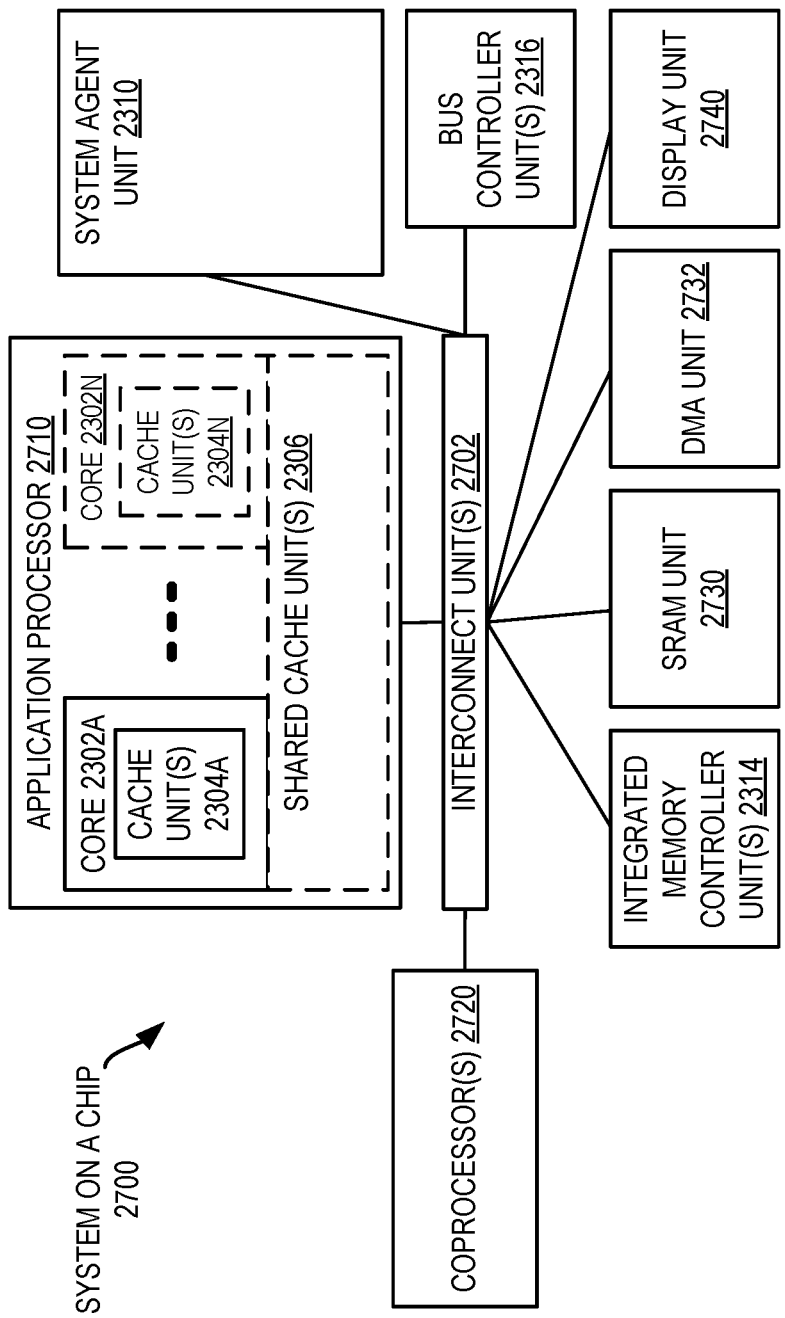
FIG. 27, shown is a block diagram of a system on a chip (SoC) in accordance with an embodiment of the present disclosure.

Referring now to FIG. 27, shown is a block diagram of a SoC 2700 in accordance with an embodiment of the present disclosure. Similar elements in FIG. 23 bear like reference numerals. Also, dashed lined boxes are optional features on more advanced SoCs. In FIG. 27, an interconnect unit(s) 2702 is coupled to: an application processor 2710 which includes a set of one or more cores 202A-N and shared cache unit(s) 2306; a system agent unit 2310; a bus controller unit(s) 2316; an integrated memory controller unit(s) 2314; a set or one or more coprocessors 2720 which may include integrated graphics logic, an image processor, an audio processor, and a video processor; an static random access memory (SRAM) unit 2730; a direct memory access (DMA) unit 2732; and a display unit 2740 for coupling to one or more external displays. In one embodiment, the coprocessor(s) 2720 include a special-purpose processor, such as, for example, a network or communication processor, compression engine, GPGPU, a high-throughput MIC processor, embedded processor, or the like.

Embodiments (e.g., of the mechanisms) disclosed herein may be implemented in hardware, software, firmware, or a combination of such implementation approaches. Embodiments of the disclosure may be implemented as computer programs or program code executing on programmable systems comprising at least one processor, a storage system (including volatile and non-volatile memory and/or storage elements), at least one input device, and at least one output device.

Program code, such as code 2530 illustrated in FIG. 25, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the disclosure also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, Etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 28:
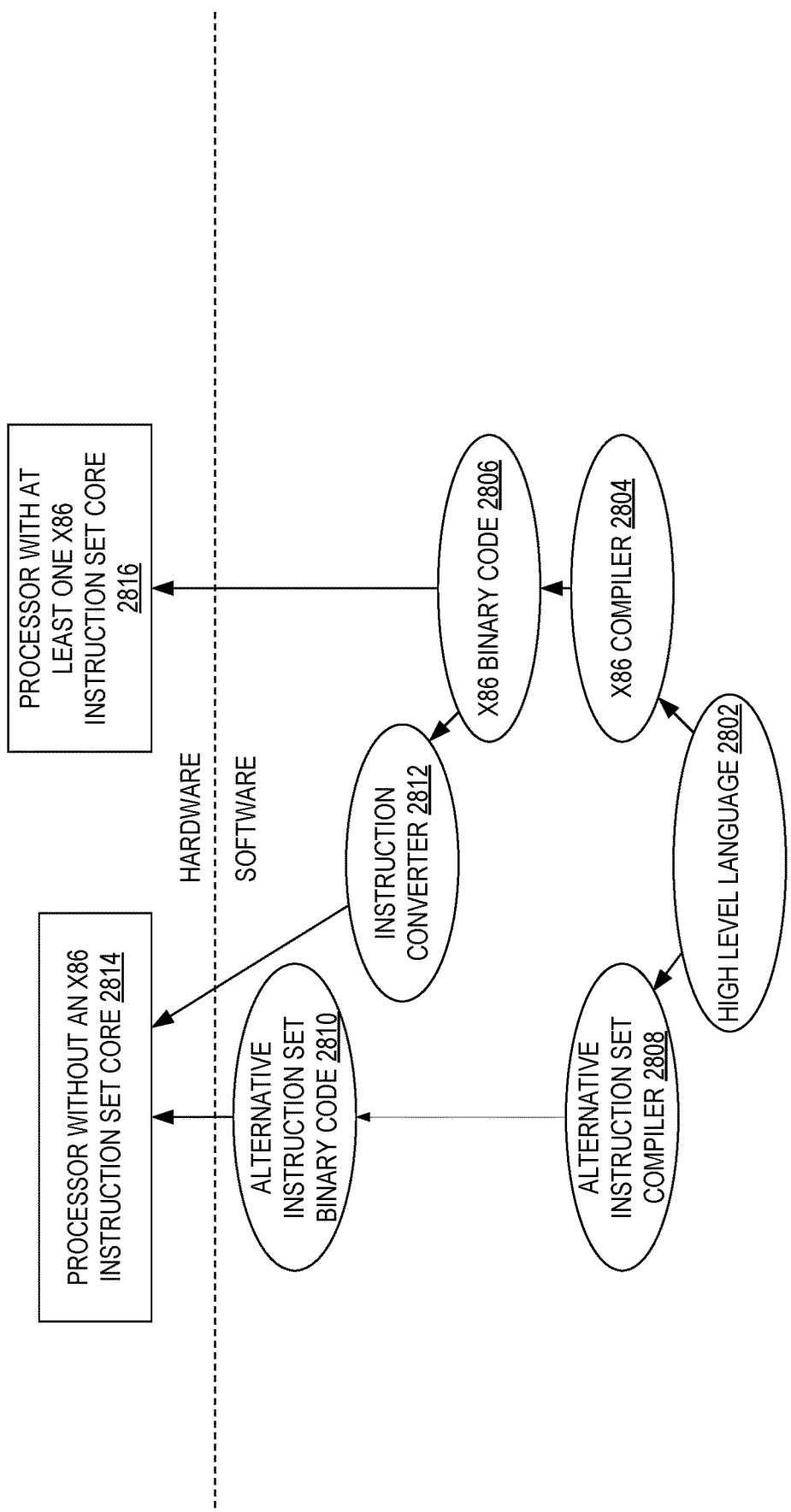
FIG. 28 is a block diagram contrasting the use of a software instruction converter to convert binary instructions in a source instruction set to binary instructions in a target instruction set according to embodiments of the disclosure.

FIG. 28 is a block diagram contrasting the use of a software instruction converter to convert binary instructions in a source instruction set to binary instructions in a target instruction set according to embodiments of the disclosure. In the illustrated embodiment, the instruction converter is a software instruction converter, although alternatively the instruction converter may be implemented in software, firmware, hardware, or various combinations thereof. FIG. 28 shows a program in a high level language 2802 may be compiled using an x86 compiler 2804 to generate x86 binary code 2806 that may be natively executed by a processor with at least one x86 instruction set core 2816. The processor with at least one x86 instruction set core 2816 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 2804 represents a compiler that is operable to generate x86 binary code 2806 (e.g., object code) that can, with or without additional linkage processing, be executed on the processor with at least one x86 instruction set core 2816. Similarly, FIG. 28 shows the program in the high level language 2802 may be compiled using an alternative instruction set compiler 2808 to generate alternative instruction set binary code 2810 that may be natively executed by a processor without at least one x86 instruction set core 2814 (e.g., a processor with cores that execute the MIPS instruction set of MIPS Technologies of Sunnyvale, Calif. and/or that execute the ARM instruction set of ARM Holdings of Sunnyvale, Calif.). The instruction converter 2812 is used to convert the x86 binary code 2806 into code that may be natively executed by the processor without an x86 instruction set core 2814. This converted code is not likely to be the same as the alternative instruction set binary code 2810 because an instruction converter capable of this is difficult to make; however, the converted code will accomplish the general operation and be made up of instructions from the alternative instruction set. Thus, the instruction converter 2812 represents software, firmware, hardware, or a combination thereof that, through emulation, simulation or any other process, allows a processor or other electronic device that does not have an x86 instruction set processor or core to execute the x86 binary code 2806.

What is claimed is:
1. An apparatus comprising:
a vector register to store an input vector of a round of an encryption operation;
a circuit comprising:
a first data path comprising:
a first modular adder having inputs coupled to a first input from the vector register and a second input from the vector register, and
a second modular adder having inputs coupled to an output of the first modular adder and a second data path from the vector register, and
the second data path comprising:
a first logical XOR circuit having inputs coupled to the second input from the vector register and a third data path from the vector register,
a first rotate circuit having an input coupled to an output of the first logical XOR circuit,
a second logical XOR circuit having inputs coupled to an output of the first rotate circuit and the third data path, and
a second rotate circuit having an input coupled to an output of the second logical XOR circuit; and
a control circuit to cause the first modular adder and the second modular adder of the first data path and the first logical XOR circuit, the second logical XOR circuit, the first rotate circuit, and the second rotate circuit of the second data path to perform a portion of the round according to one or more control values, wherein the input vector in a first cycle comprises a first constant value, a first key value, a second key value, and a first block counter value stored in adjacent elements at a first end of the vector register, and the control circuit is to input the first constant value as the first input from the vector register for the first data path of the circuit, the first key value as the second input from the vector register for the second data path of the circuit, the second key value, and the first block counter value into the circuit to produce output values, shift the input vector, other than the first constant value, the first key value, the second key value, and the first block counter value, to elements that begin at the first end of the vector register for a subsequent cycle, and store the output values into adjacent elements of a second end of the vector register for the subsequent cycle.

2. The apparatus of claim 1, wherein the first cycle is an initial cycle of the portion of the round.

3. The apparatus of claim 1, wherein the input vector further comprises a second constant value, a third key value, a fourth key value, and a nonce value in adjacent elements of the input vector.

4. The apparatus of claim 1, wherein the control circuit is to input values for an additional cycle of the round from a plurality of adjacent elements at the first end of the vector register into the circuit to produce output values for the additional cycle of the round, and cause a store of the output values for the additional cycle of the round and values from elements of the vector register other than the plurality of adjacent elements into the vector register in a fully aligned state for a subsequent cycle after the additional cycle.

5. The apparatus of claim 1, wherein the control circuit is to input values for an additional cycle of the round from a plurality of adjacent elements at the first end of the vector register into the circuit to produce output values for the additional cycle of the round, cause a store of values from a subset of the output values for the additional cycle of the round and values from elements of the vector register other than the plurality of adjacent elements into adjacent elements at the first end of the vector register in a fully aligned state for a subsequent cycle after the additional cycle, and cause a store of values other than the subset into elements of the vector register other than the first end in a partially aligned state for the subsequent cycle after the additional cycle.

6. The apparatus of claim 1, wherein the circuit comprises an input to receive a value to switch the circuit between a first mode for a first encryption standard and a second mode for a second encryption standard.

7. The apparatus of claim 6, wherein the control circuit causes the first rotate circuit and the second rotate circuit of the second data path to perform rotate left operations for the first mode, and the first rotate circuit and the second rotate circuit of the second data path to perform rotate right operations for the second mode.

8. The apparatus of claim 6, wherein the control circuit causes the circuit to source a message plus constant value to the circuit when in the second mode and not in the first mode.

9. A method comprising:
storing an input vector of a round of an encryption operation in a vector register, the input vector comprising a first constant value, a first key value, a second key value, and a first block counter value in adjacent elements at a first end of the vector register;
performing a portion of the round on the input vector with a circuit by:
inputting the first constant value as a first input from the vector register for a first data path of the circuit, the first key value as a second input from the vector register for a second data path of the circuit, the second key value, and the first block counter value into the circuit,
in the first data path of the circuit comprising a first modular adder having inputs coupled to a first input from the vector register and a second input from the vector register, and a second modular adder having inputs coupled to an output of the first modular adder and a second data path of the circuit from the vector register, adding with the first modular adder a first value from the first input from the input vector and a second value from the second input from the vector register to produce a first intermediate result, and adding with the second modular adder the first intermediate result and a third intermediate result from the second data path to produce a first result,
in the second data path of the circuit comprising a first logical XOR circuit having inputs coupled to the second input from the vector register and a third data path of the circuit from the vector register, a first rotate circuit having an input coupled to an output of the first logical XOR circuit, a second logical XOR circuit having inputs coupled to an output of the first rotate circuit and the third data path, and a second rotate circuit having an input coupled to an output of the second logical XOR circuit, logical XORing with the first logical XOR circuit the second value from the second input from the vector register and a third result from the third data path to produce a second intermediate result, rotating with the first rotate circuit the second intermediate result according to one or more control values to produce a third intermediate result, logical XORing the third intermediate result and a fourth result from the third data path to produce a fifth intermediate result, and rotating with the second rotate circuit the fifth intermediate result according to one or more control values to produce a second result;

shifting the input vector, other than the first constant value, the first key value, the second key value, and the first block counter value, to elements that begin at the first end of the vector register; and
storing output values including the first result from the first data path for the portion and the second result from the second data path for the portion into adjacent element of a second end of the vector register.

10. The method of claim 9, wherein the portion of the round is an initial cycle of the round.

11. The method of claim 9, wherein the storing of the input vector further comprises storing a second constant value, a third key value, a fourth key value, and a nonce value in adjacent elements of the input vector.

12. The method of claim 9, further comprising sending input values for an additional cycle of the round from a plurality of adjacent elements at the first end of the vector register into the circuit to produce output values for the additional cycle of the round, and storing the output values for the additional cycle of the round and values from elements of the vector register other than the plurality of adjacent elements into the vector register in a fully aligned state for a subsequent cycle after the additional cycle.

13. The method of claim 9, further comprising sending input values for an additional cycle of the round from a plurality of adjacent elements at the first end of the vector register into the circuit to produce output values for the additional cycle of the round, storing values from a subset of the output values for the additional cycle of the round and values from elements of the vector register other than the plurality of adjacent elements into adjacent elements at the first end of the vector register in a fully aligned state for a subsequent cycle after the additional cycle, and storing values other than the subset into elements of the vector register other than the first end in a partially aligned state for the subsequent cycle after the additional cycle.

14. The method of claim 9, further comprising sending a value to an input of the circuit to switch the circuit between a first mode for a first encryption standard and a second mode for a second encryption standard.

15. The method of claim 14, wherein the first mode causes the first rotate circuit and the second rotate circuit of the second data path to perform rotate left operations, and the second mode causes the first rotate circuit and the second rotate circuit of the second data path to perform rotate right operations.

16. The method of claim 14, further comprising sending a message plus constant value to the circuit when in the second mode and not in the first mode.

17. A system comprising:
a hardware processor to execute a thread and offload an encryption operation;
a vector register to store an input vector of a round of the encryption operation; and
a hardware accelerator comprising:
a circuit comprising:
a first data path comprising a first modular adder having inputs coupled to a first input from the vector register and a second input from the vector register, and a second modular adder having inputs coupled to an output of the first modular adder and a second data path from the vector register, and
the second data path comprising a first logical XOR circuit having inputs coupled to the second input from the vector register and a third data path from the vector register, a first rotate circuit having an input coupled to an output of the first logical XOR circuit, a second logical XOR circuit having inputs coupled to an output of the first rotate circuit and the third data path, and a second rotate circuit having an input coupled to an output of the second logical XOR circuit, and a control circuit to cause the first modular adder and the second modular adder of the first data path and the first logical XOR circuit, the second logical XOR circuit, the first rotate circuit, and the second rotate circuit of the second data path to perform a portion of the round according to one or more control values, wherein the input vector in a first cycle comprises a first constant value, a first key value, a second key value, and a first block counter value stored in adjacent elements at a first end of the vector register, and the control circuit is to input the first constant value as the first input from the vector register for the first data path of the circuit, the first key value as the second input from the vector register for the second data path of the circuit, the second key value, and the first block counter value into the circuit to produce output values, shift the input vector, other than the first constant value, the first key value, the second key value, and the first block counter value, to elements that begin at the first end of the vector register for a subsequent cycle, and store the output values into adjacent elements of a second end of the vector register for the subsequent cycle.

18. The system of claim 17, wherein the first cycle is an initial cycle of the portion of the round.

19. The system of claim 17, wherein the input vector further comprises a second constant value, a third key value, a fourth key value, and a nonce value stored in adjacent elements of the input vector.

20. The system of claim 17, wherein the control circuit is to input values for an additional cycle of the round from a plurality of adjacent elements at the first end of the vector register into the circuit to produce output values for the additional cycle of the round, and cause a store of the output values for the additional cycle of the round and values from elements of the vector register other than the plurality of adjacent elements into the vector register in a fully aligned state for a subsequent cycle after the additional cycle.

21. The system of claim 17, wherein the control circuit is to input values for an additional cycle of the round from a plurality of adjacent elements at the first end of the vector register into the circuit to produce output values for the additional cycle of the round, cause a store of values from a subset of the output values for the additional cycle of the round and values from elements of the vector register other than the plurality of adjacent elements into adjacent elements at the first end of the vector register in a fully aligned state for a sub sequent cycle after the additional cycle, and cause a store of values other than the subset into elements of the vector register other than the first end in a partially aligned state for the subsequent cycle after the additional cycle.

22. The system of claim 17, wherein the circuit comprises an input to receive a value from the hardware processor to switch the circuit between a first mode for a first encryption standard and a second mode for a second encryption standard.

23. The system of claim 22, wherein the control circuit causes the first rotate circuit and the second rotate circuit of the second data path to perform rotate left operations for the first mode, and the first rotate circuit and the second rotate circuit of the second data path to perform rotate right operations for the second mode.

24. The system of claim 22, wherein the control circuit causes the circuit to source a message plus constant value to the circuit when in the second mode and not in the first mode.

* * * * *